(12) United States Patent
Nakajima

(10) Patent No.: US 7,523,067 B1
(45) Date of Patent: Apr. 21, 2009

(54) ELECTRONIC SETTLEMENT SYSTEM, SETTLEMENT APPARATUS, AND TERMINAL

(75) Inventor: Keiichi Nakajima, Tokyo (JP)

(73) Assignee: SOFTBANKBB Corporation, Tokyo (JP)

(*) Notice: Subject to any disclaimer, the term of this patent is extended or adjusted under 35 U.S.C. 154(b) by 961 days.

(21) Appl. No.: 09/630,557

(22) Filed: Aug. 2, 2000

(51) Int. Cl.
*G06Q 40/00* (2006.01)

(52) U.S. Cl. .............. 705/39; 705/26; 705/40; 705/41; 705/42; 705/44

(58) Field of Classification Search ........... 705/64–67, 705/76, 53, 75, 35, 38–44
See application file for complete search history.

(56) References Cited

U.S. PATENT DOCUMENTS

| | | | |
|---|---|---|---|
| 4,742,351 A | | 5/1988 | Suzuki |
| 5,267,314 A | | 11/1993 | Stambler |
| 5,321,242 A | * | 6/1994 | Heath, Jr. ............ 235/382 |
| 5,590,199 A | * | 12/1996 | Krajewski et al. ...... 713/159 |
| 5,591,949 A | * | 1/1997 | Bernstein ............ 235/380 |
| 5,604,802 A | * | 2/1997 | Holloway ............. 705/66 |
| 5,608,778 A | | 3/1997 | Partridge |
| 5,615,110 A | | 3/1997 | Wong |
| 5,708,422 A | | 1/1998 | Blonder et al. ........ 340/825.34 |
| 5,715,314 A | | 2/1998 | Payne et al. |
| 5,724,424 A | | 3/1998 | Gifford |
| 5,745,886 A | | 4/1998 | Rosen |
| 5,826,241 A | * | 10/1998 | Stein et al. ............ 705/26 |
| 5,883,810 A | * | 3/1999 | Franklin et al. ........ 700/232 |
| 5,889,863 A | | 3/1999 | Weber |
| 5,890,137 A | | 3/1999 | Koreeda |
| 5,899,980 A | | 5/1999 | Wilf et al. |
| 5,903,878 A | * | 5/1999 | Talati et al. ............ 705/26 |

(Continued)

FOREIGN PATENT DOCUMENTS

EP  0 935 221  8/1999

(Continued)

OTHER PUBLICATIONS

Microsoft Press Computer Dictionary, 3rd ED. 1997, p. 456.*

(Continued)

*Primary Examiner*—Hani Kazimi
*Assistant Examiner*—Daniel Kesack
(74) *Attorney, Agent, or Firm*—Stroock & Stroock & Lavan LLP

(57) ABSTRACT

A simple, easy, and safe electronic settlement system is provided. A user terminal such as a cellular phone is wirelessly connected to a synchronizing server at a counter of a retailer. A cashier terminal of the retailer connects to the synchronizing server via a private line and so on. The cashier terminal receives a transaction identifying number in order to identify the transaction from the synchronizing server, and notifies to a user. A user inputs the transaction identifying number to the user terminal and transmits the transaction identifying number to the synchronizing server. The synchronizing server completes a transaction between the virtual cashier terminal and the user terminal, both of which are corresponded to each other by the transaction identification number. The cashier terminal authenticates the user intermediated by the synchronizing server. The user can complete a settlement without telling his or her personal information such as a credit card number or a password to a retailer. A security of the system is improved.

32 Claims, 43 Drawing Sheets

U.S. PATENT DOCUMENTS

| | | | |
|---|---|---|---|
| 5,914,472 A | | 6/1999 | Foladore et al. |
| 5,924,078 A | | 7/1999 | Naftzger |
| 5,974,146 A | | 10/1999 | Randle et al. |
| 5,986,565 A | | 11/1999 | Isaka .................... 340/825.33 |
| 5,988,497 A | * | 11/1999 | Wallace ................... 235/382.5 |
| 5,991,749 A | | 11/1999 | Morrill, Jr. |
| 6,016,956 A | | 1/2000 | Takami et al. |
| 6,038,549 A | * | 3/2000 | Davis et al. ................... 705/35 |
| 6,092,202 A | * | 7/2000 | Veil et al. ..................... 726/27 |
| 6,108,583 A | * | 8/2000 | Schneck et al. ............... 700/9 |
| 6,128,600 A | * | 10/2000 | Imamura et al. ............. 705/27 |
| 6,178,409 B1 | | 1/2001 | Weber et al. |
| 6,282,522 B1 | * | 8/2001 | Davis et al. ................... 705/41 |
| 6,324,525 B1 | | 11/2001 | Kramer |
| 6,332,133 B1 | * | 12/2001 | Takayama .................... 705/39 |
| 6,332,134 B1 | * | 12/2001 | Foster ......................... 705/39 |
| 6,366,893 B2 | * | 4/2002 | Hannula et al. .............. 705/40 |
| 6,397,198 B1 | * | 5/2002 | Hoffman et al. ............. 705/44 |
| 6,405,176 B1 | | 6/2002 | Toohey |
| 6,453,301 B1 | * | 9/2002 | Niwa ........................... 705/26 |
| 6,488,203 B1 | | 12/2002 | Stoutenburg et al. |
| 6,629,135 B1 | | 9/2003 | Ross, Jr. et al. |
| 6,754,640 B2 | * | 6/2004 | Bozeman ..................... 705/40 |
| 6,796,491 B2 | | 9/2004 | Nakajima |
| 6,970,852 B1 | * | 11/2005 | Sendo et al. .................. 705/67 |
| 7,014,106 B2 | | 3/2006 | Nakajima |
| 2002/0073046 A1 | * | 6/2002 | David .......................... 705/67 |
| 2004/0199474 A1 | | 10/2004 | Ritter |
| 2006/0000890 A1 | | 1/2006 | Nakajima |
| 2006/0253340 A1 | | 11/2006 | Levchin et al. |

FOREIGN PATENT DOCUMENTS

| | | |
|---|---|---|
| EP | 0 935 221 A2 | 8/1999 |
| JP | 62-15657 A | 1/1987 |
| JP | 62-191197 A | 8/1987 |
| JP | 3-282763 | 12/1991 |
| JP | 8-16740 | 1/1996 |
| JP | 8-16740 A | 1/1996 |
| JP | 8-96043 A | 4/1996 |
| JP | 9-116960 | 5/1997 |
| JP | 9-116960 A | 5/1997 |
| JP | 10-91866 A | 4/1998 |
| JP | 10-207946 | 8/1998 |
| JP | 10-289267 | 10/1998 |
| JP | 11-45366 | 2/1999 |
| JP | 11-45366 A | 2/1999 |
| JP | 11-85014 | 3/1999 |
| JP | 11-85014 A | 3/1999 |
| JP | 11-96252 | 4/1999 |
| JP | 11-96252 A | 4/1999 |
| JP | 11-224236 | 8/1999 |
| JP | 11-224236 A | 8/1999 |
| JP | 11-511882 | 10/1999 |
| JP | 11-511882 A | 10/1999 |
| WO | 96/36148 A1 | 11/1996 |
| WO | 96/36934 | 11/1996 |
| WO | 97/45814 | 12/1997 |
| WO | 97/49074 | 12/1997 |
| WO | WO 98/21677 | 5/1998 |
| WO | 98/37524 A1 | 8/1998 |
| WO | 98/47116 A1 | 10/1998 |
| WO | WO 99/09502 | 2/1999 |
| WO | 99/66436 | 12/1999 |
| WO | 99/66436 A1 | 12/1999 |
| WO | WO 00/49551 * | 8/2000 |
| WO | 01/09807 | 2/2001 |
| WO | 01/22342 | 3/2001 |

OTHER PUBLICATIONS

O'Mahony, D et al, Electronic Payment Systems, Artech House, 1997, pp. 62-63.*
Payment Switches . . . Networks, 1995 IEEE 26-31(Gifford et al).
Mobile Commerce: Geoff, "Mobile Commerce Visions of 'An Internet with Wings,'" Financial Times (Jul. 1998), Proquest #30857907.
Meyers, "Speak the Truth," Telephony, v. 233 n. 13, p. 23 (Sep. 1997), Proquest #16449380).
Steinberg, "Smart Cards Finally Draw a Good Hand/Smart Card Technology Finally Draws a Good Hand/Smart Cards Play Into Net Security," Austin American Statesman (Dec. 1997), Proquest #25116767.
"Open Market Introduces Industry-Defining Software for Internet Commerce," PR Newswire (Feb. 1998), Proquest #26408772.
"Open Market Receives Patents for Core Internet Commerce Technology; Patents Cover Internet Marketing, Order Management and Payment," PR Newswire (Mar. 1998), Proquest #26881564.
Mobile Commerce: McDonald, "SmartCard Chip Reduces EFTPOS Security Risk-Tobin," Dominion (Mar. 1998), Proquest #28386959.
U.S. Appl. No. 60/131,369, filed Apr. 28, 1999, Sherman.
Dunlap, "Open Market Pact Invests in E-commerce," Computer Reseller News, n. 788, p. 103 (May 1998), Proquest #29397051.
U.S. Appl. No. 60/146,628, filed Jul. 30, 1999, David.
U.S. Appl. No. 60/167,352, filed Nov. 24, 1999, David.
"Geoworks First to Deliver Shopping Discounts Direct to Mobile Phones and Pagers", PR Newswire, Jun. 22, 1999.
U.S. Appl. No. 60/131,785, filed Apr. 30, 1999.
U.S. Appl. No. 60/144,633, filed Jul. 19, 1999.
U.S. Appl. No. 60/172,311, filed Dec. 17, 1999.
English translation of International Preliminary Examination Report for appln. PCT/JP00/02014 (May 30, 2002).
O'Mahony, D., et al. "Electronic Payment Systems", Artech House, pp. 62-63 (1997).
U.S. Appl. No. 60/131,785 (Levchin), including Appendix A.
U.S. Appl. No. 60/144,633 (Levchin), including Appendix A.
U.S. Appl. No. 60/172,311 (Levchin), including Appendix A.
U.S. Appl. No. 09/630,563 (Nakajima), with Amendment After Final Rejection filed Jul. 3, 2008.
U.S. Appl. No. 09/786,208(Nakajima) (parent case), with Amendment filed Apr. 9, 2008.
U.S. Appl. No. 11/344,131 (Nakajima), with Amendment filed Jul. 3, 2008.
Office Action in U.S. Appl. No. 11/344,131 (mailing date Jul. 16, 2007).
Partial English translation of Office Action from JP2001-514352 (Oct. 23, 2007).
Partial English translation of Office Action in JP appln. No. 2001-514352 (Oct. 23, 2007).
Office Action from Japanese patent appln. 2001-514350 A (Feb. 17, 2009), with partial English translation.

* cited by examiner

| | | 6000 |
|---|---|---|
| CASHIER REGISTRATION NUMBER | 1234567 | |
| RETAILER NAME | ABC SHOP | |
| STORE NAME | SHINJUKU | |
| CASHIER TERMINAL NO. | 2 | |
| AUTHENTICATION METHOD | VISUAL AUTHENTICATION AND PASSWORD AUTHENTICATION | |

FIG. 14

| PURCHASE DATE | PURCHASE ID | PURCHASE AMOUNT | SETTLEMENT DATE |
|---|---|---|---|
| 1999/8/10 10:20 | 1942356 | 2,341YEN | 1999/8/25 |
| 1999/9/1 14:00 | 2341235 | 4,000YEN | 1999/9/25 |
| 1999/9/4 16:30 | 4256783 | 13,200YEN | 1999/9/25 |
| . . . | . . . | . . . | . . . |

| | |
|---|---|
| GRANDFATHER'S NAME | TARO |
| GRANDMOTHER'S NAME | HARUKO |
| MOTHER'S MAIDEN NAME | TANAKA |
| DOMICILE TOWN NAME | TOUNO-CHOU |
| FAVORITE AUTHOR | SHAKESPEARE |
| ELEMENTARY SCHOOL NAME | HANAZONO |
| . . . . | . . . . |

*FIG. 18*

| TYPE | AUTHENTICATION METHOD APPOINTED BY CASHIER TERMINAL |
|---|---|
| R1 | NO AUTHENTICATION |
| R2 | VISUAL AUTHENTICATION OR PASSWORD AUTHENTICATION |
| R3 | VISUAL AUTHENTICATION ONLY |
| R4 | PASSWORD AUTHENTICATION ONLY |
| R5 | VISUAL AUTHENTICATION AND PASSWORD AUTHENTICATION |
| R6 | if    PURCHASE AMOUNT $\geq$ 10,000YEN<br>then  VISUAL AUTHENTICATION AND PASSWORD AUTHENTICATION<br>or else  VISUAL AUTHENTICATION |
| ⋮ | ⋮ |

FIG. 19

| TYPE | AUTHENTICATION METHOD APPOINTED BY USER |
|---|---|
| U1 | NOT APPOINTED (DEPENDENT ON CASHIER TERMINAL) |
| U2 | ADD PASSWORD AUTHENTICATION |
| U3 | REFUSE VISUAL AUTHENTICATION |
| U4 | if    PURCHASE AMOUNT$\geqq$5,000YEN<br>then   ADD PASSWORD AUTHENTICATION<br>or else  NO APPOINT |
| ⋮ | ⋮ |

*FIG. 20*

| AUTHENTICATION METHOD APPOINTED BY CASHIER TERMINAL | AGREEABLE AUTHENTICATION METHOD | | | AUTHENTICATION METHOD APPOINTED BY USER |
|---|---|---|---|---|
| | VISUAL AUTHENTICATION | PASSWORD AUTHENTICATION | REJECTION | |
| NO AUTHENTICATION | | | | NONE |
| VISUAL AUTHENTICATION OR PASSWORD AUTHENTICATION | △ | △ | | NONE |
| VISUAL AUTHENTICATION ONLY | ○ | | | NONE |
| PASSWORD AUTHENTICATION ONLY | | ○ | | NONE |
| VISUAL AUTHENTICATION AND PASSWORD AUTHENTICATION | ○ | ○ | | NONE |
| VISUAL AUTHENTICATION OR PASSWORD AUTHENTICATION | ○ | ○ | | ADD PASSWORD AUTHENTICATION |
| VISUAL AUTHENTICATION ONLY | ○ | ○ | | ADD PASSWORD AUTHENTICATION |
| PASSWORD AUTHENTICATION ONLY | | ○ | | ADD PASSWORD AUTHENTICATION |
| VISUAL AUTHENTICATION AND PASSWORD AUTHENTICATION | ○ | ○ | | ADD PASSWORD AUTHENTICATION |
| VISUAL AUTHENTICATION OR PASSWORD AUTHENTICATION | | ○ | | REFUSE VISUAL AUTHENTICATION |
| VISUAL AUTHENTICATION ONLY | | | ○ | REFUSE VISUAL AUTHENTICATION |
| PASSWORD AUTHENTICATION ONLY | | ○ | | REFUSE VISUAL AUTHENTICATION |
| VISUAL AUTHENTICATION AND PASSWORD AUTHENTICATION | | | ○ | REFUSE VISUAL AUTHENTICATION |

*FIG. 21*

(a) 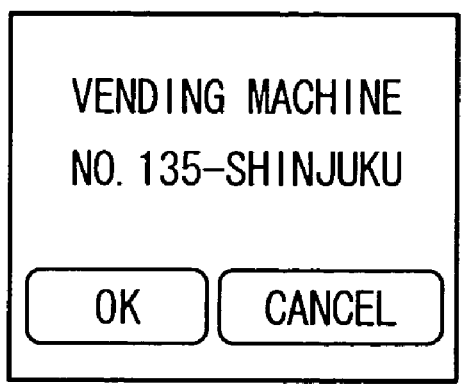
(b) 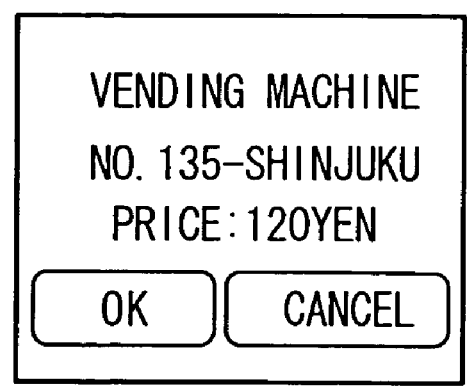
FIG. 36

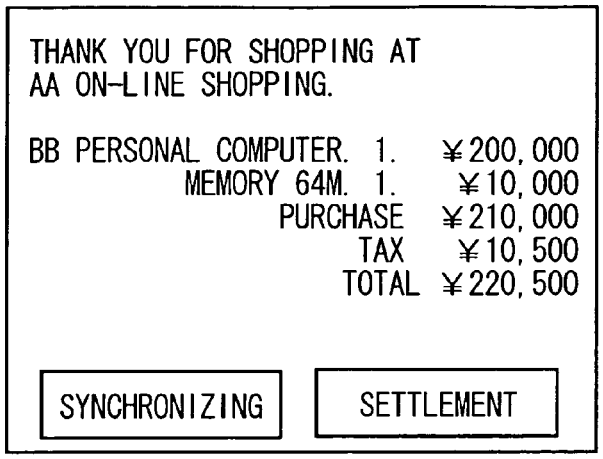
(a)
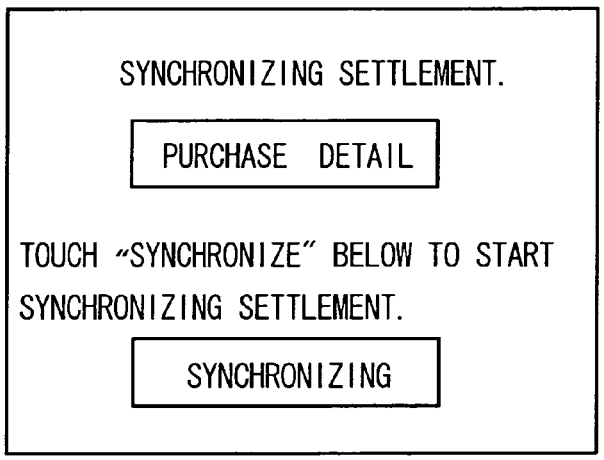
(b)
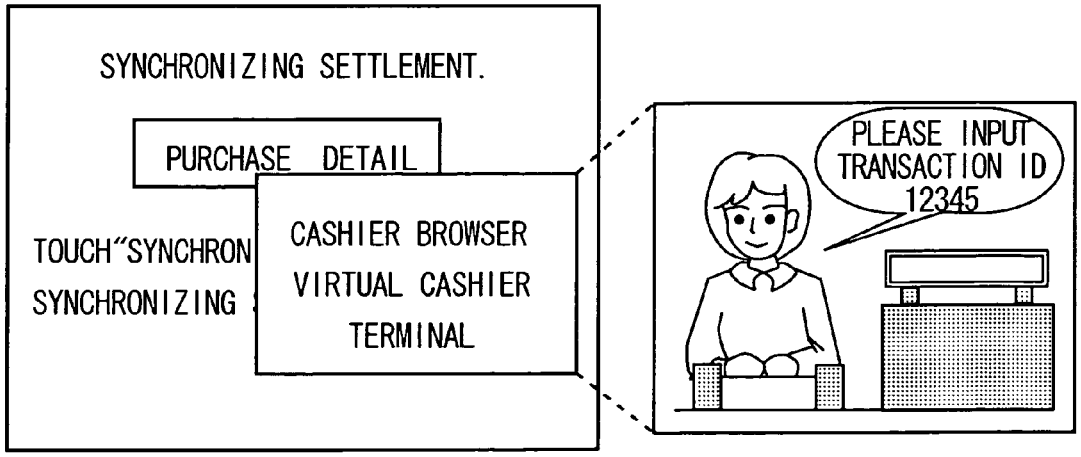
(c)
FIG. 43

ELECTRONIC SETTLEMENT SYSTEM, SETTLEMENT APPARATUS, AND TERMINAL

This application claims priority under 35 U.S.C. §120 to PCT/JP99/04178, filed Aug. 2, 1999, and PCT/JP00/02014, filed Mar. 29, 2000, contents of which are incorporated herein by reference.

BACKGROUND OF THE INVENTION

1. Field of the Invention

The present invention relates to an electronic settlement system, a settlement apparatus, and its terminal. In particular, the present invention relates to an electronic settlement system and a settlement apparatus, which may perform a settlement of a commercial transaction electronically via a communication network, and its terminal. The present application relates to the international patent publication identified below. For those designated countries that permit incorporation of publications by reference, the contents of this international patent publication are incorporated herein by reference, as a part of the description of the present patent application.

PCT/JP99/04178 filed on Aug. 2, 1999

2. Description of the Related Art

Conventionally, in an electronic settlement system, which executes a settlement of a commercial transaction electronically via a communication network, personal data such as a credit card number is sent in the form of digital data such as a credit card number via the Internet. Sending personal data such as a credit card number directly, the credit card number may be stolen and suffer from a false use. Thus, it is necessary to keep personal data from being leaked by using a high level of cryptology. To improve security, the electronic settlement system needs a complex authenticating procedure however this sacrifices convenience.

Therefore, an object of the present invention is to solve such a problem and provide a safe and convenient electronic settlement system.

SUMMARY OF THE INVENTION

Therefore, it is an object of the present invention to provide a electronic settlement system, settlement apparatus, and terminal which overcomes the above issues in the related art. This object is achieved by combinations described in the independent claims. The dependent claims define further advantageous and exemplary combinations of the present invention.

According to the first aspect of the present invention, an electronic settlement system for settling up a transaction through a communication network, comprises: a settlement apparatus which performs the settlement of the transaction; a billing terminal connecting to the settlement apparatus via the communication network; and a paying terminal, connecting to the settlement apparatus via the communication network, the settlement apparatus may perform the settlement of transaction by synchronizing a communication to the billing terminal with a communication to the paying terminal when the settlement apparatus sets up a transaction identifying number which identifies the transaction and when the paying terminal transmits the same transaction identifying number to the settlement apparatus.

The billing terminal may connect to the settlement apparatus via a commercial telephone line or a private line, and the paying terminal may connect to the settlement apparatus via a radiotelephone communication.

According to the second aspect of the present invention, a settlement apparatus performing a settlement of a transaction, which communicates with a billing terminal performing billing of the transaction and with a paying terminal performing paying of the transaction, the apparatus comprises a first communication unit connecting to the billing terminal via a first communication network; a second communication unit connecting to the paying terminal via second communication network; and a processing unit for processing the settlement of transaction, the processing unit synchronizing a communication to the billing terminal with a communication to the paying terminal when the processing unit sets up a transaction identifying number to identify the transaction, and when the paying terminal transmits to the settlement apparatus the same transaction identifying number.

The first communication unit may connect to the billing terminal via at least one of the Internet, a commercial telephone line, and a private line, and the second communication unit connects to the paying terminal via radiotelephone communication.

The first communication unit may transmit to the billing terminal the transaction identifying number in order to identify the transaction, and the processing unit may synchronize a communication to the billing terminal with a communication to the paying terminal, and the first communication unit may transmit to the billing terminal a synchronization confirmation signal which indicates establishment of synchronization, when the billing terminal notifies the transaction identifying number to at least one of the paying terminal and a user of the paying terminal, and when the paying terminal transmits to the settlement apparatus the same transaction identifying number.

The processing unit may process the settlement of transaction between the billing terminal and the paying terminal, both of which are synchronized with each other by the transaction identifying number.

The first communication unit may receive a purchase amount of the transaction from the billing terminal, and the processing unit may process the settlement of the transaction for a user of the paying terminal based on the purchase amount that the first communication unit receives from the billing terminal.

The first communication unit may receive the purchase amount of the transaction from the billing terminal; the second communication unit may transmit the purchase amount to the paying terminal so that the paying terminal confirms the purchase amount, and may receive a final purchase confirmation signal; the processing unit may perform a settlement processing after the second communication unit receives the final purchase confirmation signal from the paying terminal; the first communication unit may transmit a settlement completion notification, which notifies completion of the settlement processing performed by the processing unit to the billing terminal; and the second communication unit may transmit to the paying terminal a receipt which notifies the receiving of the purchasing amount of the settlement processed by the processing unit.

The settlement apparatus described above may further comprise a billing terminal database storing information about the billing terminal, the first communication unit may receive from the billing terminal an identifying number to identify the billing terminal, and the processing unit may retrieve information about the billing terminal from the billing terminal database and may confirm a registration of the billing terminal, based on the identifying number.

The second communication unit may transmit to the paying terminal the information about the billing terminal, for the paying terminal to confirm the billing terminal, retrieved from the billing terminal database.

The settlement apparatus described above may further comprise a paying terminal database which stores information about the paying terminal, the second communication unit may detect a calling telephone number of the paying terminal, and the processing unit may retrieve information about a user of the paying terminal from the paying terminal database based on the calling telephone number, and the processing unit inquires at least one of a registration status of the user, a payment history of the user, and available amount of the user.

The processing unit may retrieve at least a part of attribute information of the user of the paying terminal from the paying terminal database, and the first communication unit transmits to the billing terminal at least a part of the attribute information of the user of the paying terminal.

When the second communication unit receives a message which demands a purchase history of the user of the paying terminal, the processing unit may retrieve the purchase history of the user from the paying terminal database, and the second communication unit may transmit the purchase history to the paying terminal.

The processing unit may retrieve authentication information of the user of the paying terminal from the paying terminal database, and the first communication unit, for the billing terminal to authenticate the user, may transmit the authentication information of the user to the billing terminal. The authentication information of the user may be a facial portrait of the user.

The first communication unit may receive a signal requesting password authentication of the user from the billing terminal; the processing unit may retrieve information about the password of the user of the paying terminal from the paying terminal database; the second communication unit may transmit an order of password request to the paying terminal and may receive a password inputted by the paying terminal from the paying terminal; the processing unit, receiving the password from the paying terminal, may inquire to the information about the password retrieved from the paying terminal database; and the first communication unit may authenticate the user by transmitting password inquiry result performed by the processing unit to the billing terminal.

The processing unit may retrieve authentication information registered by the user of the paying terminal from the paying terminal database; the second communication unit may transmit a order to inquire the authentication information to the paying terminal and may receive an answer the paying terminal inputting corresponding to the order from the paying terminal; and the processing unit may authenticate the user by verifying the answer received from the paying terminal against the authentication information retrieved from the paying terminal database.

The first communication unit, transmitting a verifying result by the processing unit to the billing terminal, may notify an authentication result of the user to the billing terminal.

The paying terminal database may store a plurality of authentication information of the user and the processing unit may retrieve from the paying terminal database at least one of the plurality of authentication information at random.

The billing terminal database may store an authentication method demanded by the billing terminal and the paying terminal database stores an authentication method demanded by the user, and the processing unit may retrieve the authentication method demanded by the billing terminal from the billing terminal database and retrieves the authentication method demanded by the paying terminal from the paying terminal database, may select an agreeable the authentication method based on the authentication method demanded by the billing terminal and the authentication method demanded by the paying terminal, and may authenticate the user.

If an authentication accuracy of the authentication method demanded by the billing terminal differs from an authentication accuracy of the authentication method demanded by the user, the authentication method which has higher authentication accuracy may be selected for the agreeable authentication method.

If the authentication method demanded by the billing terminal does not matches with the authentication method demanded by the user, the processing unit may refuse to authenticate the user, and the second communication unit may transmit to the paying terminal information indicating that the authentication is refused.

The authentication method, demanded by at least one of the billing terminal and the user, may appoint at least one of visual authentication using facial portrait data of the user, password authentication using password which is the user registered for authentication information, and voice authentication using voice data the user registered.

If the authentication method demanded by the user appoints refusal of the visual authentication and the authentication method demanded by the billing terminal appoints the authentication method which does not essentially requires the visual authentication, the processing unit may select the agreeable authentication method which does not includes the visual authentication.

If the authentication method demanded by the user appoints refusal of the visual authentication and the authentication method demanded by the billing terminal appoints the authentication method which essentially requires the visual authentication, the processing unit may refuse authentication of the user and the second communication unit transmits to the paying terminal information indicating that the authentication is refused because the agreement of authentication method is not made.

If the authentication method demanded by the user appoints addition of the password authentication, the processing unit may select agreeable authentication method by adding the password authentication to the authentication method demanded by the billing terminal.

According to the third aspect of the present invention, a billing terminal performing billing of a transaction against a paying terminal paying for the transaction, by communicating with a settlement apparatus settling the transaction, may comprise a communication unit which connects to the settlement apparatus via a communication network, the communication unit transmitting an identification number to identify the billing terminal to the settlement apparatus and receiving from the settlement apparatus a synchronization confirmation signal indicating establishment of synchronization with the paying terminal; and a processing unit which performs billing of the transaction.

The communication unit may connect to the settlement apparatus via at least one of the Internet, a commercial telephone line, a private line, and radiotelephone communication.

The communication unit may receive a transaction identifying number to identify the transaction from the settlement apparatus, and when the paying terminal transmits a transaction identifying number which is the same as the transaction identifying number to the settlement apparatus, and the communication unit may receive from the settlement apparatus a synchronization confirmation signal indicating the establishment of synchronization with the paying terminal, and the apparatus described above may further include a display unit displaying the transaction identifying number in order to notify the transaction identifying number to a user of the paying terminal.

The communication unit may receive from the settlement apparatus the transaction identifying number to identify the transaction, and when the paying terminal transmits to the settlement apparatus the transaction identifying number which is the same as the transaction identifying number, the communication unit may receive from the settlement apparatus a synchronization confirmation signal indicating the establishment of the synchronization with the paying terminal, the apparatus described above further includes a short range communication unit transmitting the transaction identifying number to the paying terminal by communicating with the paying terminal via at least one of an optical communication and a wireless communication.

The settlement processing of the transaction may be performed against the paying terminal synchronized with the billing terminal, when the communication unit receives from the settlement apparatus the synchronization confirmation signal indicating the establishment of synchronization with the paying terminal.

The billing terminal may receive from the settlement apparatus a the settlement completion notification to notify a completion of the settlement processing when the communication unit transmits to the settlement apparatus a purchase amount of the transaction and the settlement apparatus performs the settlement processing of the transaction against a user of the paying terminal synchronized with the billing terminal.

The communication unit may receive from the settlement apparatus at least a part of attribute information of the user of the paying terminal.

The communication unit may receive from the settlement apparatus the authentication information of the user of the paying terminal, and the processing unit may authenticate the user based on the authentication information received from the settlement apparatus. The authentication information of the user may be a facial portrait of the user.

The communication unit may transmit to the settlement apparatus a signal to demand authentication of the user using a password and may receive from the settlement apparatus a result of the authentication of the user using a password when the processing unit is not able to authenticate the user using the facial portrait of the user.

The billing terminal described above may further include an item choice unit by which the user of the paying terminal prompt to choose a purchasing item, the item choice unit prompting the user to choose an item when the communication unit receives from the settlement apparatus the synchronization confirmation signal indicating the establishment of synchronization with the paying terminal; and an item sending unit through which a purchased item to be sent out; the communication unit may transmit to the settlement apparatus a price of the item chosen by the user as the purchase amount of the transaction, and when the communication unit receives the settlement completion notification from the settlement apparatus, the item sending unit may send out the item chosen by the user based on the settlement completion notification.

According to the fourth aspect of the present invention, a billing terminal for performing billing of a transaction, communicating with a settlement apparatus performing settlement of the transaction against a paying terminal performing a paying of the transaction, and communicating with a computer terminal indicating a status of the transaction to provide information about the transaction, the billing terminal comprises a first communication unit connecting to the settlement apparatus via a communication network, the first communication unit transmitting an identifying number identifying the billing terminal to the settlement apparatus and receiving a transaction identifying number identifying the transaction from the settlement apparatus and the first communication unit receiving from the settlement apparatus a synchronization confirmation signal indicating the establishment of synchronization with the paying terminal; a second communication unit connecting to the computer terminal via the communication network, the second communication unit transmitting to the computer terminal for a user of the paying terminal the transaction identifying number in order to notify the transaction identifying number; and a processing unit performing billing of the transaction.

The settlement processing of the transaction against the paying terminal synchronized with the billing terminal may be performed when the first communication unit receives from the settlement apparatus the synchronization confirmation signal indicating the establishment of synchronization with the paying terminal.

The second communication unit may receive from the computer terminal a purchase amount of the transaction, and when the first communication unit transmits the purchase amount to the settlement apparatus and the settlement apparatus may perform the settlement processing of the transaction against a user of the paying terminal synchronized with the billing terminal, the first communication unit may receive from the settlement apparatus a settlement completion notification which notifies a completion of the settlement processing.

The second communication unit, for the computer terminal to indicate a state of the transaction, may transmit to the computer terminal at least one of the synchronization confirmation signal and the settlement completion notification for the first communication unit receiving from the settlement apparatus.

According to the fifth aspect of the present invention, an authentication apparatus for communicating with a first terminal and with a second terminal demanding to authenticate a user of the first terminal, and performing the authentication demanded by the second terminal, the apparatus comprises a user database storing authentication information registered by a user of the first terminal; a first communication unit connecting to the first terminal via a first communication network; a second communication unit connecting to the second terminal via a second communication network; and a processing unit performing the authentication, the processing unit may set up an identifying number to identify the authentication demanded by the second terminal, and when the first terminal transmits the same identifying number as the identifying number to the authentication apparatus, synchronizes a communication to the first terminal with a communication to the second terminal; the second communication unit may receive from the second terminal an authentication demand to authenticate the user of the first terminal; the processing unit may retrieve from the user database authentication information to authenticate the user of the first terminal; the first communication unit may transmits to the first terminal an order to inquire the authentication information and receives from the first terminal an answer inputted by the first terminal corresponding to the order; the processing unit, by inquiring the answer received from the first terminal with the authentication information retrieved from the database, authenticates the user of the first terminal; and the second communication unit, by transmitting to the second terminal an authentication result judged by the processing unit, may authenticate the user of the first terminal.

The authentication information, the processing unit retrieving from the database, registered by the user of the first terminal may be at least one of following data, a password of the user, voice data spoken by the user, facial portrait image data of the user, at least one of iris and retina data of the user, and fingerprint image data of the user; and the answer the processing unit receiving from the first terminal in order to inquire with the authentication information may be at least one of following data, character data, voice data, and image data.

According to the sixth aspect of the present invention, a recording medium which stores a program for a computer, communicating with a billing terminal performing billing of a transaction and with a paying terminal performing paying of the transaction, and performs a settlement of the transaction, the program comprises a first communication module which prompts to communicate to the billing terminal via at least one of a commercial telephone line and a private line; a second communication module which prompts to communicate with the paying terminal via a radiotelephone communication, and a processing module which prompts to perform a settlement processing of the transaction, the processing module may set up a transaction identifying number which identifies the transaction and the processing module synchronizes a communication to the billing terminal with a communication to the paying terminal when the paying terminal transmits a transaction identifying number which is the same as the transaction identifying number to the computer.

According to the seventh aspect of the present invention, a business method which is performed by a settler who intermediates a settlement of transaction while communicating with a demander who performs billing of a transaction and with a payer who performs paying of the transaction, comprises steps of: setting up a transaction identifying number of the transaction for the settler to identify the transaction; notifying the transaction identifying number to the demander; notifying the transaction identifying number from the demander to the payer; and performing a settlement processing of the transaction between the demander and the payer corresponding to each other by the transaction identifying number when the transaction identifying number same as the transaction identifying number is notified from the payer to the settler.

According to the eighth aspect of the present invention, a method of settlement using a settlement apparatus which performs the settlement of transaction while communicating with a billing terminal which performs billing of a transaction and with a paying terminal which performs paying of the transaction, the method comprises steps of: setting up a transaction identifying number to identify the transaction; transmitting the transaction identifying number to the paying terminal; synchronizing a communication to the billing terminal with a communication to the paying terminal when the paying terminal transmits the transaction identifying number to the settlement apparatus; transmitting a synchronization confirmation signal which indicates that the synchronization is established with the billing terminal; and performing a process of settlement of the transaction between the billing terminal and the paying terminal, both of which are synchronized with each other by the transaction identifying number, based on the purchase amount.

According to the ninth aspect of the present invention, A settlement apparatus for settling a transaction while communicating with a billing terminal which performs billing of a transaction and with a paying terminal which performs paying of the transaction, comprises: a first communication unit connecting to the billing terminal via a first communication network; a second communication unit connecting to the paying terminal via a second communication network; and a processing unit performing the settlement processing of the transaction. The processing unit setting up a transaction identifying number to identify the transaction performed by the paying terminal, and the settlement apparatus synchronizing a communication to the billing terminal with a communication to the paying terminal when the billing terminal transmits to the settlement apparatus the same transaction identifying number.

The first communication unit may transmit the transaction identifying number to identify the transaction to the paying terminal; and the processing unit may synchronize the communication to the billing terminal with the communication to the paying terminal when the paying terminal transfers the transaction identifying number to the billing terminal and the billing terminal transmits the same transaction identifying number as the transaction identifying number to the settlement apparatus, and the first communication unit transmits a synchronization confirmation signal indicating the establishment of synchronization with the billing terminal.

The processing unit may perform the settlement processing of the transaction between the billing terminal and the paying terminal synchronized with each other by the transaction identifying number.

According to the tenth aspect of the present invention, a billing terminal, communicating with a settlement apparatus which performs a settlement of a transaction, and performing billing of the transaction against a paying terminal which performs paying of the transaction, the billing terminal comprises: a communication unit which connects to the settlement apparatus via a communication network, the communication unit transmitting an identifying number to identify the transaction transferred from the billing terminal, the communication unit receiving from the settlement apparatus a synchronization confirmation signal indicating an establishment of synchronization with the paying terminal which performs the transaction identified by the transaction identifying number; and a processing unit which performs billing processing of the transaction.

The billing terminal described above may further include a pattern code read in unit which read in a pattern code patterning the transaction identifying number at least one of a barcode and a cyber code displayed on the paying terminal and retrieves the transaction identifying number. The communication unit may transmit to the settlement apparatus the transaction identifying number retrieved from the pattern code read in unit and receives from the settlement apparatus the synchronization confirmation signal indicating establishment of synchronization with the paying terminal performing transaction identified by the transaction identifying number.

The billing terminal further includes a short range communication unit communicating with the paying terminal via at least one of an optical communication and a wireless communication and receiving the transaction identifying number from the paying terminal. The communication unit transmits the transaction identifying number to the settlement apparatus and receives from the settlement apparatus the synchronization confirmation signal indicating establishment of synchronization with the paying terminal performing the transaction identified by the transaction identifying number.

When the communication unit receives from the settlement apparatus the synchronization confirmation signal indicating establishment of synchronization with the paying terminal, the processing unit may perform billing of the transaction against the paying terminal synchronized with the billing terminal.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

BRIEF DESCRIPTION OF THE DRAWINGS

FIG. 14 shows an example of cashier terminal information 6000 stored in a cashier database 50.

FIG. 17 shows an example of a history file 6030.

FIG. 18 shows an example of an authentication data file 6040.

FIG. 19 explanatorily shows an example of an authentication method stored in an authentication method field of cashier terminal information 6000.

FIG. 20 explanatorily shows an example of an authentication method stored in an authentication method field of user information 6010.

FIG. 21 explanatorily shows an authentication method agreed between the cashier terminal 10 and the user terminal 20 based on the authentication method appointed by the cashier terminal 10 and the authentication method appointed by the user terminal 20.

FIG. 36 shows examples of information indicated on a display unit 802 of a user terminal 20.

FIG. 43 shows examples of information displayed on a user computer 22.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

First Embodiment

An electronic settlement system applying the first embodiment of the present invention will be explained as follows. Applying the electronic settlement system of the present embodiment, when a consumer purchases an item and pays its expense, the consumer may execute a settlement electronically via a network. The customer is referred to as a user in the following.

Figure 1:
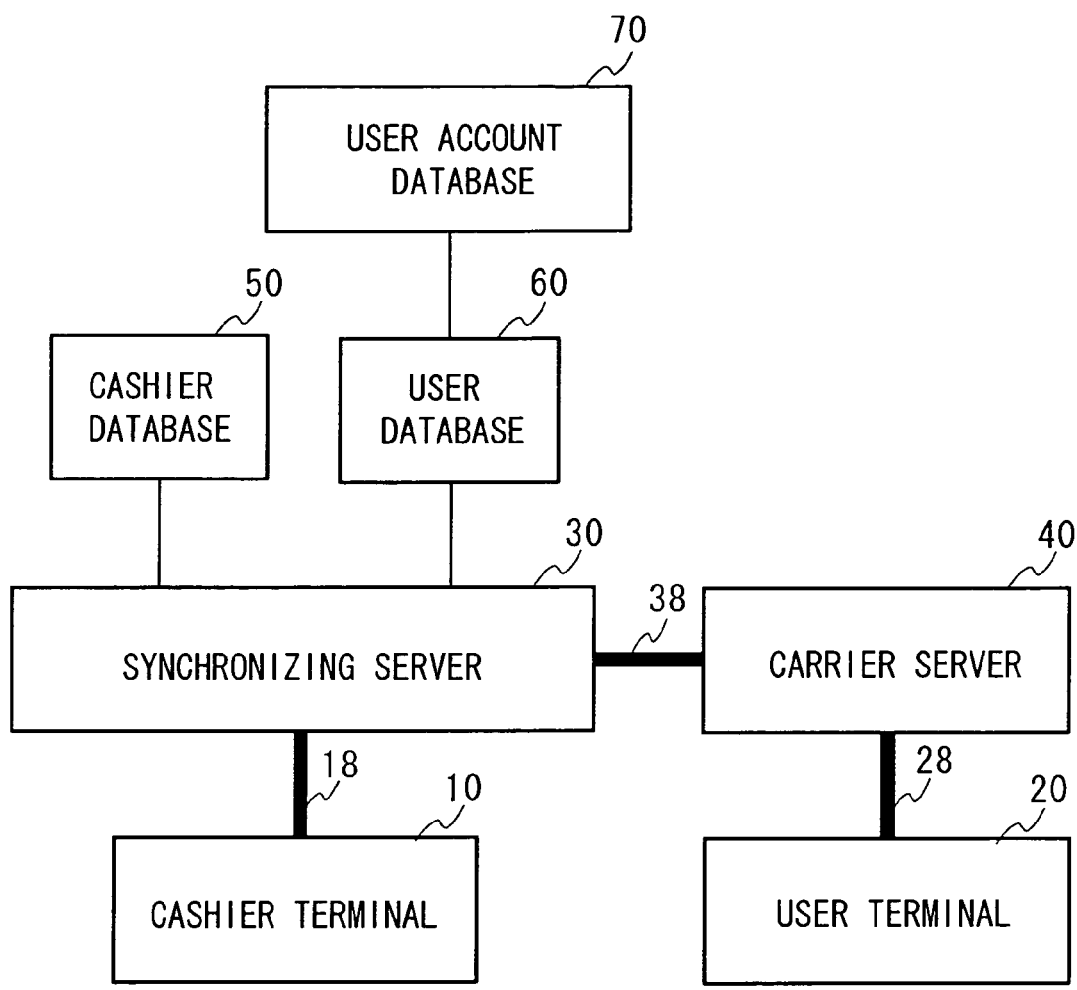
FIG. 1 is a block diagram showing a configuration of an electronic settlement system of a first embodiment of the present invention.

FIG. 1 is a block diagram showing a configuration of an electronic settlement system of the present embodiment. The electronic settlement system of the present embodiment has a cashier terminal 10 as an example of a billing terminal, a user terminal 20 as an example of a paying terminal, a synchronizing server 30 as an example of a settlement device, a carrier server 40, a cashier database 50 as an example of a billing terminal database, a user database 60 as an example of a paying terminal database, and a user account database 70.

A transmission line 18, which is a communication path to connect the cashier terminal 10 with the synchronizing server 30, may be either a commercial telephone line or a private line. A radio communication channel 28 is a transmission path of a radiotelephone communication to connect a user terminal 20 with a carrier server 40. A transmission path 38 is a communication path to connect the carrier server 40 with the synchronizing server 30, and may be either a commercial telephone line or a private line.

Figure 2:
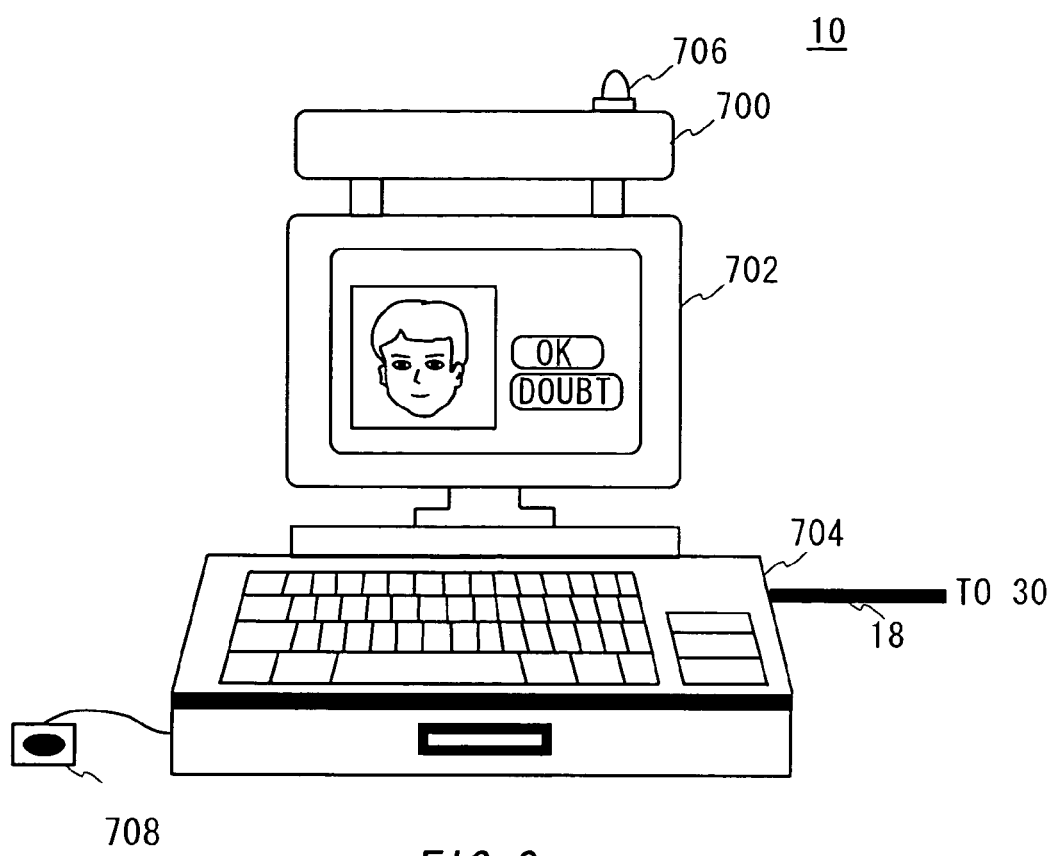
FIG. 2 shows a configuration of a cashier terminal 10.

The cashier terminal 10 calculates a purchase amount of items that the user purchased in the retailer's shop, and charges the user the purchase amount. FIG. 2 shows a configuration of a cashier terminal 10. The cashier terminal 10 has a user-side indicating unit 700, a clerk-side indicating unit 702, a cashier body 704, a synchronization indicator 706, and an infrared communicating unit 708. The cashier terminal 10 also has a communicating function connecting to the synchronizing server 30 via a commercial telephone line or a private line, which is not shown in the figure.

The user-side indicating unit 700 has a display screen on the opposite side to the clerk which is a back side of the cashier terminal 10 made with liquid crystal or LCD in order to display character information. The user-side indicating unit 700 displays a purchase amount, a "transaction ID" described in following, and so on, and notifies information to the user. The clerk-side indicating unit 702 indicates a process calculating purchase amount, an electronic settlement process, and soon. The synchronization indicator 706 is a light that glows in order to indicate an establishment of "synchronizing status", which is described in the following, when the synchronization is established. The infrared communicating unit 708 communicates data via infrared communication to an infrared communication unit 808 of the user terminal 20.

The user terminal 20 directs the user to pay a value of the merchandise using credit means such as a credit card or a bankcard. An example of the user terminal 20 is a radiotelephone communication means such as a cellular phone. Another example of the user terminal 20 is a portable terminal such as a PDA or a notebook type personal computer and so on, which may communicate by connecting to a radio communication means such as a cellular phone.

Figure 3:
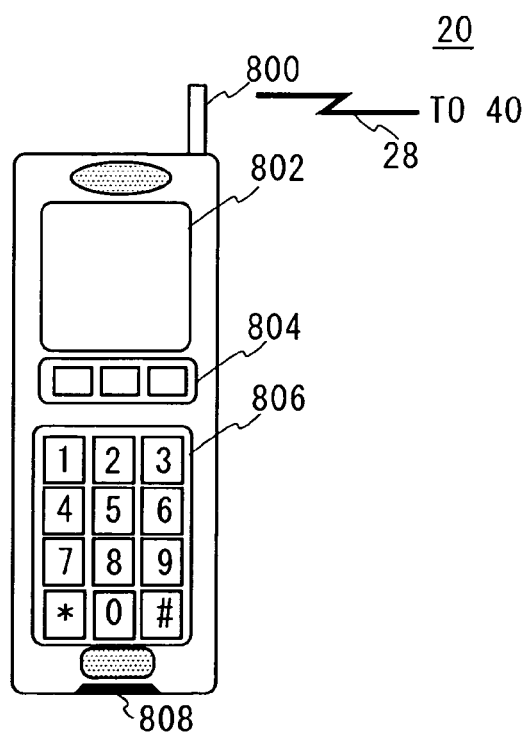
FIG. 3 shows a configuration of a cellular phone as an example of a user terminal 20.

FIG. 3 shows a configuration of a cellular phone as an example of a user terminal 20. The user terminal 20 has an antenna 800, a display unit 802, a console unit 804, a keypad 806, and an infrared communication unit 808. The user terminal 20 communicates to the carrier server 40 through the antenna 800 via a radio communication channel 28. The user terminal 20 has a data packet communication facility and may transmit and receive digital data. The display unit 802 displays character information and image information transmitted and received by the data packet communication facility. Using the console 804, a menu or buttons displayed on the display unit 802 is selected. The keypad 806 provides buttons to input telephone numbers, a password, and so on. Using the infrared communication unit 808, data is transmitted to the infrared communicating unit 708 of the cashier terminal 10.

The user terminal 20 connects to the carrier server 40 via the radio communication channel 28. The carrier server 40 connects to the synchronizing server 30 via the transmission line 38. Therefore, the user terminal 20 communicates with the synchronizing server 30.

The synchronizing server 30 performs a settlement processing in a transaction between the retailer and the user. The synchronizing server 30 connects to the cashier database 50 for accumulating information from the cashier terminal 10, the user database 60 for accumulating information from the user terminal 20, and the user account database 70 for accumulating information of the credit account or the bank account of users; and searches each database and retrieves the information. The synchronizing server 30, the cashier database 50, the user database 60, and the user account database 70 may be arranged in a network of a credit company or a bank network. However, only the user account database 70 may be arranged in the network of a credit company or the bank network whereas the synchronizing server 30 may be connected to the user account database 70 via the private line.

The synchronizing server 30 connects to the cashier terminal 10 and the user terminal 20, and performs data communication there among. The cashier terminal 10 does not directly communicate with the user terminal 20.

The synchronizing server 30 acquires information about the billing of a commodity transaction by communication to the cashier terminal 10, acquires information about the paying of a commodity transaction by communication to the user terminal 20, and processes the settlement in transactions between the cashier terminal 10 and the user terminal 20 by synchronizing the communication to the cashier terminal 10 with the communication to the user terminal 20.

Figure 4:
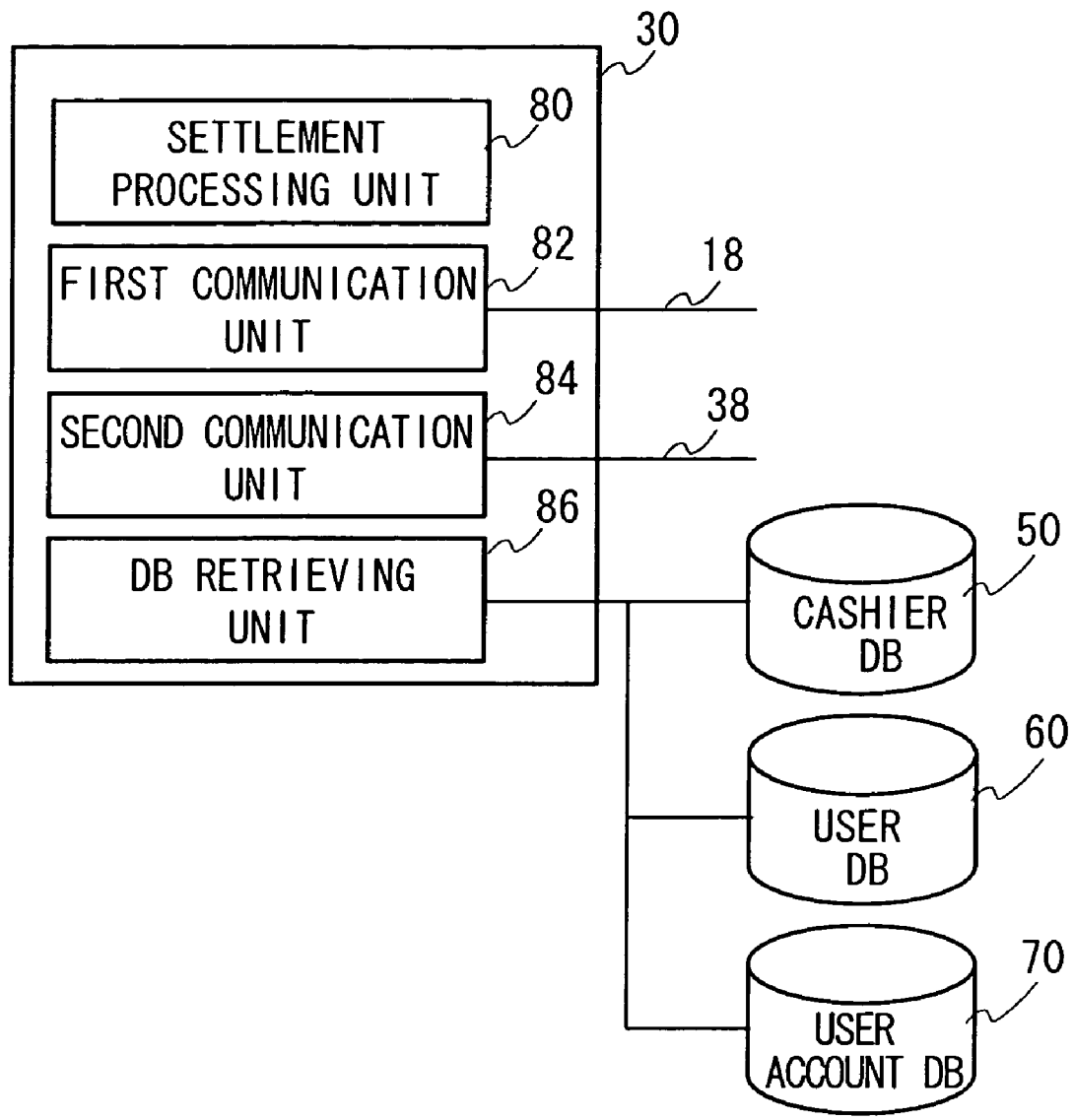
FIG. 4 is a schematic diagram showing a configuration of a synchronizing server 30.

FIG. 4 is a configuration figure of the synchronizing server 30. The synchronizing server 30 has a settlement processing unit 80, a first communication unit 82 for processing data communications via the transmission line 18, a second communication unit 84 for processing data communications via the transmission line 38 and the radio communication channel 28, a cashier database 50, and a database retrieving unit 86 which accesses the user database 60 and the user account database 70 and retrieves information from those databases.

A configuration of a "synchronizing settlement" and a "synchronizing authentication" using the electronic settlement system of the present embodiment is described as follows.

A "synchronizing settlement" is a method that does not directly communicate between the cashier terminal 10 and the user terminal 20, but rather processes a transaction settlement between the cashier terminal 10 and the user terminal 20, by synchronizing communication in real-time between the cashier terminal 10 and the user terminal 20 via the synchronizing server 30 which communicates with both the cashier terminal 10 and the user terminal 20.

In the electronic settlement system, transaction settlements are performed between a plurality of cashier terminals 10 and a plurality of user terminals 20. Accordingly, the synchronizing server 30 specifies the cashier terminal 10 billing a certain transaction and the user terminal 20 paying for the transaction, and then synchronizes the communication between the cashier terminal 10 and the user terminal 20, so that it processes the transaction of settlement between the cashier terminal 10 and the user terminal 20.

In order to synchronize the communication to the cashier terminal 10 with the communication to the user terminal 20, a transaction ID is defined as an example of a transaction identifying number in order to identify a certain transaction. Whenever a cashier terminal 10 connects to and communicates with the synchronizing server 30, the synchronizing server 30 defines a transaction ID, and transmits it to the cashier terminal 10. The cashier terminal 10 indicates the transaction ID received from the synchronizing server 30 on a user-side indicating unit 700, and shows the user the transaction ID.

The user, using the user terminal 20, inputs the shown transaction ID, and transmits the transaction ID to connect to the synchronizing server 30. If the transaction ID received from the user terminal 20 matches a transaction ID of one of the plurality of cashier terminals 10 which have already issued transaction ID, the synchronizing server 30 allows the user terminal 20 to synchronize with the cashier terminal 10 and to communicate with each other. If a matching transaction ID is not able to be found, the user terminal 20 is not allowed to synchronize with any cashier terminals 10. Thus, for a certain transaction identified by the transaction ID, the synchronizing server 30 specifies the cashier terminal 10 billing the transaction and the user terminal 20 paying for the transaction by means of the transaction ID, synchronizes the communication between the cashier terminal 10 and the user terminal 20, and processes the settlement. Therefore, the settlement of transactions is performed between the cashier terminal 10 and the user terminal 20 without a direct communication there between.

A system of a "synchronizing authentication" will be explained in the following. Here, as an example, a case where a clerk using a cashier terminal 10 authenticates if the user of a user terminal 20 is the owner of the user terminal 20, will be explained. A "synchronizing authentication" is an authentication method where the cashier terminal 10 authenticates the user of the user terminal 20 by synchronizing a communication to the cashier terminal 10 with that to the user terminal 20 via the synchronizing server 30, which communicates with both the cashier terminal 10 and the user terminal 20. But the cashier terminal 10 does not communicate to the user terminal 20 directly, and the user terminal 20 does not communicate with the cashier terminal 10 directly. Between the cashier terminal 10 and the user terminal 20, information about the authentication is not transmitted directly to each other.

A cellular phone, as an example of a user terminal 20, has a predetermined calling telephone number unique for each cellular phone, so that the predetermined calling telephone number is used with every dialing. The calling telephone number is unique to each cellular phone, and any other cellular phone is not able to make a phone call with the same calling telephone number. Therefore, as long as the original owner uses a certain cellular phone, the calling telephone number of a cellular phone may be used for specifying a user identification. That is, a cellular phone may work as an ID like a driving license.

Concerning a case where the owner of a cellular phone lost his or her cellular phone and someone else uses the lost cellular phone, the cellular phone may be uniquely specified with the calling telephone number, but the user of the cellular phone may not be specified to the owner of the cellular phone. The electronic settlement system stores data corresponding to a calling telephone number of each cellular phone with the information of the owner of each cellular phone in the user database 60, and authenticates if the user of a cellular phone is the actual owner.

When the synchronizing server 30 connects to the user terminal 20, the synchronizing server 30 detects a calling telephone number of the user terminal 20, retrieves the user database 60 based on the calling telephone number, extracts information about the user, and authenticates the user. There are several types of authentication method, such as visual authentication, password authentication, voice authentication, and soon. These authentication methods may be combined with each other.

When using a visual authentication, the synchronizing server 30 retrieves a facial portrait data of the user from the user database 60, transmits to the cashier terminal 10, and prompts the clerk to authenticate if the user is the original owner. When using the password authentication, the synchronizing server 30 retrieves password information from the user database 60, transmits a password demanding instruction to the user terminal 20, and prompts the user to input the password from the user terminal 20 and to transmit the password to the synchronizing server 30. The synchronizing server 30 inquires about the transmitted password and the password registered in the user database 60, and transmits an authentication result to the cashier terminal 10. When using the voice authentication, in place of a password, voice data where the user speaks a predetermined word is recorded in a database in advance, the synchronizing server 30 prompts the user to input the vocalized voice data of the registered word from the user terminal 20, and prompts the user to transmit to the synchronizing server 30.

Furthermore, when the visual authentication alone is not enough, an accuracy of the authentication can be improved by multiple authentications combined with another authentication method such as the password authentication.

Applying the "synchronizing authentication", the cashier terminal 10 and the user terminal 20 do not communicate directly with each other. Thus, secret information such as a password is not sent between the cashier terminal 10 and the user terminal 20. The synchronizing server 30, which communicates with both the cashier terminal 10 and the user terminal 20, mediates the authentication processing. Thus, the clerk who uses the cashier terminal 10 can authenticate the user who uses the user terminal 20 indirectly. Therefore, the user, without telling security information such as a password to the clerk, nor transmitting password data and so on from the user terminal 20 to the cashier terminal 10, can authenticate himself or herself. The authentication of the user can be performed without a leak of the user's personal information. In case the data sent between the user terminal 20 and the synchronizing server 30 is stolen by wiretapping and so on, for example, because the personal information is not sent at all, no problem occurs.

Combining the "synchronizing settlement" with the "synchronizing authentication" may realize in an electronic settlement system that ensures security, privacy protection, and a reliability at high level. Furthermore, a cellular phone or a portable terminal connecting for data communication with a cellular phone and so on has a portability, that is the user may take the terminal anywhere, and a simplicity, that is the user may communicate with a network via radio telephone communication from anywhere. Therefore, an electronic settlement system of the present embodiment enables to realize an electronic settlement with high reliability, security, and convenience.

Figure 5:
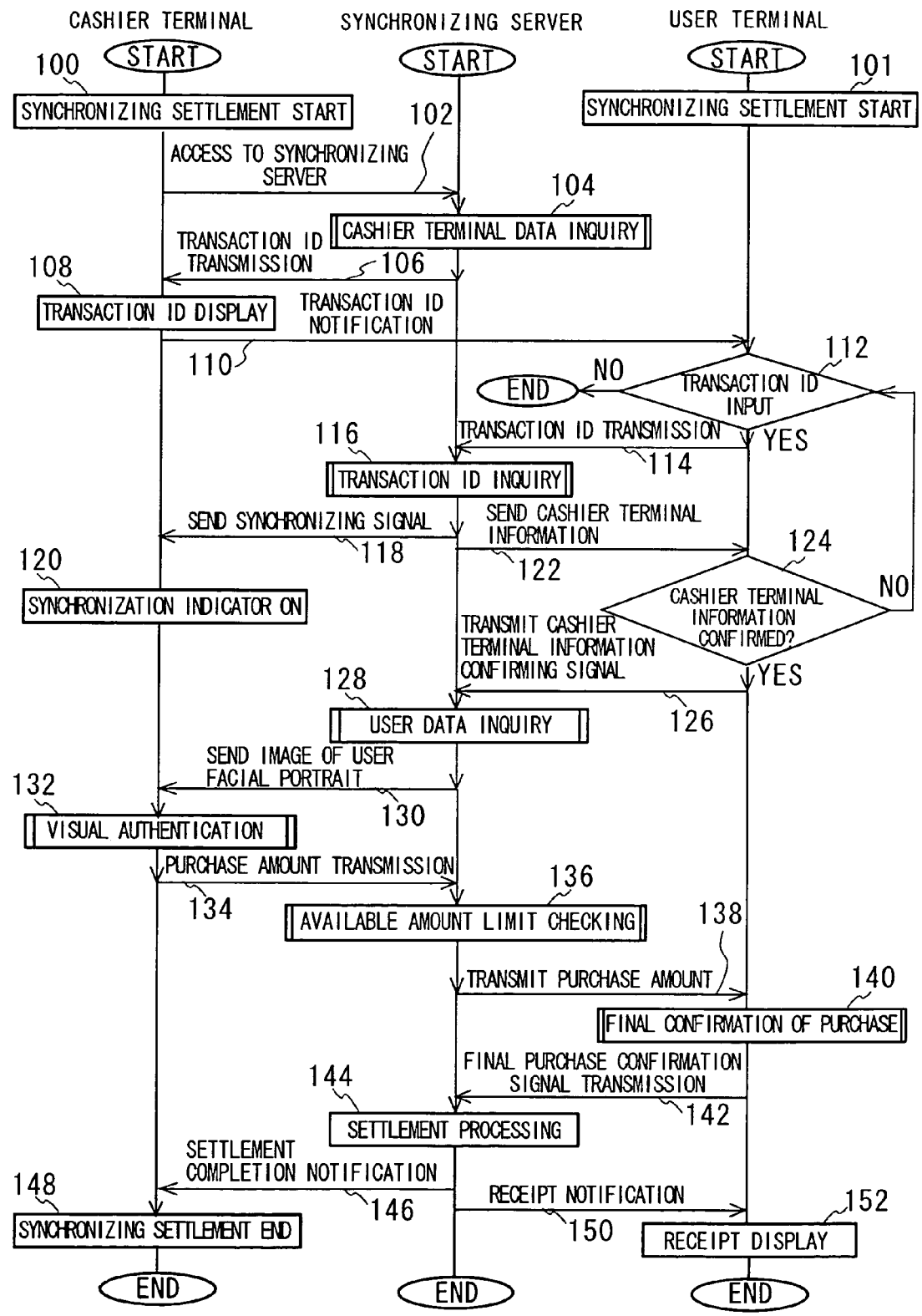
FIG. 5 is a flow chart showing a settlement processing in an electronic settlement system of the first embodiment.
Figure 10:
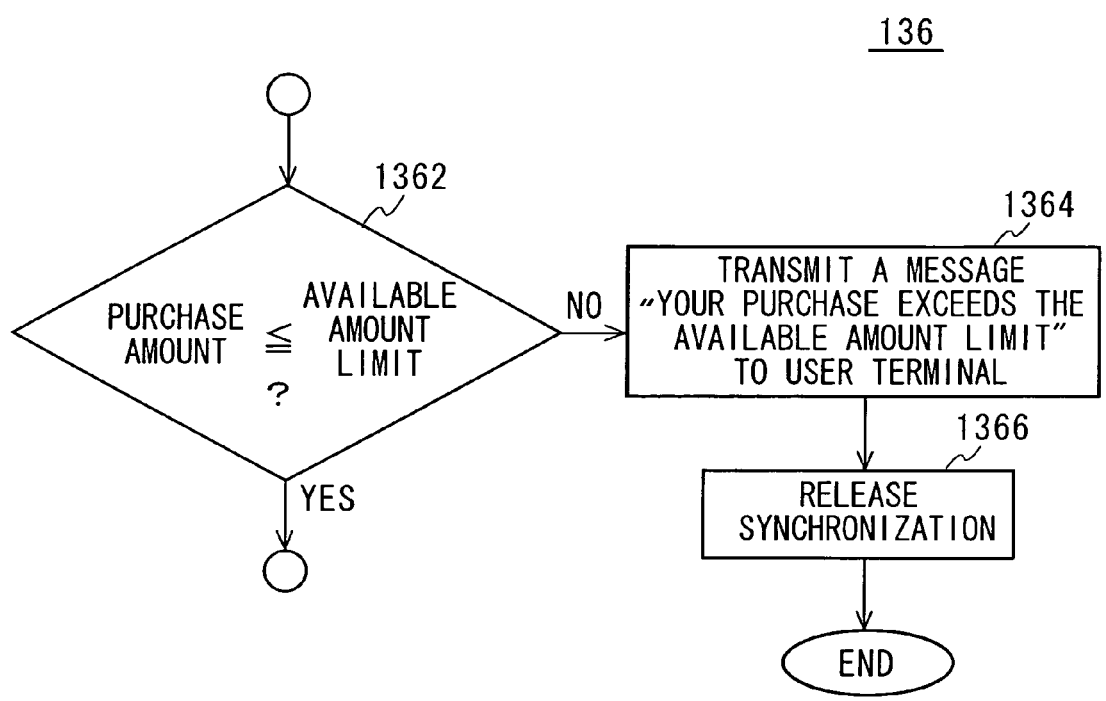
FIG. 10 is a flow chart showing an available amount checking 136 processing.
Figure 11:
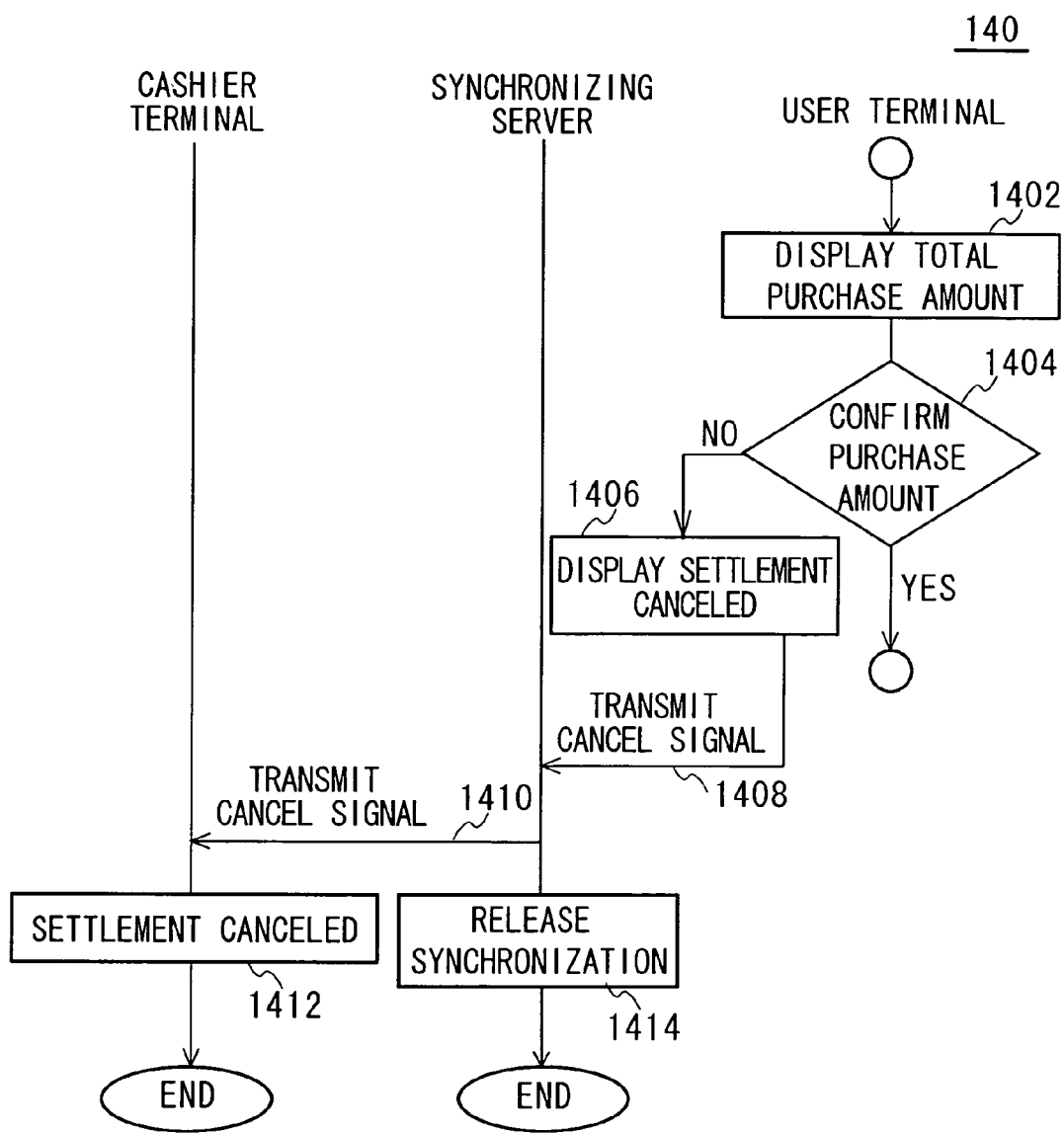
FIG. 11 is a flowchart showing a final purchase confirmation 140 processing.
Figure 12:
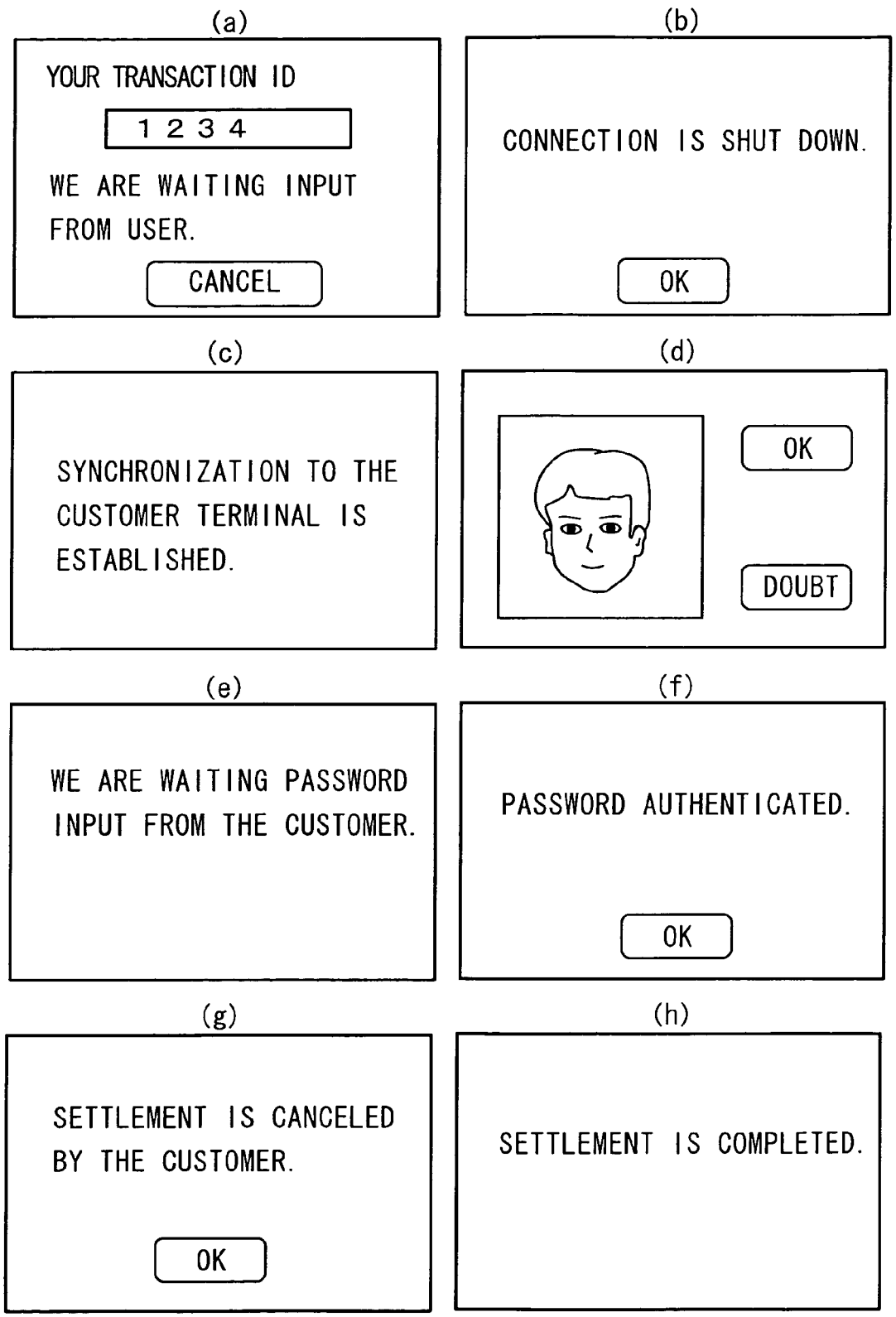
FIG. 12 shows an example of information indicated on a display unit 702 of a cashier terminal 10.
Figure 13:
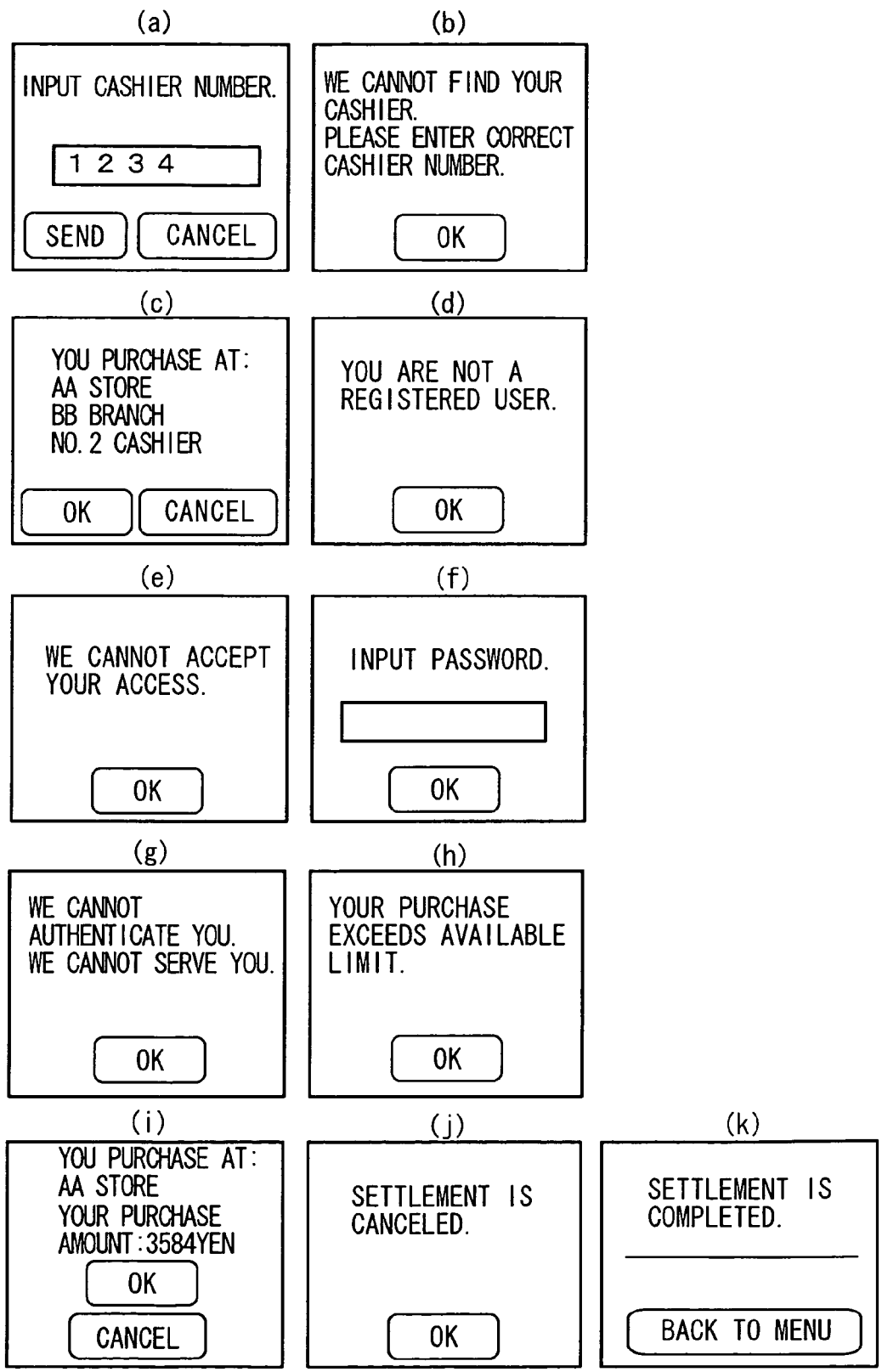
FIG. 13 shows examples of information indicated on a display unit 802 of a user terminal 20.

Referring to FIG. 5 to FIG. 13, processing of the electronic settlement in which a user settles a payment with the electronic settlement system of the present embodiment using a user terminal is described as follows. FIG. 5 is a flow chart showing a settlement processing in an electronic settlement system of the first embodiment. FIG. 5 is a flow chart showing the settlement processing between the cashier terminal 10, the user terminal 20, and the synchronizing server 30 in chronological order. Information interaction between the cashier terminal 10, the user terminal 20, and the synchronizing server 30 is indicated using arrows in a lateral direction. FIG. 6 to FIG. 11 are flow charts showing processing of details in FIG. 5. FIG. 12 is an example of information displayed on the clerk-side indicating unit 702 of a cashier terminal 10. FIG. 13 is an example of information displayed on a display unit 802 of a user terminal 20.

In the following, except a case where special notification is made, the interaction of information between the cashier terminal 10 and the synchronizing server 30 is performed via a communication line 18, and the interaction of information between the user terminal 20 and the synchronizing server 30 is performed via a radio communication channel 28 and a communication line 38. An access method from the cashier terminal 10 to the synchronizing server 30 may be either a method of a dial up access from the commercial telephone line or a method of access to a server gate via a private line. An access method from the user terminal 20 to the synchronizing server 30 is, when the user uses a cellular phone as a user terminal 20, performed via a radiotelephone communication.

Referring to FIG. 5, the settlement processing is described in the following. A user purchases an item from a retailer, and pays the value of the merchandise at a cashier over the counter. First, the user chooses an electronic settlement. The clerk, at the user's request of electronic settlement, chooses the electronic settlement menu on the cashier terminal 10, and the electronic settlement starts (100). The cashier terminal 10 accesses the synchronizing server 30 (102). The cashier terminal 10 transmits a cashier registration number which is unique to each cashier terminal when the cashier terminal 10 accesses the synchronizing server 30.

The synchronizing server 30, corresponding to access from the cashier terminal 10, starts to connect the cashier terminal 10, and inquires the cashier terminal information based on the cashier registration number transmitted from the cashier terminal 10 (104).

Figure 6:
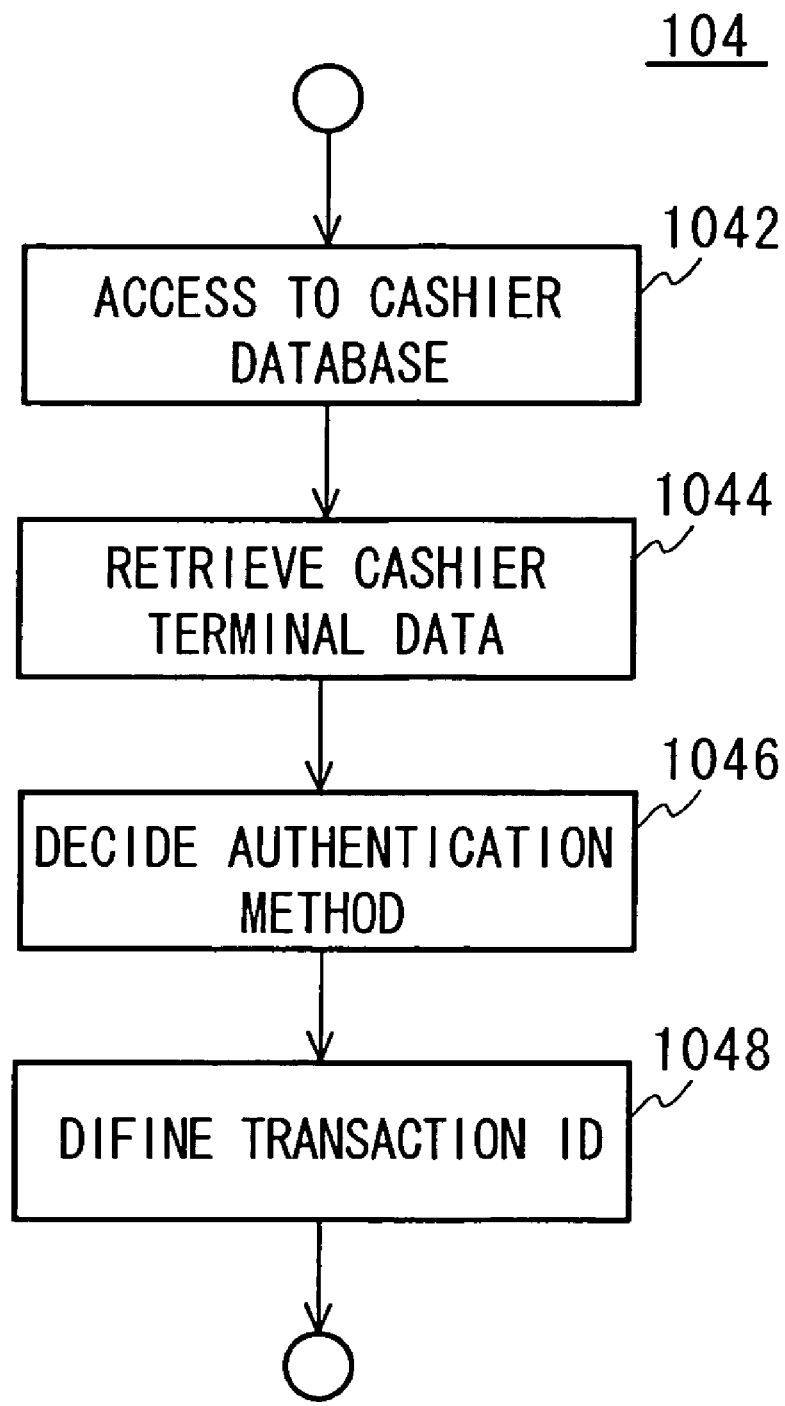
FIG. 6 is a flow chart showing cashier terminal information inquiry 104 processing.

Referring to FIG. 6, the cashier terminal information inquiry 104 processing will be described. The synchronizing server 30 accesses the cashier database 50 (1042) and retrieves the cashier terminal information of a cashier terminal matching to the cashier registration number (1044). A name of a retailer, a name of a shop, an authentication method, and so on are registered in the cashier terminal information. The authentication method may be chosen from a visual authentication method, a password authentication method, and so on. The cashier terminal information includes authentication methods to be used. The synchronizing server 30 decides to adopt the authentication method registered in the cashier terminal information (1046). Here, a case in which it was decided that a visual authentication method is to be adopted as an authentication method is described as follows. Furthermore, the synchronizing server 30 allocates a transaction ID to the cashier terminal 10 (1048). The transaction ID is a number for identify the settlement which is going to be processed by the cashier terminal 10.

The transaction ID may be a sequence of numbers, for example, created by random number generation. For convenience of input from the user terminal 20, the transaction ID is preferably the smallest digit possible. On the other hand, the same cashier terminal identifying number could be allocated on a plurality of cashier terminals 10 or user terminals 20; in such a case, the synchronizing server 30 is not able to correspond a cashier terminal 10 to the user terminal 20 for the transaction. For that reason, the transaction ID is allocated in the way that the same transaction ID does not be used twice or more in a predetermined period. On the other hand, the same transaction ID may be used again after the predetermined period. Thus, without increasing the digits of the transaction ID, uniqueness of the transaction ID may be maintained.

The synchronizing server 30 further has a function that limits the allocation of a transaction ID, which does not issue a transaction ID the same as the transaction ID on the "access wait" status; so that prevention of competition of a transaction ID is ensured.

When a retailer has two or more branches, transaction IDs created by random number generation may compete with each other. In such a case, in order to avoid the competition of numbers allocated by two or more branches, the range of the generated random numbers for transaction IDs allocated to each branch may be limited.

Therefore, a transaction ID, even though it is a number for identifying transactions, does not need to be a large digit number such as a purchase ID, which is a number unique to every transaction; but needs to be a digit small enough to keep the uniqueness only for a certain period.

Referring back to FIG. 5, processing after the cashier terminal information inquiry 104 will be described in the following. The synchronizing server 30 delivers the transaction ID to the cashier terminal 10 (106). Here, the synchronizing server 30 is on an "access wait" status that is waiting for the user terminal 20 to access using this transaction ID. On the other hand, the cashier terminal 10 that delivered the transaction ID is defined as being on a "synchronization waiting" status.

The cashier terminal 10 displays the transaction ID transmitted from the synchronizing server 30 on a user-side indicating unit 700 (108). The cashier terminal 10 displays information shown in FIG. 12 (*a*), so that not only the transaction ID, but also the user terminal is on the "synchronization wait" status which waits while the user terminal accesses the synchronizing server 30 using the transaction ID, is indicated. The clerk notifies the transaction ID displayed on the cashier terminal 10 to the user (110). The clerk may orally tell the user the transaction ID. Alternatively, the clerk may show the transaction ID displayed on the user-side indicating unit 700 of the cashier terminal 10.

The clerk may cancel the settlement processes by choosing "cancel" from the information displayed as in FIG. 12 (*a*). This cancel processing may be used when the user terminal 20 is not able to access the synchronizing server 30 because of poor radio conditions and so on, or the transmission is performed normally, but the synchronizing server 30 is not able to establish the synchronization even though the transaction ID is transmitted from the user terminal 20.

Information for inputting a "transaction ID" as shown in FIG. 13 (*a*) is displayed on the user terminal 20. The user inputs the transaction ID notified from the clerk (112). The user chooses the "transaction ID" of input information, and the transaction ID is transmitted to the synchronizing server 30 (114). The user may choose "cancel" in this processing to cancel the settlement processing and finish the processing. This cancellation processing may be used in a case where the settlement processing may not be performed even when inputting a transaction ID correctly, caused by a communicating disorder and so on.

The synchronizing server 30 receives the transaction ID transmitted from the user terminal 20, and makes an inquiry to the transaction ID (116).

A "synchronization" of the cashier terminal 10 with the user terminal 20 produced by the inquiry of the transaction ID is described in the following. First, the synchronizing server 30 is on an "access wait" status, which is waiting to be accessed by the user terminal 20 and waiting for the transaction ID to be sent. On this "access wait" status, if a user terminal 20 using the same transaction ID to be allocated to the cashier terminal 10 accesses, the synchronizing server 30 establishes one to one "synchronization" status between that cashier terminal 10 and the user terminal 20, and realizes a synchronization of the communication to the cashier terminal 10 with the communication to the user terminal 20. Access from a plurality of the user terminals 20 does not be matched to one cashier terminal 10 for one transaction ID.

A time out limit is set up for the "access wait" status of the synchronizing server 30, and limits the access wait period with the user terminal 20 to a predetermined length, for example, 3 minutes. When no answer from the user terminal 20 is obtained for the transaction ID issued for a predetermined period, the synchronizing server 30 shuts down the connection to the cashier terminal 10, and initializes it. This time out function is set up in order to avoid trouble for cases where a user cancels the processing or that a communicating condition of the user terminal 20 with the synchronizing server 30 is poor so that data communication is not able to be performed normally, and so on.

Figure 7:
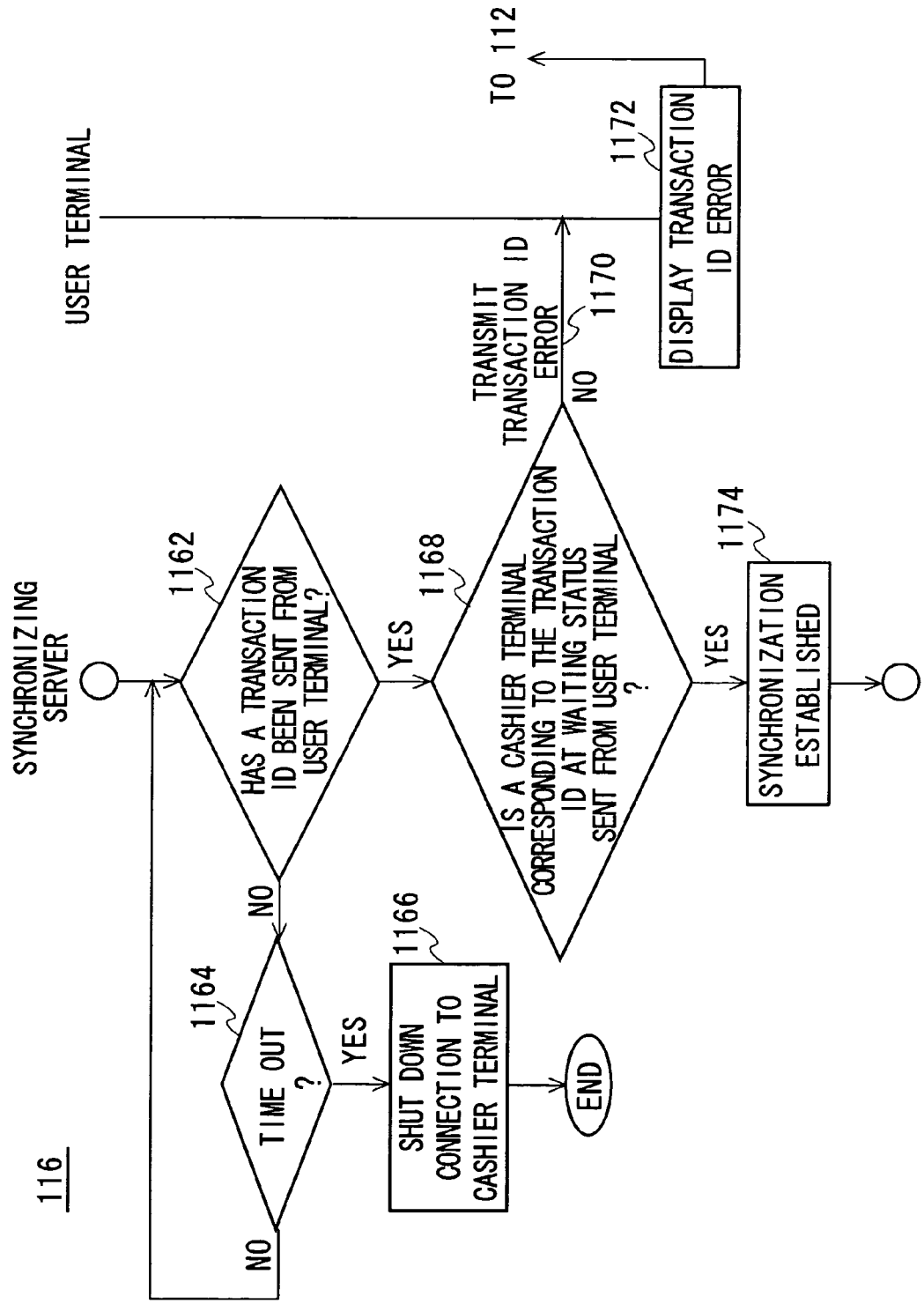
FIG. 7 is a flow chart showing a transaction ID inquiry 116 processing.

Referring to FIG. 7, the transaction ID inquiry 116 processing is described. As shown in FIG. 7, the synchronizing server 30 on the "access wait" status checks if access from the user terminal 20 has existed, and if a transaction ID confirming signal has been sent from the user terminal 20 (1162). If there has been no access, it checks if it exceeds the time out limit (1164), in case it exceeds, shuts the connection to the cashier terminal 10 down (1166), and finishes the processing. Then, information shown in FIG. 12 (b), which indicates the forced termination of the connection, is displayed on the cashier terminal 10.

When the user terminal 20 transmits the transaction ID, it is checked whether a cashier terminal 10 on the "synchronizing wait" status corresponding to that transaction ID is found (1168), if not, it transmits a synchronizing error message to the user terminal 20 (1170). The user terminal 20 displays the synchronizing error message shown in FIG. 13 (b) on the display (1172). If the user chooses "OK" here, it goes back to the processing 112, the user terminal 20 displays the information shown in FIG. 13 (a) again, and re-input of the transaction ID is prompted to the user.

When a cashier terminal 10, which corresponds to the transaction ID transmitted from the user terminal 20, is found and is on the "synchronizing wait" status, the synchronizing server 30 establishes a "synchronizing" status of the cashier terminal 10 with the user terminal 20 and synchronizes the communication to the cashier terminal 10 with the communication to the user terminal 20 (1174).

Referring back to FIG. 5 again, when the synchronization is established, the synchronizing server 30 sends a synchronizing signal to the cashier terminal 10 (118). The cashier terminal 10 receives the synchronizing signal from the synchronizing server 30 and lights a synchronization indicator 706 in the cashier terminal 10 (120). With this indicator, the clerk may tell if the synchronization is established.

When the synchronization is started, the synchronizing server 30 sends to the user terminal 20 the cashier terminal information retrieved from the cashier database 50 in the cashier terminal information inquiry 104. The user terminal 20 displays the information shown in FIG. 13 (c), and prompts the user to confirm the synchronized cashier terminal (124). When the user chooses "cancel", the processing goes back to the input of the transaction ID 112 processing. This cancellation is used when the user inputted an incorrect transaction ID and synchronizes with an incorrect cashier, so that the settlement processing needs to be canceled and so on.

When the user chooses "OK" in FIG. 13 (c) displayed on the user terminal 20 and confirms the cashier terminal information, the user terminal 20 transmits a cashier terminal information confirmation signal to the synchronizing server 30 (126). The synchronizing server 30, receiving the cashier terminal information confirmation signal transmitted from the user terminal 20, performs the user information inquiry 128 processing.

Figure 8:
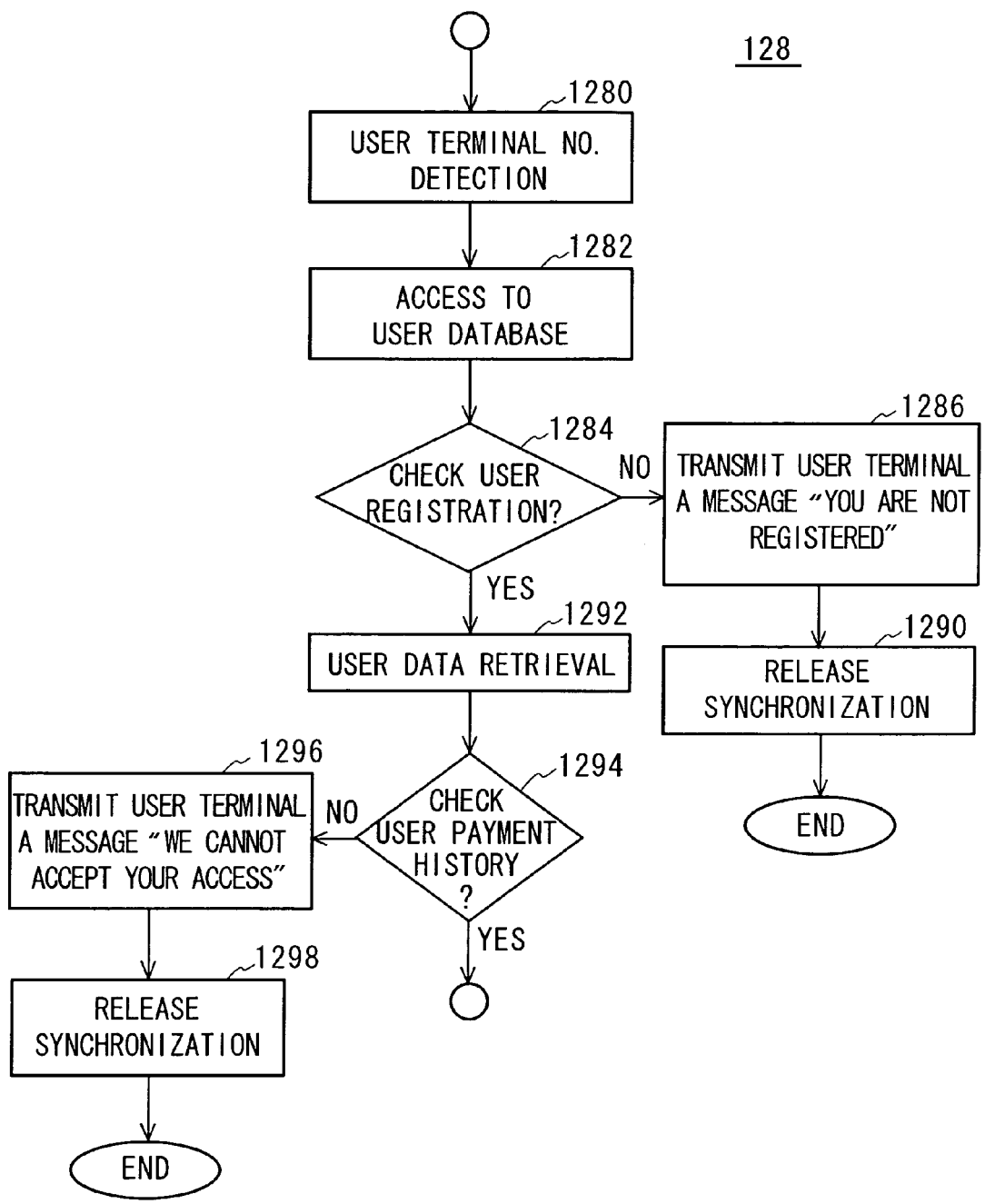
FIG. 8 is a flow chart showing a user data inquiry 128 processing.

Referring to FIG. 8, the processing of the user data inquiry 128 will be described. The synchronizing server 30 retrieves a user terminal number from a user terminal 20 (1280). When the user terminal 20 is a cellular phone, a user terminal number is the calling telephone number. The synchronizing server 30 accesses the user database 60 (1282) and checks if the user terminal 20 is registered based on the user terminal number (1284). When the user terminal is not registered, the synchronizing server 30 transmits to the user terminal 20 a message "you are not registered." (1286). Information, notifying that the user does not have user registration, shown in FIG. 13(d), is displayed on the user terminal 20. The synchronizing server 30 releases the synchronization of the cashier terminal 10 with the user terminal 20 (1290) and finishes the processing.

The synchronizing server 30 may detect the calling telephone number of the user terminal 20 when the user chooses the synchronizing settlement menu in the user terminal 20 and the user terminal 20 makes the first access to the synchronizing server 30. In another case, the synchronizing server 30 may detect the calling telephone number of the user terminal 20, when the user inputs the transaction ID to the user terminal 20 and the user terminal 20 transmits the transaction ID to the synchronizing server 30.

When the user registration is verified, user data is retrieved from the user database 60 (1292). Information about the payment history of the user is recorded in the user data. If the user has a problem with his or her payment history on his or her credit card or his or her bankcard and so on, it is checked based on the information (1294). When any problem is found in his or her payment history, a message "we cannot accept your access." is transmitted to the user terminal 20 (1296). Information notifying that settlement is rejected, shown in FIG. 13 (e), is displayed on the user terminal 20. The synchronizing server 30 releases the synchronization of the cashier terminal 10 with the user terminal 20 (1298) and finishes the processing.

When the user has no problem with his or her credit history, the synchronizing server 30 advances to the next processing. Referring back to FIG. 5, the synchronizing server 30 performs a "synchronizing multiple authentication" based on the cashier terminal information inquiry 104. The synchronizing multiple authentications is an authentication having a plurality of authentication stages and is performed between the cashier terminal 10 and the user terminal 20. The synchronizing server 30 performs the synchronizing multiple authentications after the synchronization is established with both the cashier terminal 10 and the user terminal 20. Between the cashier terminal 10 and the user terminal 20, information for authentication is not sent directly to each other, but the information for authentication is sent between the cashier terminal 10 and the synchronizing server 30, and between the user terminal 20 and the synchronizing server 30. Because the synchronizing server 30 intermediates the authentications, the clerk may authenticate the user of the user terminal 20 with no exchange of personal information between the user and the clerk.

The synchronizing multiple authentication processing is described in a case where the visual authentication is adopted in the cashier terminal information inquiry 104. The synchronizing server 30 retrieves a user facial portrait image from the user database 60 in the user information inquiry 128, and transmits the facial portrait image data to the cashier terminal

10 (130). The cashier terminal 10 receives the user facial portrait image data from the synchronizing server 30, and performs the visual authentication (132).

Figure 9:
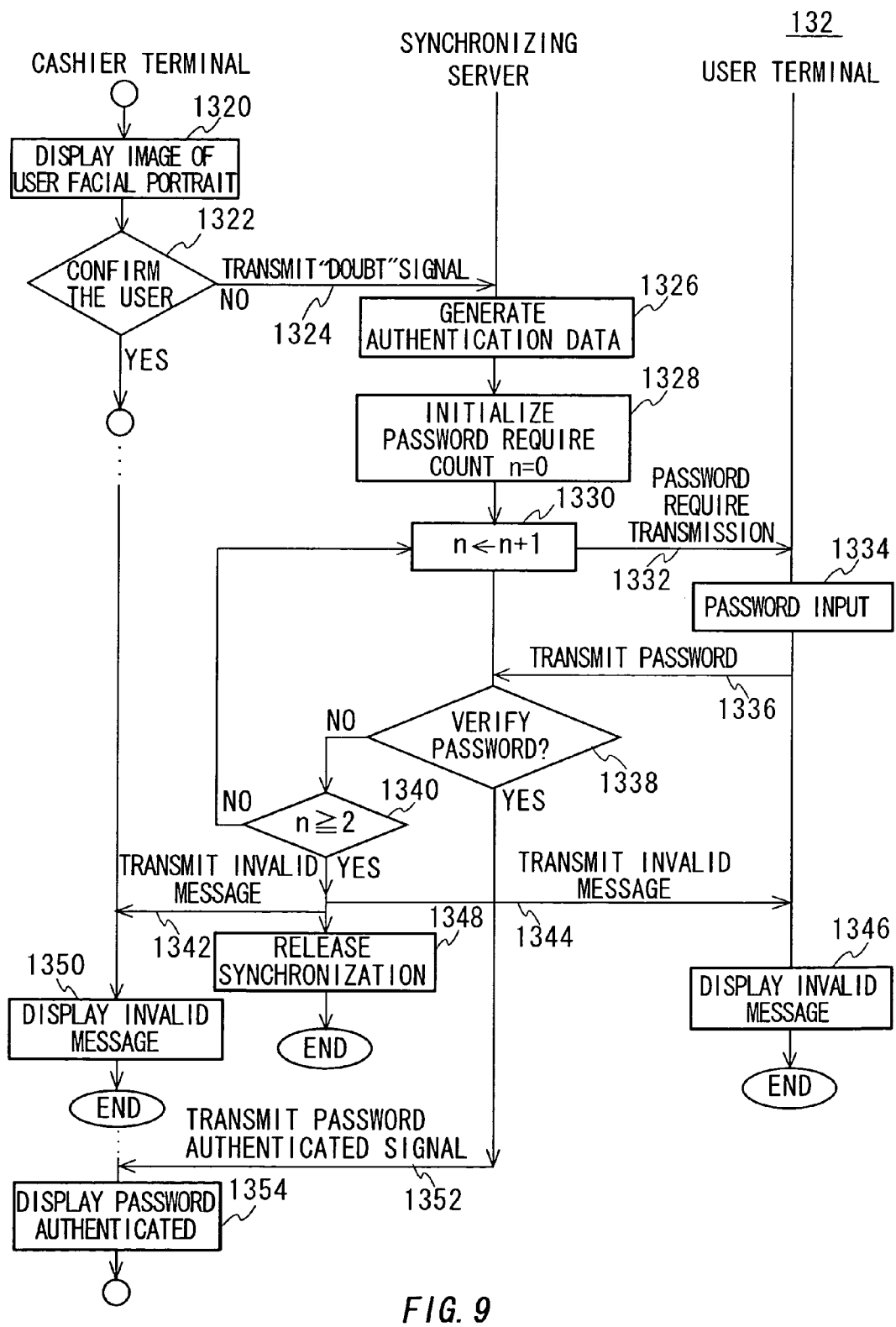
FIG. 9 shows a flow chart of a visual authentication 132 processing.

FIG. 9 shows the visual authentication 132 processing. The cashier terminal 10 displays a facial portrait image of the user (1320). FIG. 12 (*d*) shows an example of information displayed on the cashier terminal 10. The clerk verifies the user and the displayed facial portrait, and authenticates the user (1322). When the clerk is not able to ensure the user authentication or the payment is expensive, the clerk chooses "DOUBT" as displayed in FIG. 12 (*d*), and the cashier terminal 10 transmits a DOUBT signal to the synchronizing server 30 (1324). In this case, the cashier terminal 10 displays information that shows the password authentication is being processed such as shown in FIG. 12 (*e*). When the clerk chooses "OK" as displayed in FIG. 12 (*d*), the visual authentication 132 processing is completed.

In order to perform the password authentication, the synchronizing server 30, receiving the "DOUBT" signal from the cashier terminal 10, retrieves data necessary for authentication from the user database 60 and generates authentication data (1326). The synchronizing server 30 initializes a password require count variable n, which stores the password require count, to 0 (1328). The synchronizing server 30 increments n to n+1 (1330) and transmits a password request message to the user terminal 20 (1332). Information shown in FIG. 13(*f*) is displayed on the user terminal 20. The user inputs the password (1334). The user terminal 20 transmits the password input by the user to the synchronizing server 30 (1336). The synchronizing server 30 receives the password transmitted from the user terminal 20 and verifies the password (1338).

When the password transmitted from the user terminal 20 is incorrect, it is checked whether the required password count n is 2 or more (1340), if not, it goes back to the processing of 1330 and requests the password again. If the required password count n is 2 or more, an invalid message is transmitted to the user terminal 20 (1344). Because the authentication is not confirmed, information shown in FIG. 13(*g*) that the settlement service is not available is displayed on the user terminal 20 (1346). On the other hand, an invalid message is transmitted to the cashier terminal 10 (1342). The cashier terminal 10 displays the information indicating that the password authentication is invalid (1350), and finishes the processing. The synchronizing server 30, after sending the invalid message to the user terminal 20 and the cashier terminal 10, releases the synchronization of the cashier terminal 10 with the user terminal 20 (1348).

In the password inquiry 1338 of the password authentication, if the synchronizing server 30 confirms the password, the synchronizing server 30 transmits to the cashier terminal 10 a password authentication OK signal (1348). The cashier terminal 10 displays information shown in FIG. 12 (*f*) indicating the completion of the password authentication (1350), and the visual authentication processing 132 is finished.

Referring back to FIG. 5, after the cashier terminal 10 finishes the visual authentication processing 132, the cashier terminal 10 transmits to the synchronizing server 30 purchase amount information, including the total purchase (134) amount. The synchronizing server 30, receiving the purchase amount information from the cashier terminal 10, performs available amount check processing 136.

Referring to FIG. 10, the processing of the available amount checking 136 will be described as follows. The synchronizing server 30 compares the purchase amount transmitted from the cashier terminal 10 with the available amount limit retrieved from the user database 60 in the user data inquiry 128 (1362). If the purchase amount does not exceed the available amount limit, the inquiry processing is finished. If the purchase amount exceeds the available amount limit, a message "your purchase exceeds your available amount limit" is transmitted to the user terminal 20 (1364). The synchronizing status of the cashier terminal 10 with the user terminal 20 is released (1366). Then, information shown in FIG. 13(*h*) is displayed on the user terminal 20.

Referring back to FIG. 5 again, the processing after the available amount checking 136 is completed will be described. The synchronizing server 30 transmits purchase amount information including the purchase amount to the user terminal 20 (138). The user terminal 20, receiving purchase amount information from the synchronizing server 30, performs the processing of the final purchase confirmation 140.

Referring to FIG. 11, the processing of the final purchase confirmation 140 will be described as follows. The user terminal 20 displays information shown in FIG. 13(*i*) in order to display the purchase amount (1402). The user confirms if the purchase amount is correct (1404). If correct, the user chooses "OK" on the display and finishes the processing of the final purchase confirmation 140. If the purchase amount is incorrect, the user chooses to "cancel". When the user chooses to "cancel", information which shows the settlement is canceled as shown in FIG. 13(*j*) is displayed on the user terminal 20 (1406), the user terminal 20 transmits a cancel signal to the synchronizing server 30 (1408). The synchronizing server 30, receiving the cancel signal from the user terminal 20, transmits a cancel signal to the cashier terminal 10 (1410). The cashier terminal 10 cancels the settlement, displays information shown in FIG. 12(*g*) which indicates that the settlement is canceled by the user, and finishes the processing (1412). The synchronizing server 30, after transmitting the cancel signal to the cashier terminal 10, releases the synchronization of the communication to the cashier terminal 10 with the communication to the user terminal 20 (1414).

Referring back to FIG. 5 again, the processing after the final purchase confirmation 140 is finished will be described. The user terminal 20 transmits a final purchase confirmation signal to the synchronizing server 30 (142). The synchronizing server 30, receiving the final purchase confirmation signal from the user terminal 20, accesses the user account database 70 and performs the settlement processing which records the purchase information (144). When the settlement is completed, the synchronizing server 30 transmits a settlement completion notification to the cashier terminal 10 (146), and transmits a receipt to the user terminal 20 (150). The cashier terminal 10 displays information shown in FIG. 12(*h*) of the completion of the settlement (148). The user terminal 20 displays information shown in FIG. 13(*k*) to show completion of the settlement (152).

In the above described settlement processing, when the synchronizing server 30 transmits the settlement completion notification 146 to the cashier terminal 10, the synchronizing server 30 may retrieve a part of the attribute information about the user of the user terminal 20 which performs the payment of the settlement from the user database 60, and may transmit the information to the cashier terminal 10. The attribute information about the user transmitted to the cashier terminal 10 preferably may be information about sex or age of a user and so on. On the other hand, personal information such as a name, an address, and a credit card number is not suitable to be included in the attribute information. The cashier terminal 10 obtains the attribute information so that the retailer may retrieve the information about the user who performed the payment of the settlement, may store the information about the item and the user data, and may form a purchase history database in the retailer's database. Thus, the retailer may detect buying behavior, such as an age group for users of a certain item from the purchase history stored in the database, so that the history may be used for marketing.

When the synchronizing server 30 receives the purchase amount of items from the cashier terminal 10, the synchronizing server 30 may also receive the name and/or price of purchased items and detailed information of purchased items. The synchronizing server 30 may store this information in the user database 60 as a user purchase history. The user terminal 20 may inquire about the user purchase history to the synchronizing server 30, and receive the user purchase history from the synchronizing server 30.

The function and action of the settlement processing for the electronic settlement system applying the present embodiment is described above. In the interaction of the above described settlement, if there is any communication trouble such as an interruption of communication, all of the information and temporally data about the processing are initialized and the processing is finished.

In the settlement processing described above, the clerk orally tells the transaction ID to the user or shows the user the transaction ID displayed on the user-side indicating unit 700 on the cashier terminal 10. But, the method to tell the transaction ID to the user or the user terminal 20 is not limited to these examples. The transaction ID received by the cashier terminal 10 may be sent from the infrared communicating unit 708 of the cashier terminal 10 to the infrared communication unit 808 of the user terminal 20. Thus, the user does not need to input a transaction ID into the user terminal 20, therefore the miss-input of the transaction ID can be avoided. Furthermore, as a means to transmit the transaction ID from the cashier terminal 10 to the user terminal 20, a radio communication unit, the cashier terminal 10, and the user terminal 20 may have a wireless communication unit as an example of a short range communicating unit, and using wireless communication for a portable terminal such as Bluetooth, sends transaction ID each other.

The cashier terminal information inquiry 104, the transaction ID inquiry 116, the user information inquiry 128, available limit inquiry 136, and the settlement processing 144, which are performed by the synchronizing server 30 in the above described settlement processing, is actually performed by the settlement processing unit 80 and data retrieving unit 86 of the synchronizing server 30.

The receiving of the access from the cashier terminal 10 102, transaction ID transmission to the cashier terminal 10 106, sending the synchronizing signal to the cashier terminal 10 118, sending the user facial portrait image to the cashier terminal 10 130, receiving the purchase amount information from the cashier terminal 10 134, and notification of the settlement completion 146, as the data communication processing of the synchronizing server 30 with the cashier terminal 10, are performed by a first communication unit 82 of the synchronizing server 30.

The receiving of the transaction ID from the user terminal 20 114, sending to the user terminal 20 the cashier terminal information 122, receiving from the user terminal 20 the cashier terminal information confirmation signal 126, transmitting to the user terminal 20 purchase amount information 138, receiving from the user terminal 20 the final purchase confirming signal 142, and the notification of receipt to the user terminal 20 150, as the data communication processing of the synchronizing server 30 with the user terminal 20, are performed by a second communication unit 84 of the synchronizing server 30.

The "synchronizing multiple authentication" applied in the electronic settlement system of the present embodiment is complemented here. The present embodiment may multiple authenticate, that is combine a plurality of the authentication methods. Applying the synchronizing multiple authentication method, the user previously registers a plurality of passwords to the user database 60. A four-digit number is usually used for a personal identification number for a credit card or a bankcard. A user often chooses a simple combination of numbers, his or her birth date, telephone number, and so on, in order not to forget. Other people may easily guess the number so that the number suffers from a false use. Applying "the synchronizing multiple authentication" method, the user previously registers a plurality of personal information not known by others such as his or her mother's maiden name, name of grandfather or grandmother, his or her domicile of origin, and so on. The synchronizing server 30 chooses at least one of the pieces of registered information, and transmits to the user terminal 20 a question which is asked to the user about the chosen registered information. Only the original owner of the user terminal 20 can answer the randomly chosen question. Thus, when the authentication using a facial portrait is not enough, further inquiries about a password or personal information are used so that the accuracy of the authentication can be improved. For the user, without using a combination of numbers difficult to remember, personal information inerrable, not known by others, and hard to forget may be used for his or her password. Because the synchronizing server 30 intermediates the authentication between the user terminal 20 and the cashier terminal 10, no password information is sent from the user terminal 20 to the cashier terminal 10. Thus, the user's password is not known by the clerk, therefore the user can use the password without suffering from a false use.

Applying the electronic settlement system of the present embodiment, the clerk of the retailer authenticates the user with facial portrait data. The clerk further requests the user to input a password and accuracy of authentication can be improved corresponding to the importance of a situation such as a doubtful case or for an expensive settlement. The user, using a portable apparatus having a wireless communication function such as a cellular phone or a portable terminal, can settle a transaction simply, conveniently, and safely.

Second Embodiment

The electronic settlement system applying a second embodiment of the present invention will be described here. In the first embodiment, the synchronizing server 30 retrieves the cashier terminal information stored in the cashier database 50, detects the authentication method appointed by the retailer or the cashier terminal 10, and authenticates the user based on the detected authentication method. In the second embodiment, the user or the user terminal 20 also may appoint the authentication method. The point that the method authenticating the user is decided, based on the authentication method the user appointed and the authentication method the cashier terminal appointed, is different from the first embodiment. The rest of the embodiment is almost the same as the first embodiment. Here, these components have the same action and construction as the first embodiment and will not be described.

FIG. 14 shows an example of cashier terminal information 6000 stored in a cashier database 50. The cashier terminal information 6000 stores a cashier registration number that identifies the cashier terminal 10, a retailer's name, the name of the store, the cashier terminal number, and the authentication method appointed by the retailer or the cashier terminal 10. The authentication method is, for example, appointed to perform both the visual authentication and the password authentication. FIG. 19 explanatorily shows an example of an authentication method stored in an authentication method field of cashier terminal information 6000. The authentication method appointed by the retailer or the cashier terminal 10 has the following variation: no authentication; cases where at least one of the visual authentication or the password authentication is appointed, such as the visual authentication only, the password authentication only, the visual authentication or the password authentication, the visual authentication and the password authentication, and so on; or cases that the authentication method is varied depend on the purchase amount such as if the purchase amount is, for example, ten thousands yen or more, both the visual authentication and the password authentication are performed, otherwise, only the visual authentication is performed; and so on.

Figure 15:
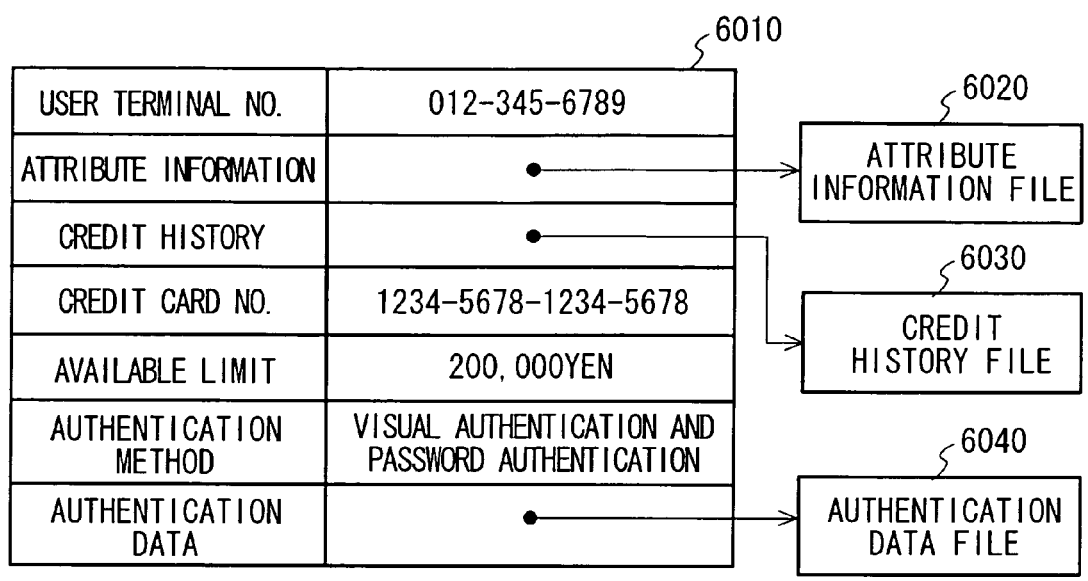
FIG. 15 shows an example of user information 6010 stored in a user database 60.

FIG. 15 shows an example of user information 6010 stored in a user database 60. The user information 6010 stores a user terminal identifying number of the user terminal 20 such as a calling telephone number for example, user attribute information, history of the user about the electronic settlement, number of credit cards or bank cards, available amount, the authentication method appointed by the user or the user terminal 20, and the authentication data registered by the user. The user attribute information is stored in the attribute information file 6020. History of the user about the electronic settlement is stored in a history file 6030. The authentication data registered by the user is stored in the authentication data file 6040.

Figure 16:
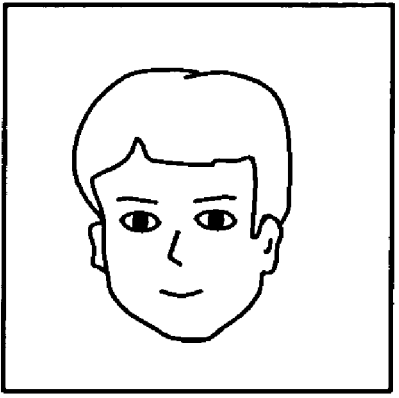
FIG. 16 shows an example of an attribute information file 6020.

FIG. 16 shows an example of an attribute information file 6020, which stores the user's name, age, sex, address, occupation, and so on. FIG. 17 shows an example of the history file 6030. A purchase history includes the purchase date, purchase ID, purchase amount in the electronic settlement, and settlement date of the credit card or the bankcard. FIG. 18 shows an example of an authentication data file 6040. For authentication data, information only the user knows is registered in the authentication data file 6040 such as the name of his or her grandfather or grandmother, mother's maiden name, name of domicile town, favorite author, name of elementary school, and so on. The user may be authenticated by answering the question chosen at random from the registered authentication data, such as "what is your mother's maiden name?"

FIG. 20 explanatorily shows an example of an authentication method stored in an authentication method field of user information 6010. An example of the authentication method appointed by the user or the user terminal 20 is listed in the following. Type U1 has no authentication; the authentication method appointed by the cashier terminal 10 is selected. Type U2 adds the password authentication; this is selected when the user always wants to authenticate with the password authentication. Type U3 refuses the visual authentication; this is selected when the user does not want to let the clerk authenticate with facial portrait data. Type U4 changes the type of the authentication depending on the purchase amount; for example, if the purchase amount is 5000 yen or more, password authentication is needed, or else the authentication is not performed.

FIG. 21 explanatorily shows an authentication method agreed between the cashier terminal 10 and the user terminal 20 based on the authentication method appointed by the cashier terminal 10 and the authentication method appointed by the user terminal 20.

First, in the case that the user does not appoint the authentication method is explained in the following. When the user does not appoint the authentication method, the authentication method appointed by the cashier terminal 10 is performed. When the user does not appoint the authentication method and the cashier terminal 10 appoints no authentication, no authentication is performed. This may be performed when a small purchase amount is settled so that no authentication is needed to perform the electronic settlement. When the user does not appoint the authentication method and the cashier terminal 10 appoints the visual authentication or the password authentication, at least one of the visual authentication or the password authentication is performed. In such a case, the clerk using the cashier terminal 10 may choose either of the visual authentication or the password authentication; or only in such a case that the visual authentication is not suitable to authenticate the user, the password authentication may be selected. When the user does not appoint the authentication method and the cashier terminal 10 appoints only the visual authentication, only the visual authentication is performed. If the user is not able to be authenticated using the visual authentication, no more authentications is performed, so that the password authentication is not performed. When the user appoints no authentication method, the cashier terminal 10 appoints only the password authentication; only the password authentication is performed, so that the visual authentication is not performed. When the user appoints no authentication method, the cashier terminal 10 appoints the visual authentication and the password authentication, both of the visual authentication and the password authentication is performed. If the user is authenticated using the visual authentication, for improvement of authentication accuracy, the password authentication is also performed.

Next, the case that the user adds the password authentication is explained in the following. Appointing adding of the password authentication can protect the user. In a case that the user loses, leaves, or has stolen the user terminal 20, such as a cellular phone or a portable terminal, the user terminal 20 suffers from a false use such as an incorrect access to the electronic settlement. When the user appoints adding of the password authentication and the cashier terminal 10 appoints the visual authentication or the password authentication, both of the visual authentication and the password authentication are performed. In this case, only the visual authentication does not match the authentication accuracy the user appointed, even when the user is authenticated by the visual authentication, for improving the authentication accuracy, the password authentication is also performed.

In a case where the user appoints adding of the password authentication and the cashier terminal 10 appoints only the visual authentication, both of the visual authentication and the password authentication are performed. The cashier terminal 10 appoints only the visual authentication; the user requires not only the visual authentication, but also adding the password authentication so that the higher accuracy authentication is performed. Therefore, the password authentication is performed combined with the visual authentication. Thus, when the user requires higher authentication accuracy than the cashier terminal 10 requires, the authentication method with higher authentication accuracy is performed.

When the user appoints adding of the password authentication and the cashier terminal 10 appoints only the password authentication, the authentication accuracy required by both of the cashier terminal 10 and the user matches, so that only the password authentication is performed and the visual authentication is not performed.

When the user appoints adding of the password authentication, the cashier terminal 10 appoints the visual authentication and the password authentication, the authentication accuracy required by both of the cashier terminal 10 and the user matches, so that both of the visual authentication and the password authentication are performed.

Next, the case that the user appoints refusing the visual authentication is explained here. The user, appointing refusal of the visual authentication, may reject authentication by facial portrait data displayed on the cashier terminal 10.

When the user appoints the refusal of the visual authentication and the cashier terminal 10 appoints the visual authentication or the password authentication, because the user does not accept the visual authentication, only the password authentication is performed.

When the user appoints the refusal of the visual authentication and the cashier terminal 10 appoints only the visual authentication, because the authentication method does not match between the cashier terminal 10 and the user, the authentication is refused so that the user is not authenticated. Thus, the electronic settlement is not performed.

When the user appoints the refusal of the visual authentication and the cashier terminal 10 appoints only the password authentication, the password authentication is performed, but the visual authentication is not performed.

When the user appoints the refusal of the visual authentication and the cashier terminal 10 appoints both of the visual authentication and the password authentication, because the visual authentication required by the cashier terminal 10 is refused by the user, an agreement on the authentication method between the cashier terminal 10 and the user is not able to be made. Thus, the authentication is refused, so that the user is not authenticated and the electronic settlement is not performed.

Figure 22:
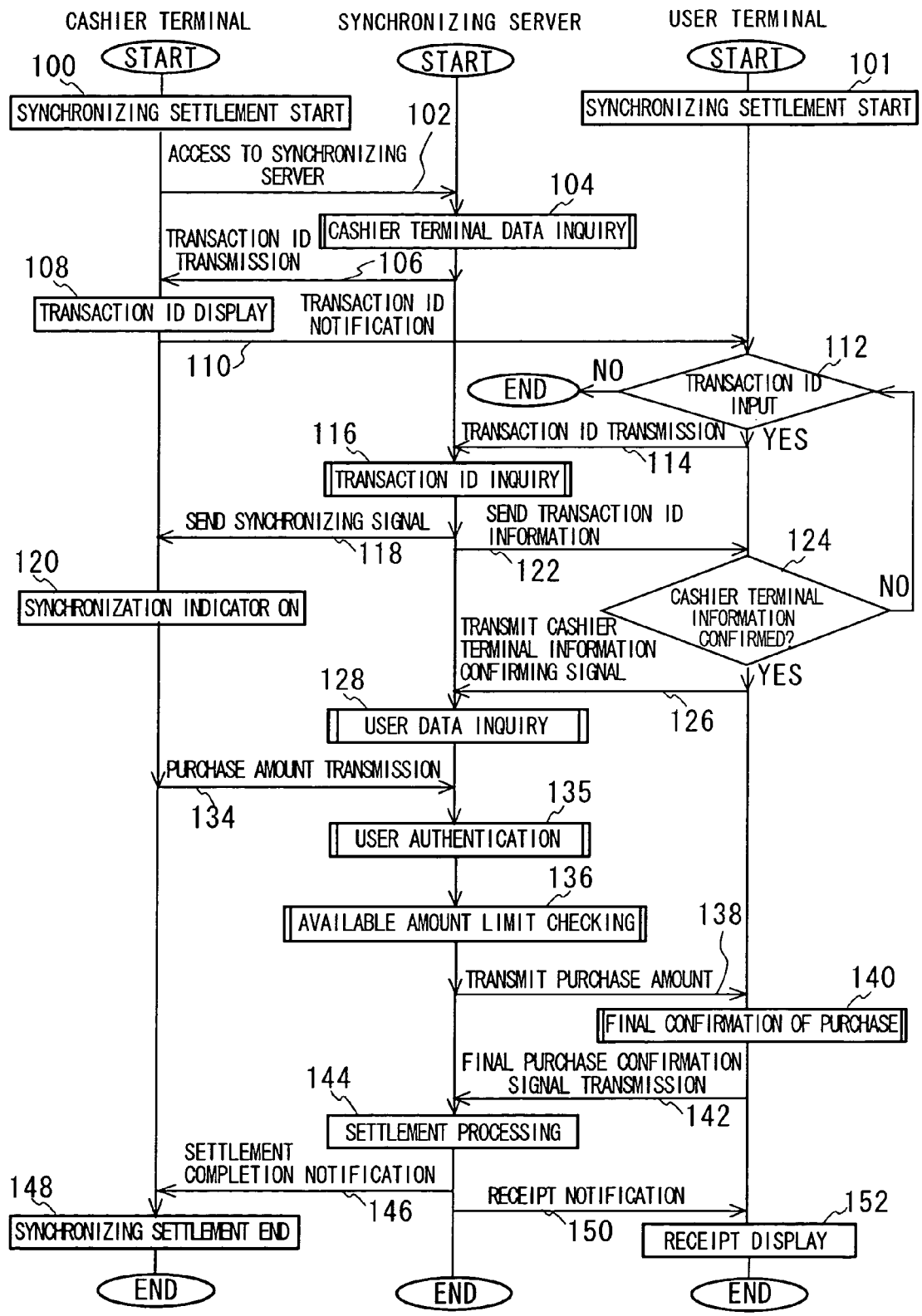
FIG. 22 is a flow chart showing an electronic settlement system of a second embodiment of the present invention.

FIG. 22 is a flow chart showing an electronic settlement system of a second embodiment of the present invention. FIGS. 23 to 27 are flow charts showing processing of details in FIG. 22.

Referring to FIG. 22, the settlement processing is described in the following. A user purchases an item from a retailer, and pays the value of the merchandise at a cashier over the counter. First, the user chooses an electronic settlement. The clerk, at the user's request of electronic settlement, chooses the electronic settlement menu on the cashier terminal 10, and the electronic settlement starts (100). The cashier terminal 10 accesses the synchronizing server 30 (102). The cashier terminal 10 transmits a cashier registration number which is unique to each cashier terminal when the cashier terminal 10 accesses the synchronizing server 30.

The synchronizing server 30, corresponding to the access from the cashier terminal 10, starts to connect the cashier terminal 10, and inquires the cashier terminal information based on the cashier registration number transmitted from the cashier terminal 10 (104).

Figure 23:
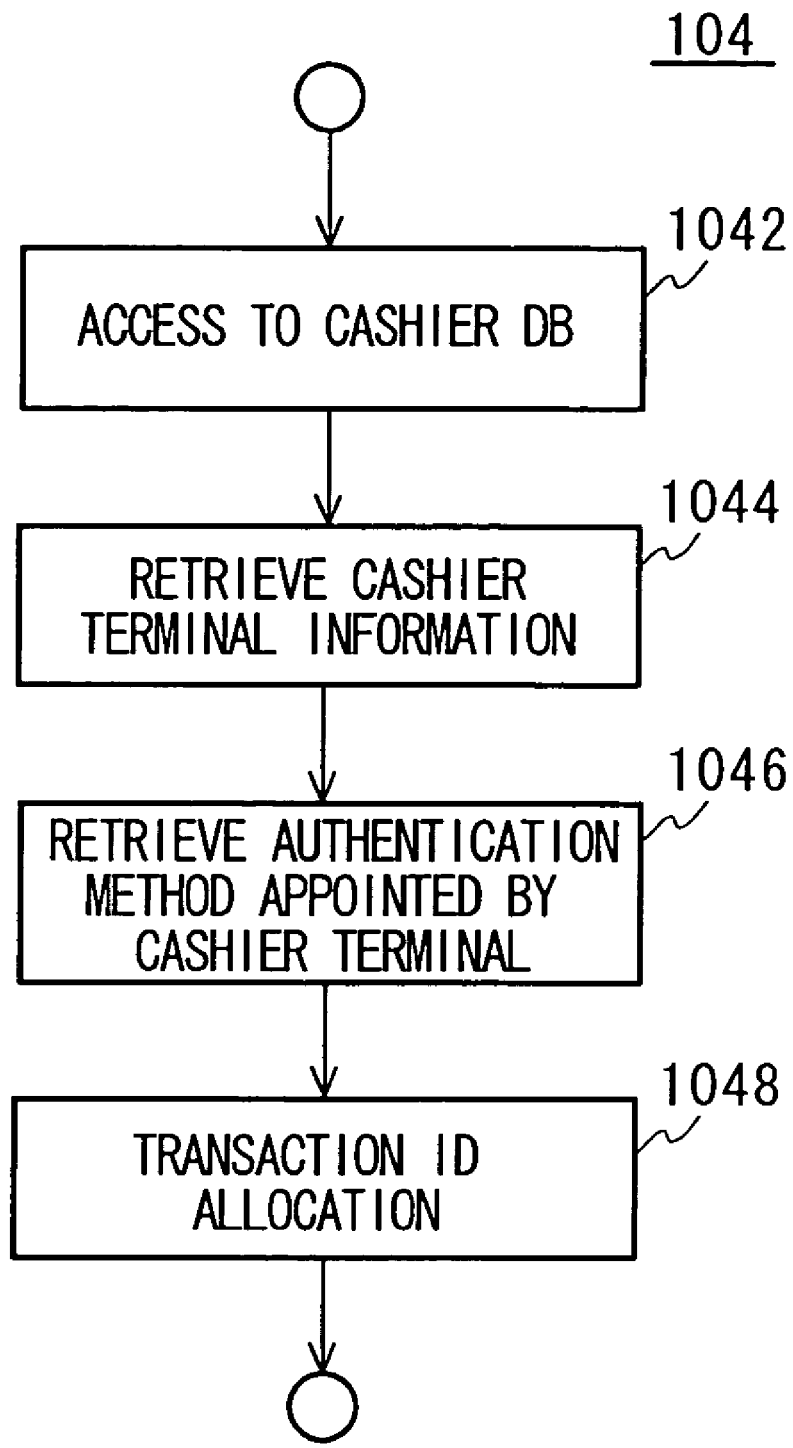
FIG. 23 is a flow chart showing cashier terminal information inquiry 104 processing.

Referring to FIG. 23, the cashier terminal information inquiry 104 processing will be described. The synchronizing server 30 accesses the cashier database 50 (1042), and retrieves the cashier terminal information of a cashier terminal matching to the cashier registration number (1044). A name of a retailer, a name of a shop, the cashier terminal number in that store, authentication method, and so on are registered in the cashier terminal information corresponding to the cashier registration number. The synchronizing server 30 decides the authentication method registered in the cashier terminal information (1046). The authentication method appointed in the cashier terminal information, as shown in FIG. 19 for example, may be a combination of a plurality of authentication methods such as the visual authentication or the password authentication, or the method that the authentication method selected dependent on the purchase amount. Furthermore, the synchronizing server 30 allocates a transaction ID to the cashier terminal 10 (1048). The transaction ID is a number for identifying the settlement that is processed by the cashier terminal 10.

Referring back to FIG. 22, the following steps are the same as the corresponding numbered processing in the first embodiment shown in FIG. 5, so they are not described here. The steps are after the cashier terminal information inquiry 104 processing, from the processing that the synchronizing server 30 delivers the transaction ID to the cashier terminal 10 (106), the processing that the cashier terminal 10 displays the transaction ID (108), the processing that the clerk notifies the transaction ID to the user (110), the processing that the user inputs the notified transaction ID (112), the processing that the user terminal 20 transmits the transaction ID to the synchronizing server 30 (114), the processing that the synchronizing server 30 receives the transaction ID and makes an inquiry to the transaction ID (116), the processing that the synchronizing server 30 transmits the synchronizing signal to the cashier terminal 10 (118), the processing that the cashier terminal 10 receives the synchronizing signal, and lights a synchronization indicator 706 in the cashier terminal 10 (120), the processing that the synchronizing server 30, after the synchronization is established, sends to the user terminal 20 the cashier terminal information (122), the processing that the user confirms the synchronized cashier terminal (124) to the processing that the user terminal transmits the cashier terminal information confirmation signal to the synchronizing server 30 (126).

Figure 24:
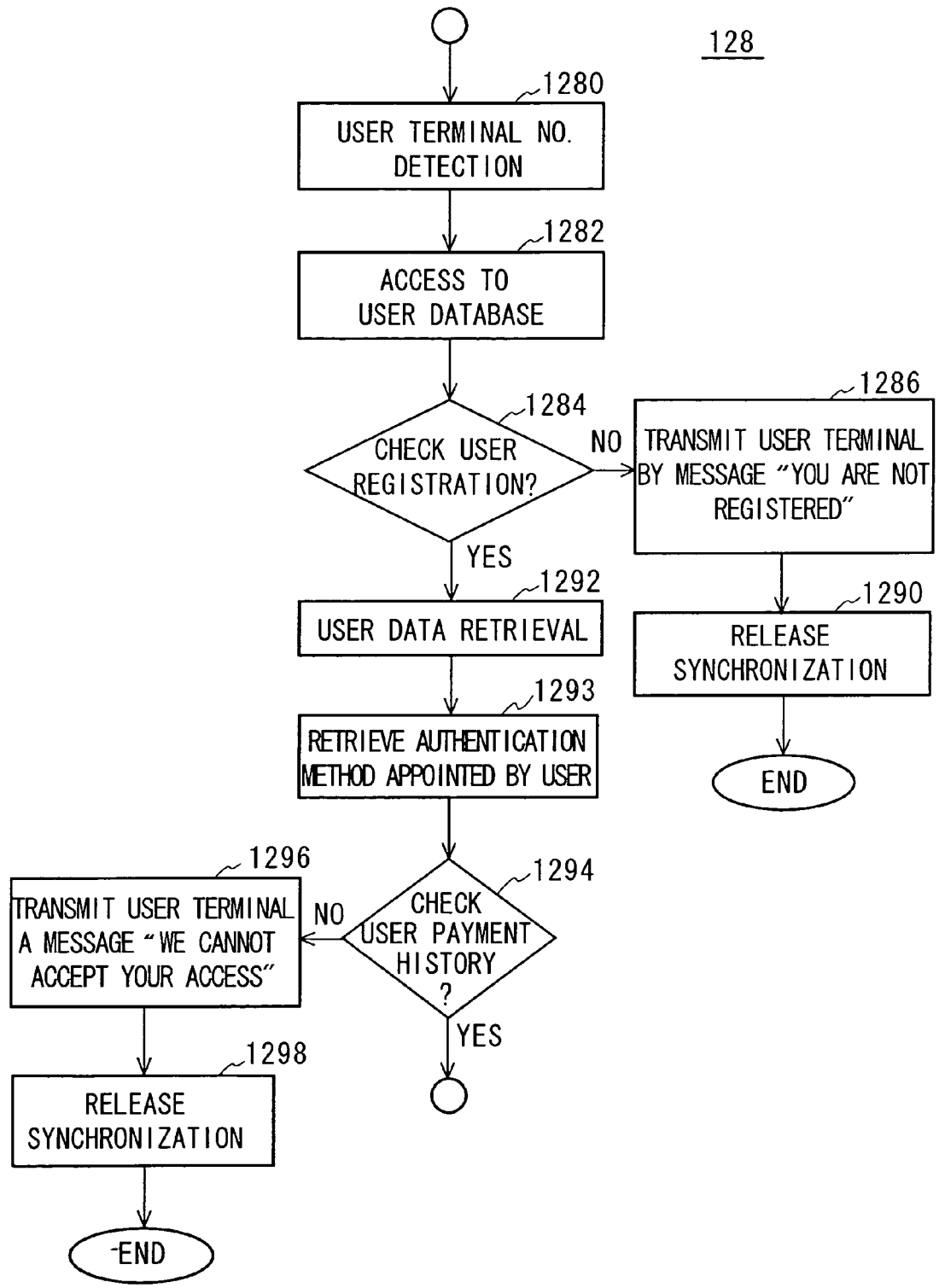
FIG. 24 is a flow chart showing a user data inquiry 128 processing.

The synchronizing server 30, receiving the cashier terminal information confirmation signal from the user terminal 20, performs the user information inquiry 128 processing. Referring to FIG. 24, the user information inquiry 128 processing will be described here. The synchronizing server 30 retrieves a user terminal number from the user terminal 20 (1280). When the user terminal 20 is a cellular phone, the user terminal number is the calling telephone number. The synchronizing server 30 accesses the user database 60, and detects the user information corresponding to the user terminal number (1282). It is checked that the user information corresponded to the user terminal number exists in the user database 60. Then if the user terminal 20 is registered based on the user terminal number it is confirmed (1284). When the user terminal is not registered, the synchronizing server 30 transmits to the user terminal 20 a message "you are not registered." (1286). Information, notifying that the user does not have user registration is displayed on the user terminal 20. The synchronizing server 30 releases the synchronization of the cashier terminal 10 with the user terminal 20 (1290), and finishes the processing.

When the user registration is verified, user information 6010 is retrieved from the user database 60 (1292). As shown in FIG. 15, the user information 6010 stores user attribute information, history of the user about the electronic settlement, number of credit cards or bank cards, available amount, and the authentication method appointed by the user or the user terminal 20. The synchronizing server 30 retrieves the authentication method appointed by the user or the user terminal 20 (1293). The authentication method appointed by the user or the user terminal 20, as shown in FIG. 20 for an example, may be a requirement of higher authentication accuracy such as adding of the password authentication, the refusal of a predetermined authentication method such as refusal of the visual authentication, selection of the authentication method dependent on the purchase amount, and so on.

Next, if the user has a problem with his or her payment history on his or her credit card or his or her bankcard and so on, the history of the user is checked using the electronic settlement stored in the history file 6030 (1294). When any problem is found with his or her payment history, a message "we cannot accept your access." is transmitted to the user terminal 20 (1296). Information notifying that settlement is rejected is displayed on the user terminal 20. The synchronizing server 30 releases the synchronization of the cashier terminal 10 with the user terminal 20 (1298), and finishes the processing.

When the user has no problem with his or her credit history, the synchronizing server 30 advances to the next processing. Referring back to FIG. 22, the synchronizing server 30, receives from the cashier terminal 10 the purchase amount information including the purchase amount (134). The synchronizing server 30 performs a user authentication using the "synchronizing multiple authentication" based on the authentication method appointed by the cashier terminal 10 in the cashier terminal information inquiry 104 and the authentication method appointed by the user terminal 20 in the user information inquiry 128 (135). "The synchronizing multiple authentication" is almost the same as described in the first embodiment, as here in the present embodiment, however the following points are different. Both of the cashier terminal 10 and the user terminal 20 may appoint each authentication method, the authentication method appointed by the cashier terminal 10 and the authentication method appointed by the user terminal 20 are matched, and the agreeable authentication method is selected, then the user authentication is performed.

Figure 25:
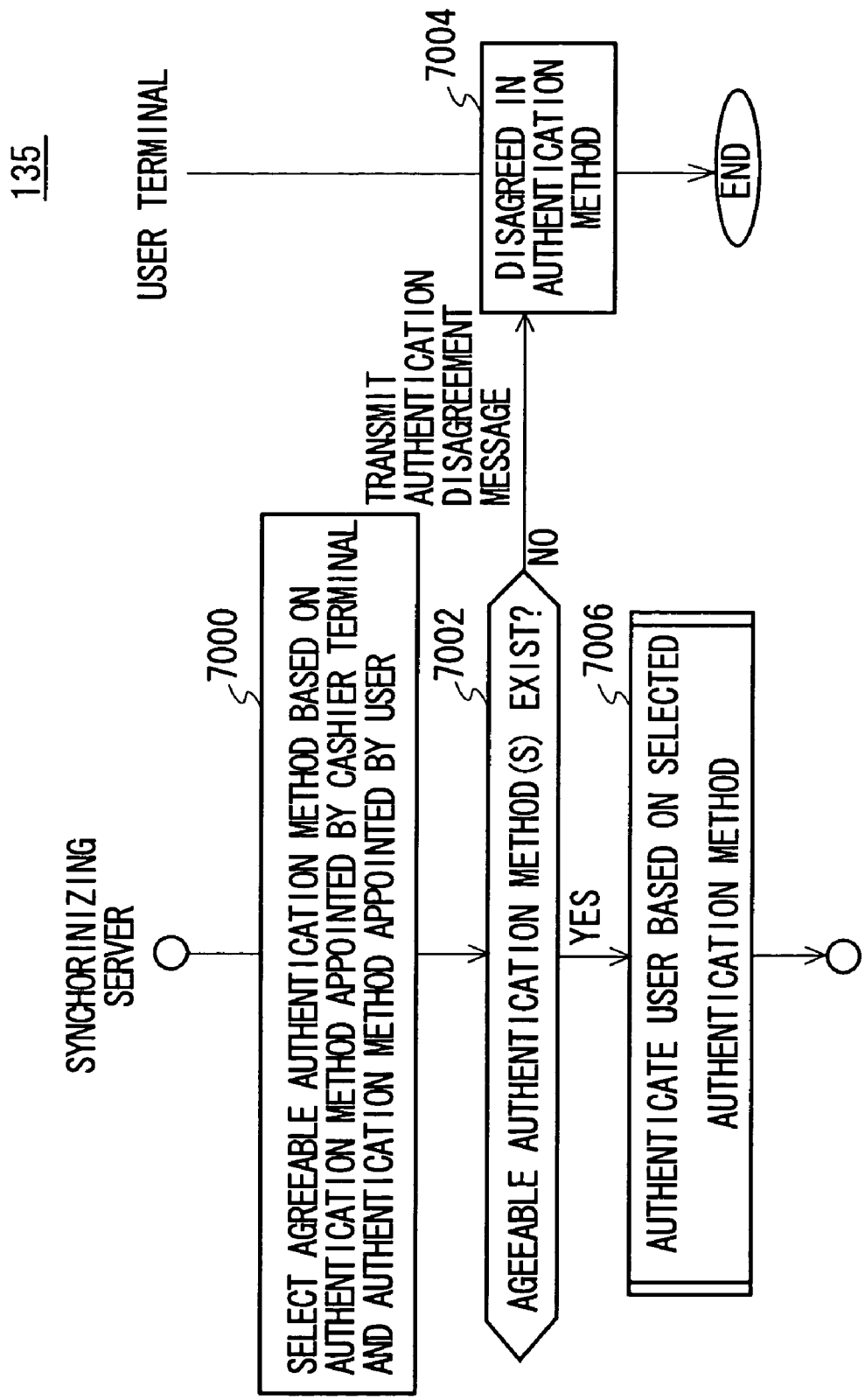
FIG. 25 is a flow chart showing a user authentication 135 processing.

Referring to FIG. 25, the user authentication 135 processing will be described in the following. The synchronizing server 30 selects the authentication method to be performed based on the authentication method appointed by the cashier terminal 10 and the authentication method appointed by the user terminal 20 (7000). As an example shown in FIG. 21, the authentication method to be performed based on the authentication method appointed by the cashier terminal 10 and the authentication method appointed by the user terminal 20 are matched so that the authentication method to be performed is selected. If the authentication method which may fill both the appointment of the cashier terminal 10 and the appointment of the user terminal 20 does not exist, (7002), the synchronizing server 30 transmits to the user terminal 20 a message of authentication disagreement. The user terminal 20 displays information indicating that because of the disagreement of the authentication method, the authentication is refused (7004), and finishes the processing. If an agreeable authentication method exists, exceeding to the processing 7006, so that the user authentication is performed based on the selected authentication method (7006).

Figure 26:
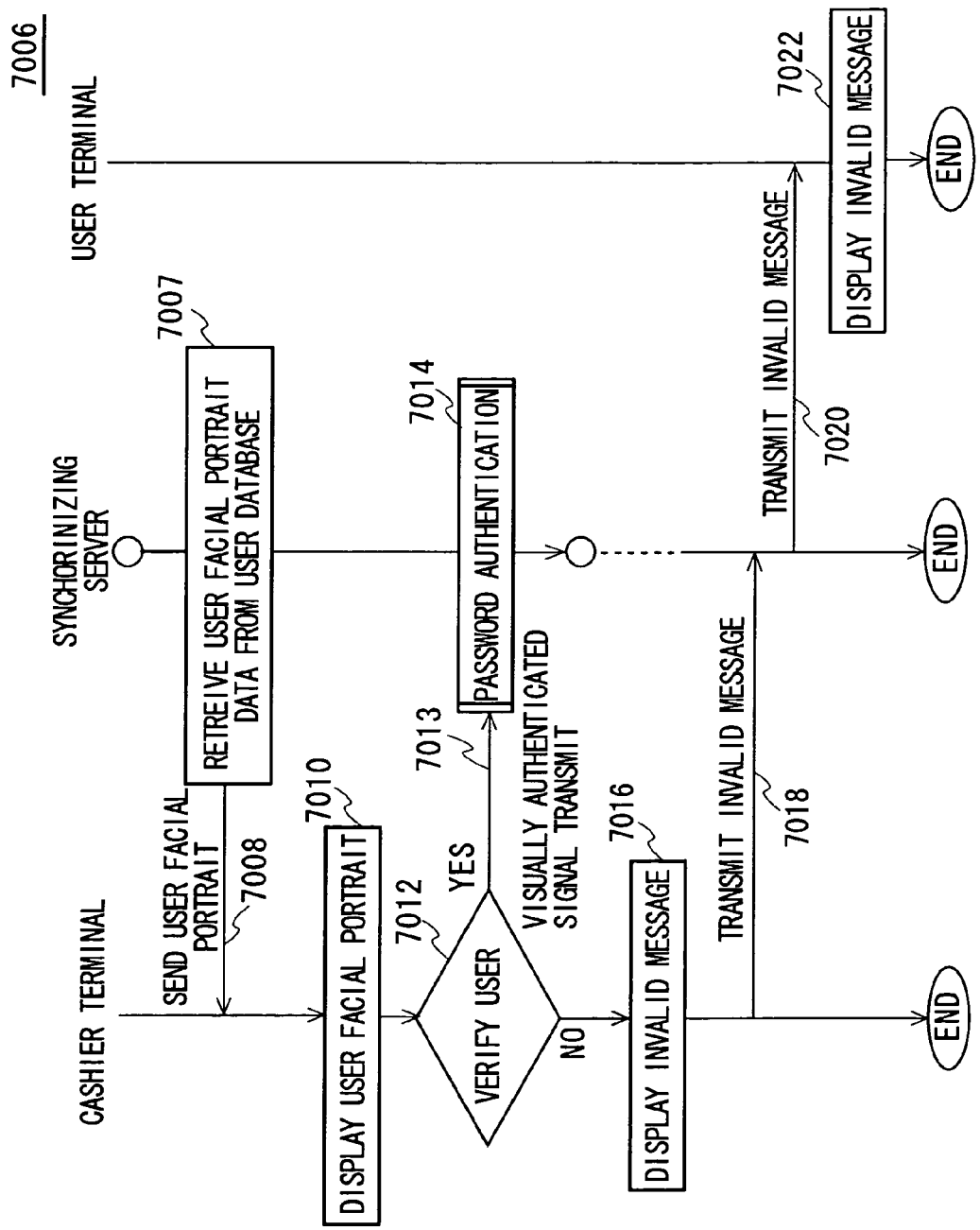
FIG. 26 is a flow chart showing a user authentication 7006 processing which additionally performs a password authentication after a visual authentication.

Here, as an example, a case that the visual authentication or the password authentication is appointed by the cashier terminal 10 in the cashier terminal information inquiry 104, and adding the password authentication is appointed by the user terminal 20 in the user information inquiry 128 is described. In this case, because the user requires improving the authentication accuracy by adding the password authentication, the authentication method agreeable to both the clerk and the user is the visual authentication and the password authentication. That is, the visual authentication is performed and the password authentication is also performed, so that the authentication accuracy is ensured. FIG. 26 is a flowchart showing a user authentication 7006 processing which additionally performs a password authentication after a visual authentication. The synchronizing server 30 retrieves a user facial portrait image from the user database 60 (7007). The synchronizing server 30 transmits the facial portrait image data to the cashier terminal 10 (7008). The cashier terminal receives and displays the user facial portrait image data from the synchronizing server 30 (7010). The clerk verifies the user and the displayed facial portrait, and authenticates the user (7012). If the clerk is not able to ensure the user authentication, the cashier terminal 10, by the direction of the clerk, transmits an invalid message to the synchronizing server 30 (7018), and displays the information indicating the authentication is invalid (7016). If the user is authenticated with the facial portrait, the cashier terminal 10 transmits to the synchronizing server 30 a signal that the visual authentication is complete, by the direction of the clerk (7013). On the other hand, the cashier terminal 10 displays the information indicating the password authentication is being undertaken. The synchronizing server 30, receiving the signal that the visual authentication is completed from the cashier terminal 10, performs the password authentication (7014).

Figure 27:
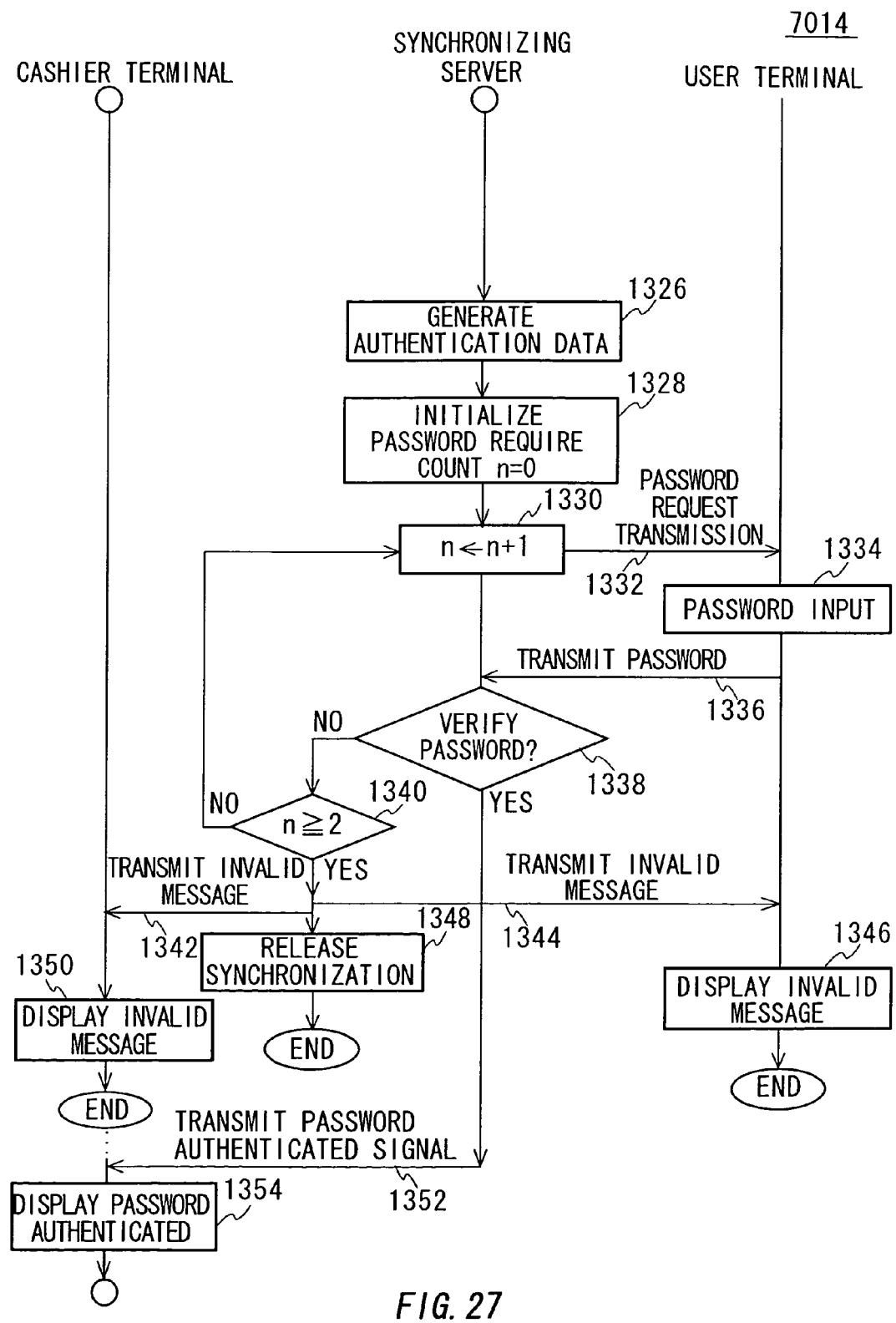
FIG. 27 is a flow chart showing a password authentication 7014 processing.

FIG. 27 is a flow chart showing a password authentication 7014 processing. The synchronizing server 30 retrieves data necessary for authentication from the user database 60 and generates authentication data (1326). The authentication data, for example, shown in FIG. 18, is formed in a question which inquires the registered authentication information based on the authentication information registered by the user. The registered authentication information is personal information not known by others. The question is chosen at random from the authentication information registered by the user, so that the probability that the authentication information is stolen and suffers from the false use is reduced. The password authentication processing after the processing 1328 is the same processing as the first embodiment shown in FIG. 9, therefore it will not be described here.

Referring back to FIG. 22 again, the synchronizing server 30 performs available amount check processing 136 based on the purchase amount information received from the cashier terminal 10. The available limit inquiry processing 136 may be performed before the user authentication 135 processing. The following steps are the same as the corresponding numbered processing in the first embodiment, so that it is not described here. The steps are available limit inquiry processing (136), the processing that the synchronizing server 30 transmits purchase amount information including the purchase amount to the user terminal 20 (138), the processing that the user terminal 20, receiving purchase amount information from the synchronizing server 30, performing the processing of the final purchase confirmation (140), the processing that the user terminal 20 transmits a final purchase confirmation signal to the synchronizing server 30 (142), the processing that the synchronizing server 30, receiving the final purchase confirmation signal from the user terminal 20, accesses the user account database 70 and performs the settlement processing which records the purchase information (144), the processing that synchronizing server 30 transmits a settlement completion notification to the cashier terminal 10 (146), the processing that the synchronizing server 30 transmits a receipt to the user terminal 20 (150), the processing that the cashier terminal 10 displays information indicating the completion of the settlement (148), and the processing that the user terminal 20 displays information indicating the completion of the settlement (152).

Another case of the user authentication 135 based on the synchronizing multiple authentication is described in the following. When the cashier terminal 10 appoints the visual authentication or the password authentication and the user terminal 20 appoints refusal of the visual authentication, the performed authentication method is only the password authentication. In this case, the synchronizing server 30 notifies to the cashier terminal 10 that the user refuses the visual authentication so that the password authentication is performed. The cashier terminal 10 displays information that the user refuses the visual authentication so that the password authentication is performed. After the processing, the password authentication 7014 processing the same as in FIG. 27 is performed.

Another case of the user authentication 135 based on the synchronizing multiple authentication is described here. The following is a case where the cashier terminal 10 or the user terminal 20 appoints the authentication method which changes the type of the authentication depending on the purchase amount. For example, an authentication method is appointed as following: if the purchase amount is a predetermined allowable value or more, both of the visual authentication and the password authentication, if the purchase amount is less than the predetermined allowable value, only the visual authentication is performed. If both of the cashier terminal 10 and the user terminal 20 appoints the authentication method which changes the type of the authentication depending on the purchase amount, the smaller allowable value appointed by either of the cashier terminal 10 or the user terminal 20 is chosen to change the authentication method. The synchronizing server 30 judges if the purchase amount of the user exceeds the allowable value, and if it exceeds the allowable value, performs the user authentication processing 7006 the same as in FIG. 26. If the purchase amount of the user does not exceed the allowable value, only the visual authentication is performed; or as the visual authentication 132 processing of the first embodiment shown in FIG. 9, if the visual authentication is approved, the settlement is performed without the password authentication, only when the visual authentication is not able to approve the user, the password authentication is performed.

Here, as an example of the "multiple authentication", the combination of the visual authentication and the password authentication, the voice authentication may be added to the combination as an authentication method. The password authentication requires the user to input the password using the user terminal 20, the voice authentication only requires the user to speak to the cellular phone as an example of the user terminal 20 and the inquiry to the previously registered voice data may be obtained, so that the user does not need to input. Thus, the authentication is simpler and more convenient.

Applying the electronic settlement system of the present embodiment, both of the cashier terminal 10 and the user terminal 20 may appoint the authentication method, and the agreeable authentication method is selected between the user and the retailer or the clerk, then the user may be authenticated. Therefore, the authentication method and the authentication accuracy demanded by the user and the authentication method and the authentication accuracy demanded by the clerk or the retailer may be matched. Furthermore, the authentication method may be varied dependent on the purchase amount.

Third Embodiment

The electronic settlement system applying the third embodiment of the present invention will be described in the following. In the first embodiment and the second embodiment, the synchronizing server 30 transmits to the cashier terminal 10 the transaction ID as an example of the transaction identifying number, the cashier terminal 10, by displaying the transaction ID and so on, notifies it to the user, and the user inputs the transaction ID to the user terminal 20, and the user terminal 20 transmits the transaction ID to the synchronizing server 30. Thus, the cashier terminal 10 and the user terminal 20 are respectively identified, the communication to the cashier terminal 10 performing the settlement is synchronized with the communication to the user terminal 20 performing the settlement by the transaction ID, and the settlement of the transaction is performed between the cashier terminal 10 and the user terminal 20. In the third embodiment, the synchronizing server 30 transmits the transaction ID number to the user terminal 20, the user terminal 20 sends the transaction ID number to the cashier terminal 10, and the cashier terminal 10 transmits the transaction ID number to the synchronizing server 30. Thus, using the transaction ID number, communication to the cashier terminal 10 performing the settlement is synchronized with communication to the user terminal 20 performing the settlement by the transaction ID, and the settlement of the transaction is performed between the cashier terminal 10 and the user terminal 20. This is the difference from the first and the second embodiment. Only the difference from the first and the second embodiment is described here.

Figure 28:
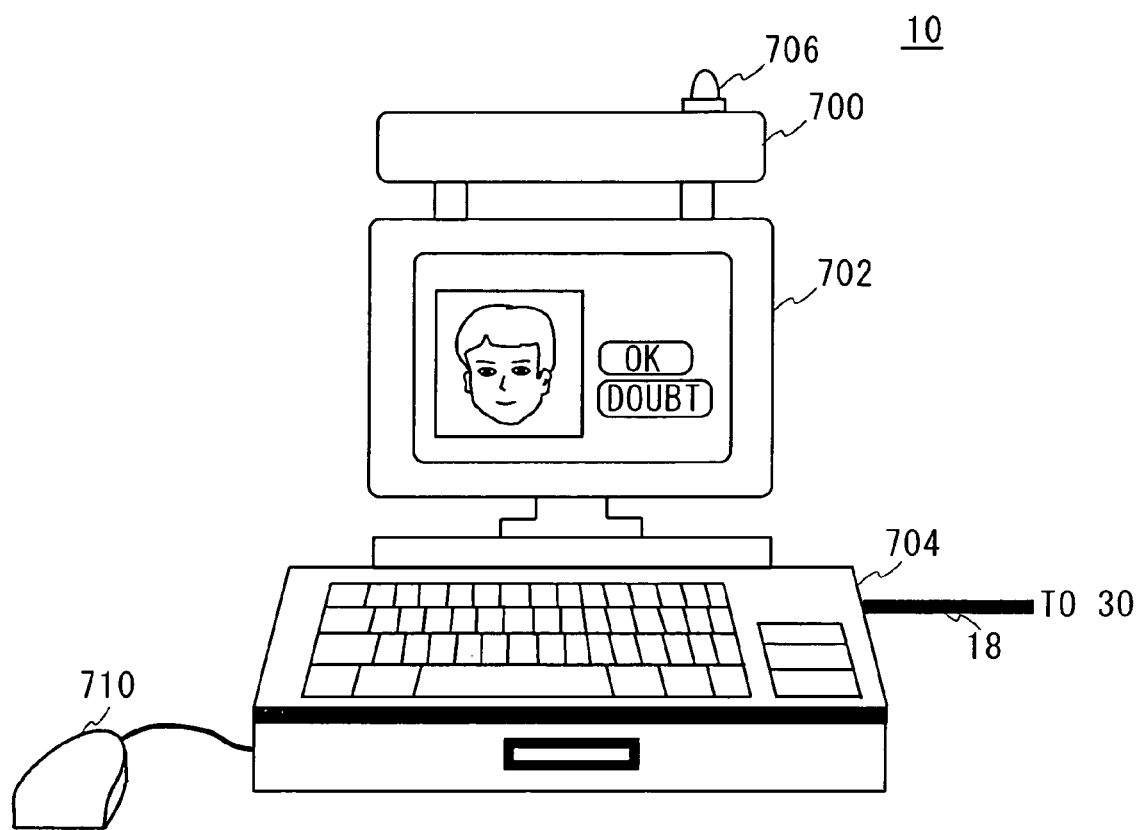
FIG. 28 shows a configuration of a cashier terminal 10 applying a third embodiment.

FIG. 28 shows a configuration of a cashier terminal 10 applying a third embodiment. Different from the first and the second embodiment, the cashier terminal 10 of the present embodiment further has a pattern code reader unit 710 which reads in a pattern code such as a bar code or a cyber code which is a two dimension bar code. The pattern code reader unit 710 reads in the pattern code the user terminal 20 displaying on the display unit 802.

Figure 29:
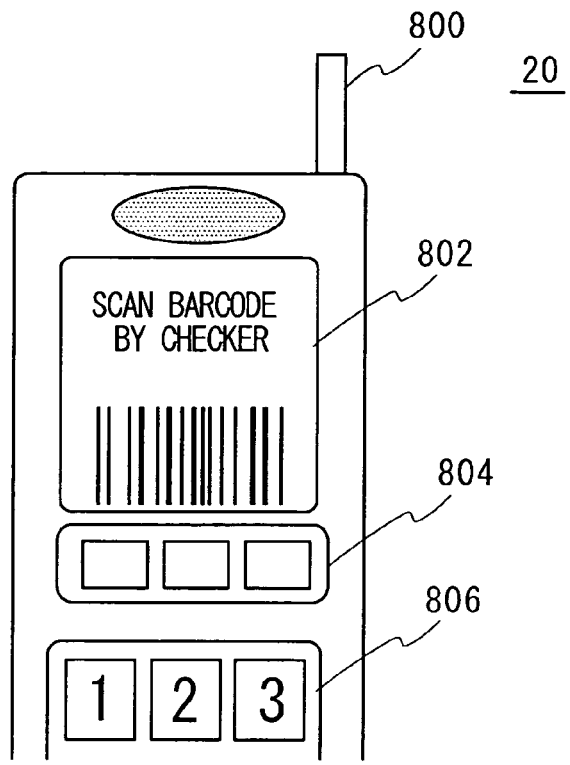
FIG. 29 shows an example of a code indication on a display unit 802 of a user terminal 20.

FIG. 29 shows an example of a code indication on a display unit 802 of a user terminal 20. The user terminal 20 converts the transaction ID number received from the synchronizing server 30 to a bar code and displays the bar code on the display unit 802. A message such as "scan this barcode by the checker" is also displayed on the display unit 802, the user of the user terminal 20 presents the displayed bar code to the clerk of the cashier terminal 10, the clerk of the cashier terminal 10, using the pattern code reader unit 710, lets the cashier terminal 10 read in the bar code displayed on the display unit 802 of the user terminal 20, and lets the cashier terminal 10 input the transaction ID number. In another case, the user operates and reads in the pattern code reader unit 710 of the cashier terminal 10 the bar code displayed on the display unit 802 of the user terminal 20.

Figure 30:
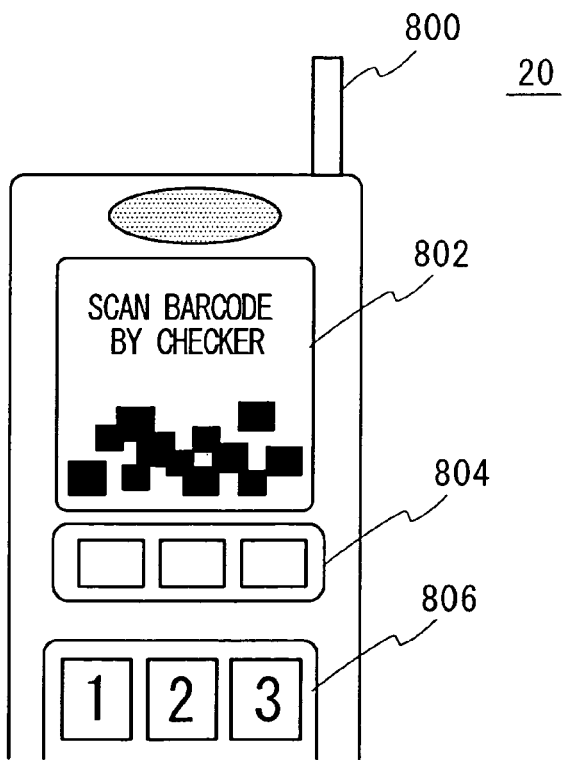
FIG. 30 shows an example of a cyber code indication on a display unit 802 of a user terminal 20.

FIG. 30 shows an example of a cyber code indication on a display unit 802 of a user terminal 20. The user terminal 20 converts the transaction ID number received from the synchronizing server 30 to a cyber code which is the two dimension pattern code, and displays the cyber code on the display unit 802. The pattern code reader unit 710 of the cashier terminal 10 reads in the cyber code displayed on the display unit 802, retrieves the transaction ID number, and inputs to the cashier terminal 10.

Figure 31:
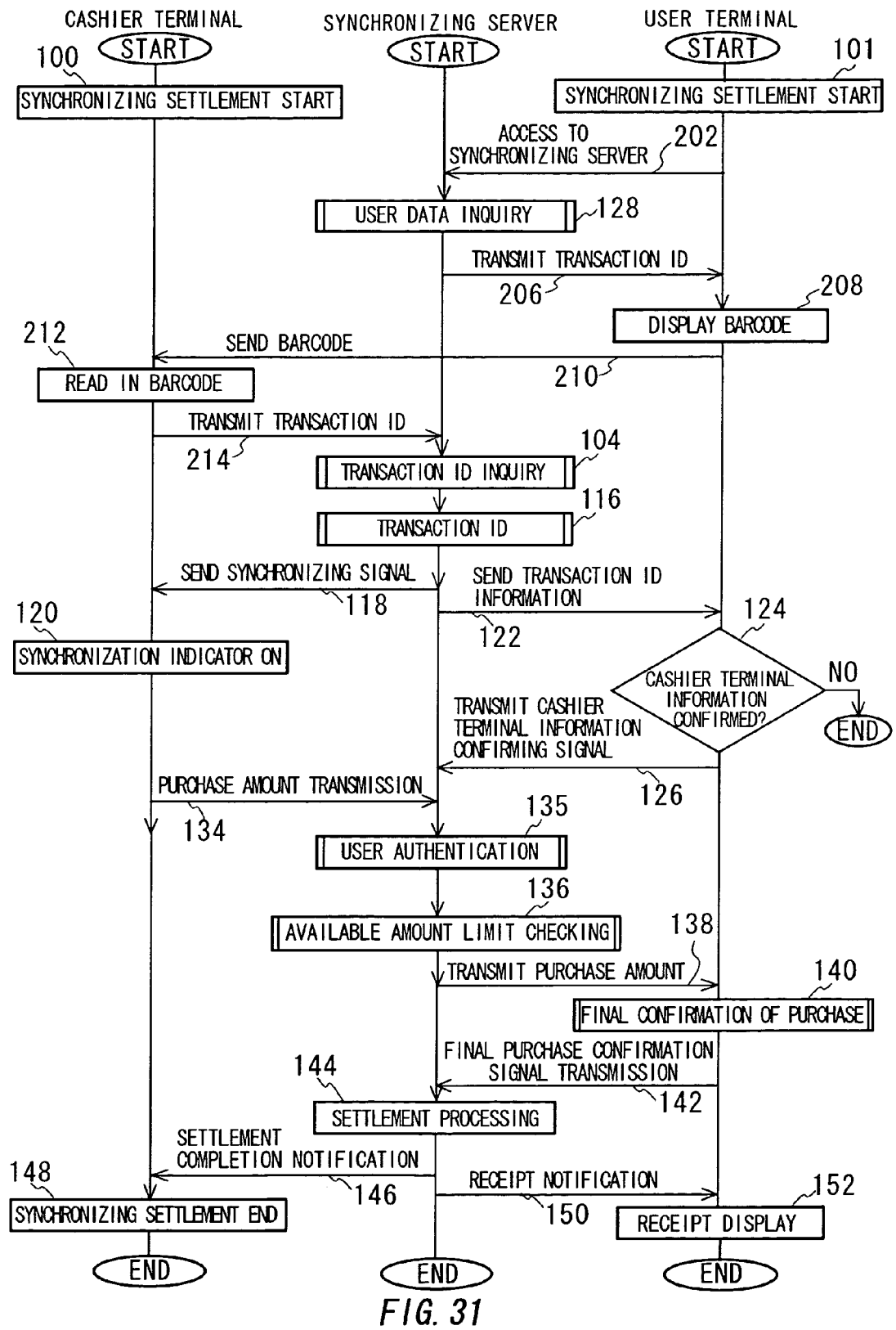
FIG. 31 is a flow chart showing an electronic settlement system applying the third embodiment of the present invention.

FIG. 31 is a flow chart showing an electronic settlement system applying the third embodiment of the present invention. A user purchases an item from a retailer, and pays the value of the merchandise at a cashier over the counter. First, the user chooses an electronic settlement. The clerk, at the user's request of electronic settlement, chooses the electronic settlement menu on the cashier terminal 10, and the electronic settlement starts (100). The user chooses the electronic settlement menu from the user terminal 20, and starts the synchronizing settlement (101). The user terminal 20 accesses the synchronizing server 30 (202). The synchronizing server 30 inquires the user information based on the calling telephone number, as an example of the user terminal identifying number for the user terminal 20 (128). The user information inquiry 128 processing is not described here because the processing is the same as the first and second embodiments. The synchronizing server 30 defines a unique transaction ID number for each transaction performed by the user terminal 20, and transmits the transaction ID number to the user terminal 20 (206). The user terminal 20 converts the transaction ID number received from the synchronizing server 30 to the bar code which is an example of the pattern code, and displays the bar code on the display unit 802 (208). The user presents the bar code displayed on the display unit 802 of the user terminal 20 to the clerk at the cashier terminal 10 (210). The clerk at the cashier terminal 10, using the pattern code reader unit 710, reads in the bar code displayed on the display unit 802 of the user terminal 20 (212). The bar code read in is converted to the transaction ID number, and inputted to the cashier terminal 10. The cashier terminal 10 accesses the synchronizing server 30, transmits the cashier registration number unique to each cashier terminal 10, and transmits the transaction ID number acquired from the user terminal 20 to the synchronizing server 30 (214). The synchronizing server 30, corresponding to the access from the cashier terminal 10, starts to connect to the cashier terminal 10, and inquires the cashier terminal information based on the cashier registration number transmitted from the cashier terminal 10 (104). The cashier terminal information inquiry 104 processing is the same as the first and second embodiments; therefore they will not be described here.

After the cashier terminal information inquiry 104 processing, the synchronizing server 30 inquires the transaction ID number received from the cashier terminal 10 (116).

The synchronizing server 30 is on an "access wait" status, that is waiting to be accessed by the cashier terminal 10 and for the transaction ID to be sent. On the "access wait" status, if a cashier terminal 10 using the same transaction ID to be allocated to the user terminal 20 accesses, the synchronizing server 30 establishes one to one "synchronization" status for that cashier terminal 10 with the user terminal 20, and realizes a synchronization of the communication to the cashier terminal 10 with the communication to the user terminal 20.

The transaction ID number is used corresponding the transaction of the cashier terminal 10 and the user terminal 20, which performs the transaction identified by the transaction ID number, with each other, and synchronizes the communication between them. Therefore, when the "synchronization" is established for the transaction ID number issued by the synchronizing server 30 and the "access wait" is released, the same transaction ID number may be used for another transaction. Thus, the transaction ID number, even though it is a number for identifying transactions, does not need to be a large digit number such as a transaction ID, which is a number unique to every transaction; but needs to be large enough to keep the uniqueness for a certain period for establishing the "synchronization".

A time out limit is set up for the "access wait" status of the synchronizing server 30, and limits the access wait period with the cashier terminal 10 to a predetermined length, for example, 3 minutes. When no answer is obtained for the transaction ID issued from the cashier terminal 10 for a predetermined period, the synchronizing server 30 shuts down the connection to the cashier terminal 10, and initializes it. This time out function is set up in order to avoid trouble for cases such as where the pattern code reader unit 710 of the cashier terminal 10 is not able to read in the pattern code or that a communicating condition of the cashier terminal 10 with the synchronizing server 30 is poor so that data communication is not able to be performed normally, and so on.

Figure 32:
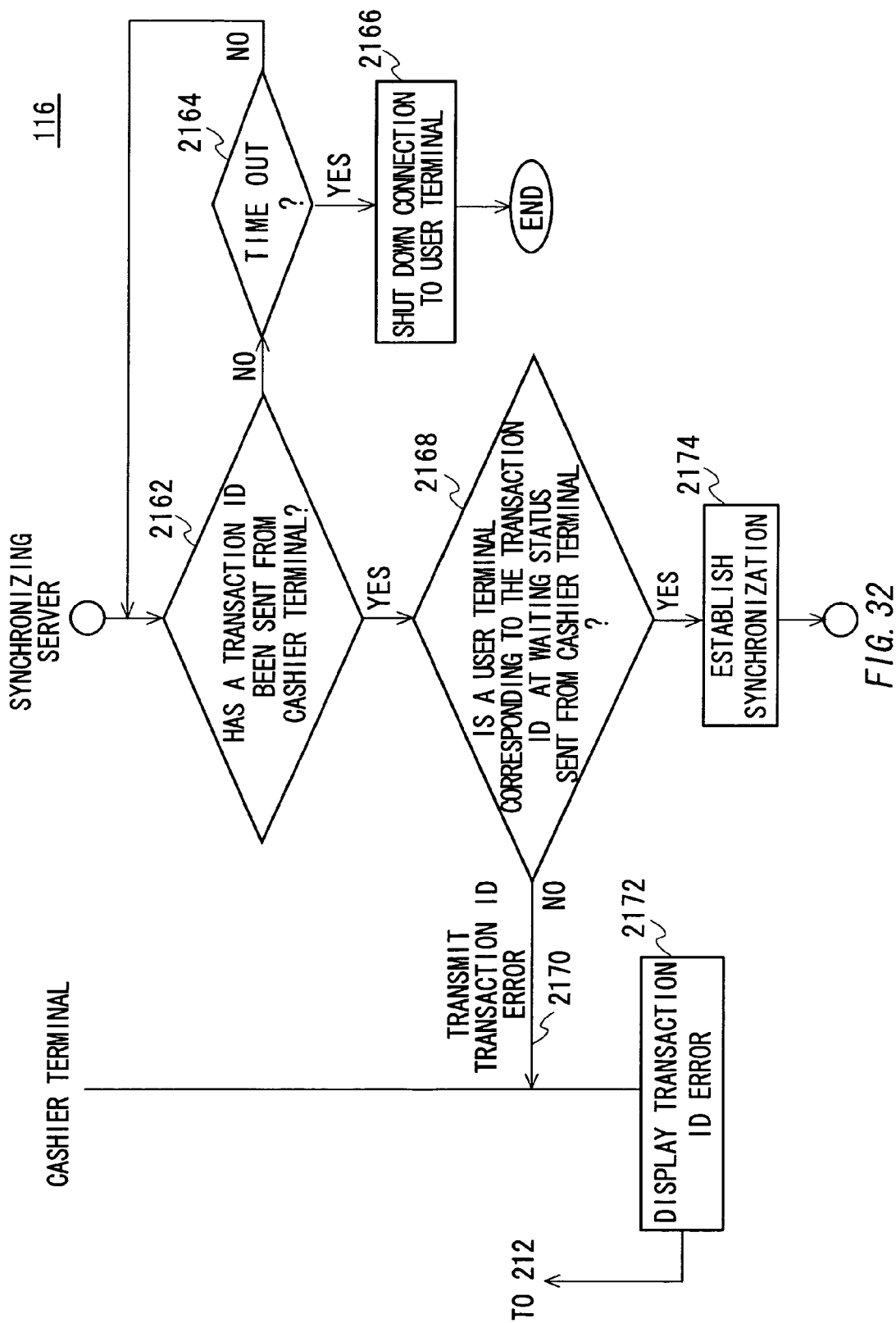
FIG. 32 is a flow chart showing a transaction ID inquiry 116 processing.

FIG. 32 is a flow chart showing a transaction ID inquiry 116 processing. In FIG. 32, the synchronizing server 30 is on the "access wait" status, the access from the user terminal exists, and checks if the transaction ID number is transmitted from the cashier terminal 10 (2162); if the access does not exist, it checks if it exceeds the time out limit (2164). If it exceeds the time out limit, the synchronizing server 30 shuts the connection to the user terminal 20 down (2166), and finishes the processing.

When the cashier terminal 10 transmits the transaction ID, it is checked whether it is on the "synchronizing wait" status corresponding to the user terminal 20 that the transaction ID is found (1168), if not, the transaction ID number inquiry error message is transmitted to the cashier terminal 10 (2170). The cashier terminal 10 displays the transaction ID number error message on the display (2172). The clerk of the cashier terminal 10 reads in the bar code again (212).

When a user terminal 20 in the synchronizing wait which corresponds to the transaction ID number is the same as the transaction ID number transmitted from the cashier terminal 10, transaction ID number, the synchronizing server 30 establishes the "synchronizing status" of the cashier terminal 10 with the user terminal 20, which are corresponded to each other by the transaction ID number, and synchronizes the communication to the cashier terminal 10 with the communication to the user terminal 20 with each other (2174).

Referring back to FIG. 31, the following steps are the same as the corresponding numbered processing in the second embodiment shown in FIG. 22, so they are not described here. The steps are the processing that the synchronizing server 30 transmits the synchronizing signal to the cashier terminal 10 (118), the processing that the cashier terminal 10 receives the synchronizing signal, and lights a synchronization indicator 706 in the cashier terminal 10 (120), the processing that the synchronizing server 30, after the synchronization is established, sends to the user terminal 20 the cashier terminal information (122), the processing that the user confirms the synchronized cashier terminal (124), the processing that the user terminal 20 transmits the cashier terminal information confirmation signal to the synchronizing server 30 (126), the processing that the synchronizing server 30 receives from the cashier terminal 10 the purchase amount information including the purchase amount (134), the user authentication processing by the synchronizing server 30 (135), the available limit inquiry processing by the synchronizing server 30 (136), the processing that the synchronizing server 30 transmits purchase amount information including the purchase amount to the user terminal 20 (138), the processing that the user terminal 20 performs the processing of the final purchase confirmation (140), the processing that the user terminal 20 transmits a final purchase confirmation signal to the synchronizing server 30 (142), the settlement processing by the synchronizing server 30 (144), the processing that synchronizing server 30 transmits a settlement completion notification to the cashier terminal 10 (146), the processing that the synchronizing server 30 transmits a receipt to the user terminal 20 (150), the processing that the cashier terminal 10 displays information indicating the completion of the settlement (148), and the processing that the user terminal 20 displays information indicating the completion of the settlement (152).

In the above description, the user terminal 20 displays the transaction ID number received from the synchronizing server 30 in the form of the pattern code such as a bar code, a cyber code, and so on. In other cases, the user terminal 20, using a light communication means such as an infrared communication or a short distance wireless communication means such as a Bluetooth, communicates with the cashier terminal 10 and transmits the transaction ID number to the cashier terminal 10.

Applying the electronic settlement system of the present embodiment, the user terminal 20 receives the transaction ID number allocated by the synchronizing server 30, displays in the form of the pattern code such as the bar code, the cyber code, and so on, and lets the cashier terminal 10 read in. The cashier terminal 10 retrieves the transaction ID number from the pattern code and transmits the transaction ID number to the synchronizing server 30. Thus, the user terminal 20 and the cashier terminal 10 are corresponded to each other using the transaction ID number, and the settlement is performed between the user terminal 20 and the cashier terminal 10 corresponded to each other. Therefore, the user inputs no transaction ID number, so that the electronic settlement can be performed simply and conveniently.

Fourth Embodiment

The electronic settlement system applying the fourth embodiment of the present invention will be described in the following. Applying the electronic settlement system of the present embodiment, when the user purchases an item using a vending machine, the user may execute a settlement electronically via a network.

Figure 33:
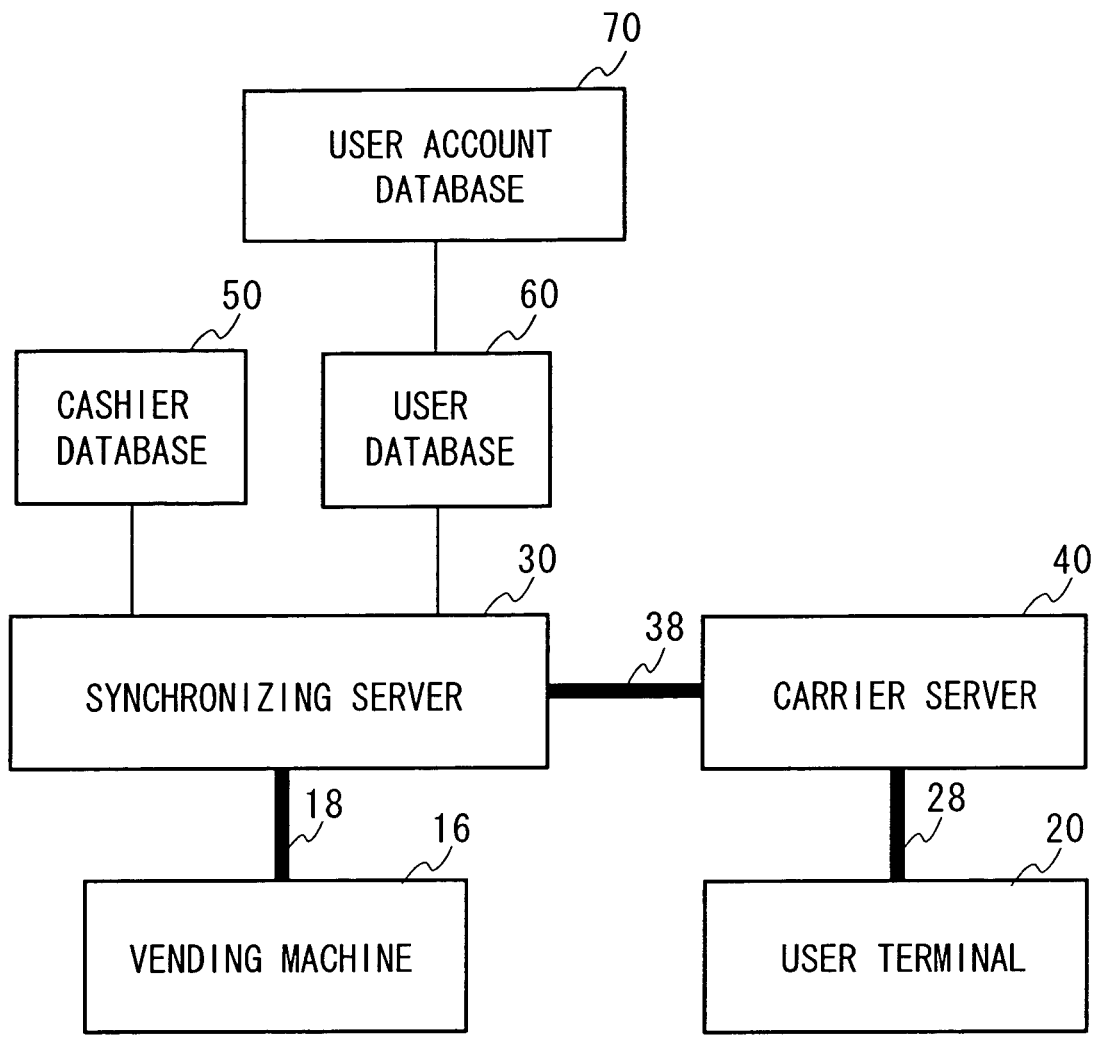
FIG. 33 is a block diagram showing a configuration of an electronic settlement system applying the fourth embodiment of the present invention.

FIG. 33 is a block diagram showing a configuration of an electronic settlement system applying the fourth embodiment of the present invention. The electronic settlement system of the present embodiment has a vending machine 16 as an example of a billing terminal, a user terminal 20 as an example of a paying terminal, a synchronizing server 30 as an example of a settlement device, a carrier server 40, a cashier database 50 as an example of a billing terminal database, a user database 60 as an example of a paying terminal database, and a user account database 70.

The vending machine 16 may connect to the synchronizing server 30 via a communication path. A communication means from the vending machine 16 to the synchronizing server 30 may be any of the followings; a communication using a commercial telephone line, a communication using a private line, or a communication using radiotelephone communication.

The rest of the components have the same numbers as FIG. 1 and are the same as the first embodiment. Here, these components have the same action and construction as the first embodiment and will not be described.

Figure 34:
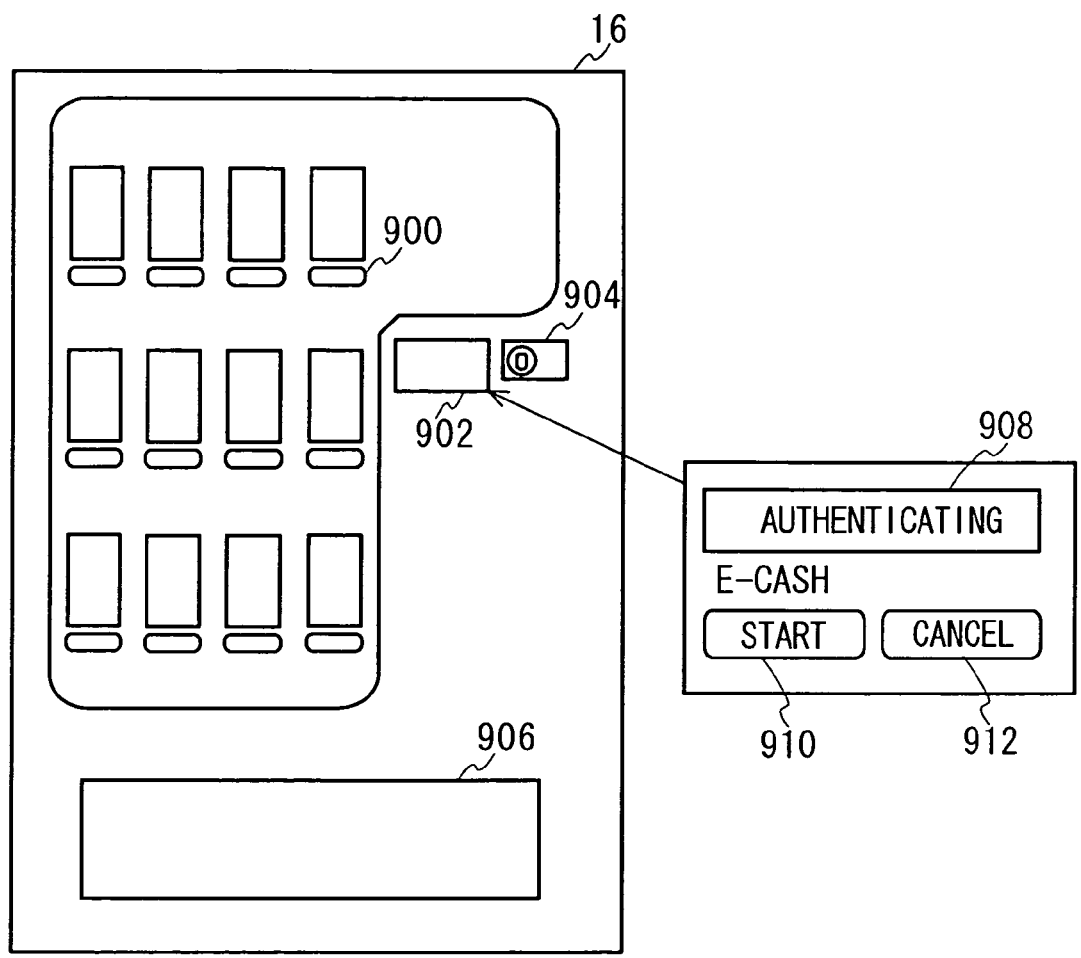
FIG. 34 shows a configuration figure of a vending machine 16.

FIG. 34 shows a configuration figure of a vending machine 16. The vending machine 16 has a plurality of keys 900 to choose an item, an operating unit 902 operating electronic settlement, a coin-inserting unit 904 to insert coins, and an item collection unit 906. The electronic settlement operating unit 902 has a display unit 908 displaying processing of the electronic settlement, a start key 910 directing the start of the electronic settlement, and a cancel key 912 directing the cancellation of the electronic settlement.

Figure 35:
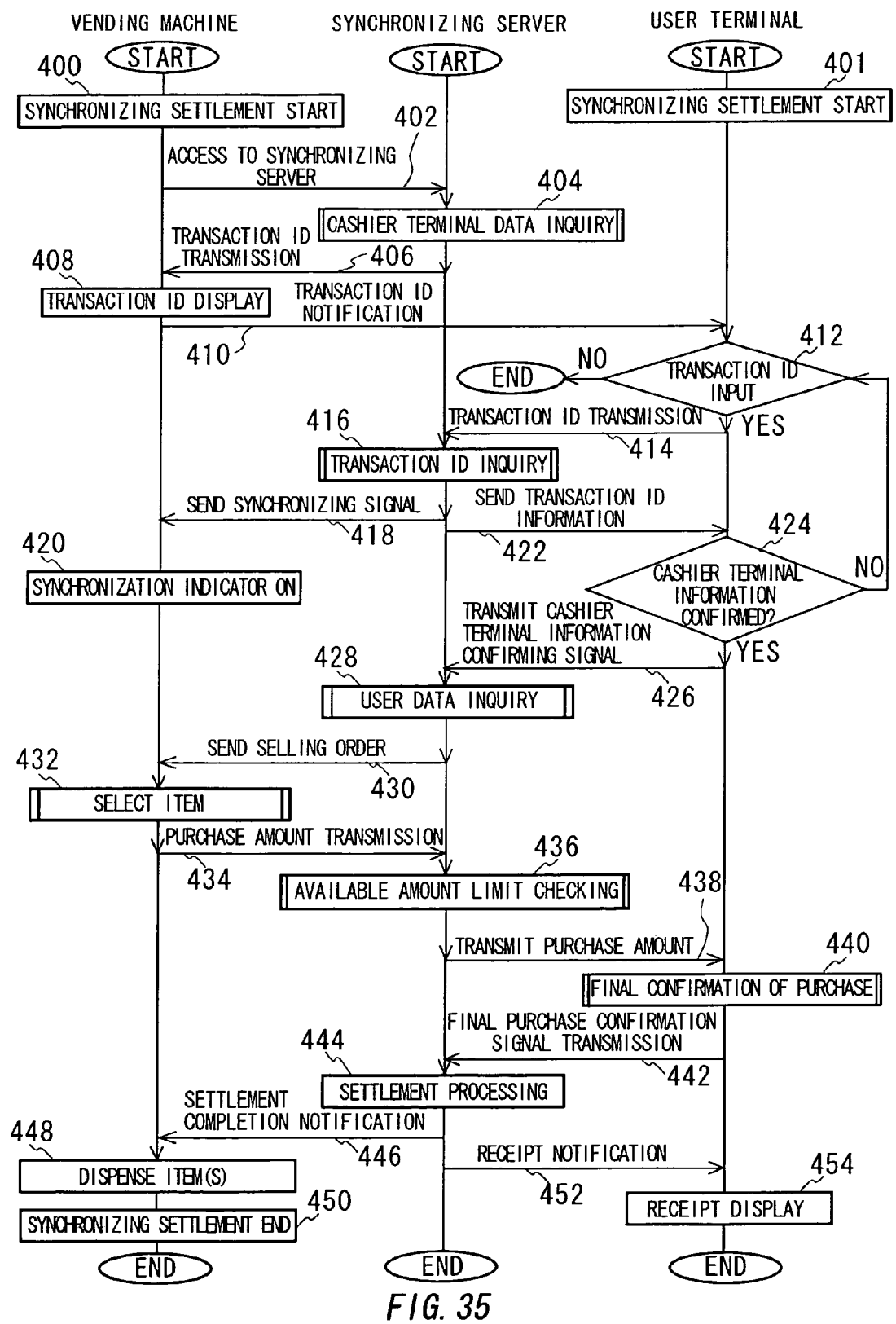
FIG. 35 is a flow chart showing a settlement processing in an electronic settlement system applying the fourth embodiment of the present invention.

Referring to FIG. 35 and FIG. 36, settlement processing in the electronic settlement system applying the present embodiment will be described in the following. FIG. 35 is a flowchart showing a settlement processing in an electronic settlement system applying the fourth embodiment of the present invention. FIG. 36 shows examples of information indicated on a display unit 802 of a user terminal 20.

Referring to FIG. 35, the settlement processing will be described in the following. The user chooses the electronic settlement menu of the user terminal 20 (401), selects the start key 910 of the vending machine 16, so that the electronic settlement (400) starts. The vending machine 16 accesses the synchronizing server 30 (402). The vending machine 16 transmits to the synchronizing server 30 a cashier registration number which is unique to the vending machine 16.

The synchronizing server 30, corresponding to the access from the vending machine 16, starts to communicate with the vending machine 16. The synchronizing server 30 inquires the cashier terminal information based on the cashier registration number transmitted from the vending machine 16 (404). The processing from the cashier terminal information inquiry 404 to the user information inquiry 428 is the same as the processing from the cashier terminal information inquiry 104 to the user information inquiry 128 of the first embodiment shown in FIG. 5; therefore it will not be described here. In the synchronization indicating 420 processing, the vending machine 16 may have a synchronization indicator to light the synchronization indicator, or may indicate the synchronization status by displaying characters on the display unit 908.

The synchronizing server 30 transmits a selling order to the vending machine 16 after the user information inquiry 428 (430). The vending machine 16, receiving the selling order from the synchronizing server 30, prompts the user to choose an item sold by the vending machine (432). When the user chooses an item, the vending machine 16 transmits to the synchronizing server 30 the purchase amount information (434).

The processing from the available limit inquiry 436 processing to the settlement processing 444 are the same as the processing from the available limit inquiry 136 processing to the settlement processing 144 of the first embodiment shown in FIG. 5; therefore it will not be described here.

When the settlement processing 444 is finished, the synchronizing server 30 notifies a settlement completion notification to the vending machine 16 (446). The vending machine 16 sends out the item the user has chosen (448). The synchronizing server 30 transmits a receipt indicating the reception of the expense to the user terminal 20 (452). The user terminal 20 indicates the receipt (454).

The data communication of the vending machine 16 with the synchronizing server 30 as described above is all performed via the communication line 18. The data communication of the user terminal 20 with the synchronizing server 30 is performed via the radio communication channel 28 or the communication line 38. The data communication of the vending machine 16 with the user terminal 20 does not exist.

The vending machine 16 notifies the transaction ID from the vending machine 16 to the user terminal 20 (410) by displaying the transaction ID on the display unit. As another case of the embodiment, the vending machine 16 has an infrared communication unit as an example of a short distance wireless communication unit, in the notification of the transaction ID from the vending machine 16 to the user terminal 20 (410) processing, through the infrared communication, the transaction ID is transmitted from the infrared communication unit of the vending machine 16 to the infrared communication unit 808 of the user terminal 20. Thus, the user does not need to input the transaction ID to the user terminal 20 and an input mistake of the transaction ID may be avoided. Furthermore, for a means to transmit the transaction ID from the vending machine 16 to the user terminal 20, each of the vending machines 16 and the user terminals 20 has a wireless communication unit as an example of a short distance communication unit, using a wireless communication for portable apparatuses such as Blue tooth, and transits and receives the transaction ID.

The electronic settlement system of the present embodiment, differs from the first, second, third, and fourth embodiments, because it does not perform the authentication of the user such as the visual authentication, the password authentication, the voice authentication, the iris or retina image authentication, fingerprint authentication, and so on. A settlement using the vending machine 16 settles only smaller amounts, and the need for user authentication is less important. When a cellular phone is used for the user terminal 20, the uniqueness of the calling number of a cellular phone authenticates the user, as long as the owner of the cellular phone oneself uses the cellular phone. In the case of settlement for the smaller amount, the user authentication processing may be omitted without significant problems. Therefore, the electronic settlement system applying the present invention may select the authentication method depending on the purchase amount, selling style, and so on.

Fifth Embodiment

The electronic settlement system applying the fifth embodiment of the present invention will be described in the following. Applying the electronic settlement system of the present embodiment, a user may access the Internet using a computer, access an on-line shopping server on the Internet, purchase an item, and settle the value of the merchandise.

Figure 37:
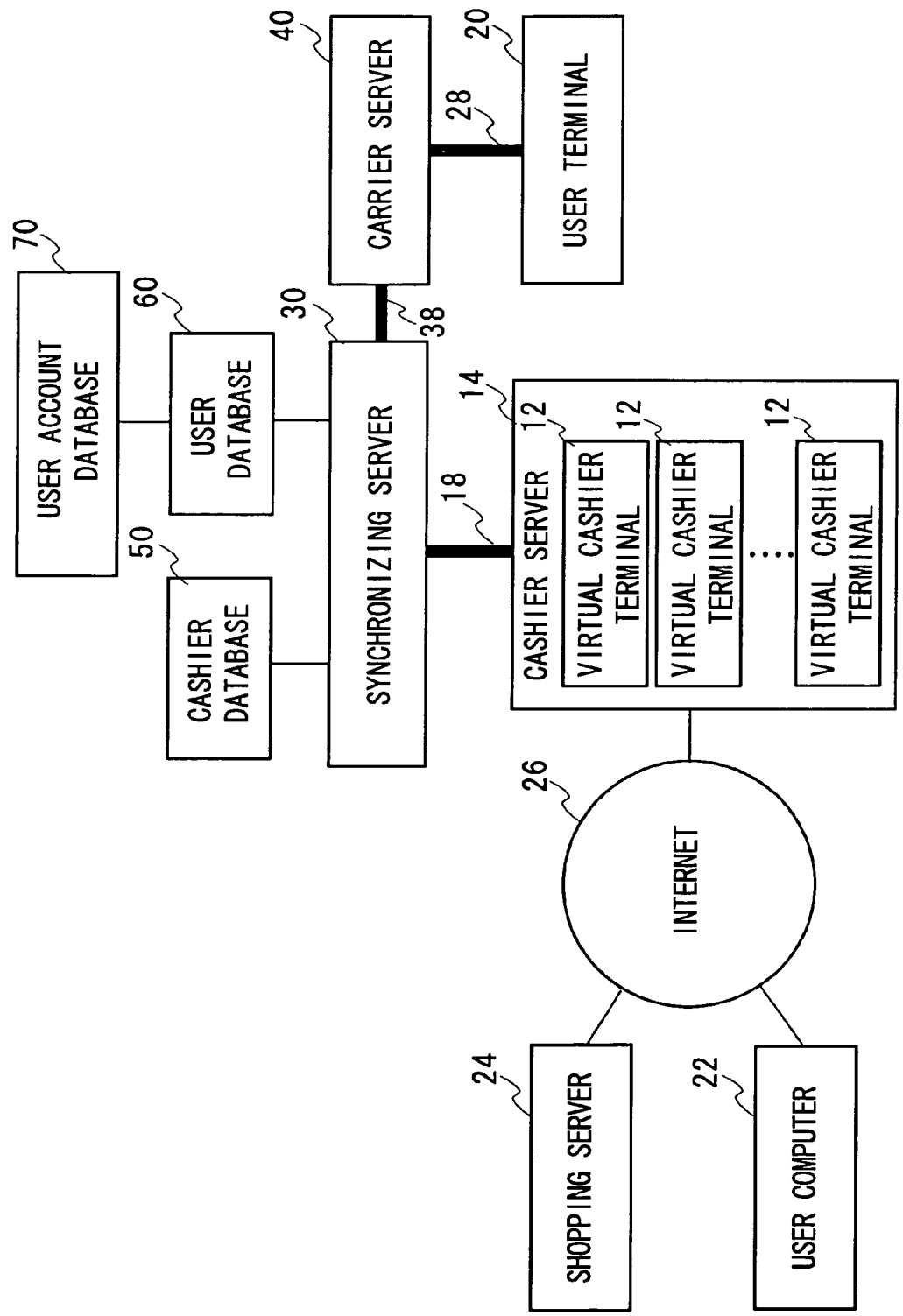
FIG. 37 is a block diagram showing a configuration of an electronic settlement system applying the fifth embodiment of the present invention.

FIG. 37 is a block diagram showing a configuration of an electronic settlement system applying the fifth embodiment of the present invention. The electronic settlement system of the present embodiment has a cashier terminal 14, a plurality of virtual cashier terminals 12 as examples of billing terminals, a user terminal 20 as an example of a paying terminal, a synchronizing server 30 as an example of a settlement device, a carrier server 40, a cashier database 50 as an example of a billing terminal database, a user database 60 as an example of a paying terminal database, a user account database 70, a shopping server 24, and a user computer 22.

The shopping server 24 is an on-line shopping server on the Internet 26. The user computer 22 is a user computer that connects to the Internet 26, and may access the shopping server 24 and perform the on-line shopping.

The cashier server 14 is a server system representing the retailing of the on-line shopping, which constructs a plurality of virtual cashier terminals 12, and performs billing of the settlement processing with the user.

The synchronizing server 30 performs the settlement processing of merchandise between the user and the mail order retailer. The synchronizing server 30 connects to the virtual cashier terminals 12 and to the user terminal 20 via the communication network, and performs data communication.

The virtual cashier terminals 12 in the cashier terminal 14 connects to the synchronizing server 30 via a communication line 18, and performs data communication. The communication line 18 may be either of a commercial telephone line or a private line.

The user terminal 20 connects to the carrier server 40 via a radio communication channel 28. The carrier server 40 connects to the synchronizing server 30 via communication line 38. The virtual cashier terminal 12 does not directly communicate with the user terminal 20.

The synchronizing server 30 retrieves information about the billing of the transaction from communication with the virtual cashier terminal 12. The synchronizing server 30 retrieves information about the paying of transaction from communication with the user terminal 20. The synchronizing server 30 synchronizes the communication to the virtual cashier terminal 12 with the communication to the user terminal 20 so that it performs the transaction settlement processing between the virtual cashier terminal 12 and the user terminal 20.

The components have the same numbers as in FIG. 1 and are the same as the first embodiment. Here, these components that have the same action and construction as the first embodiment will not be described.

Figure 38:
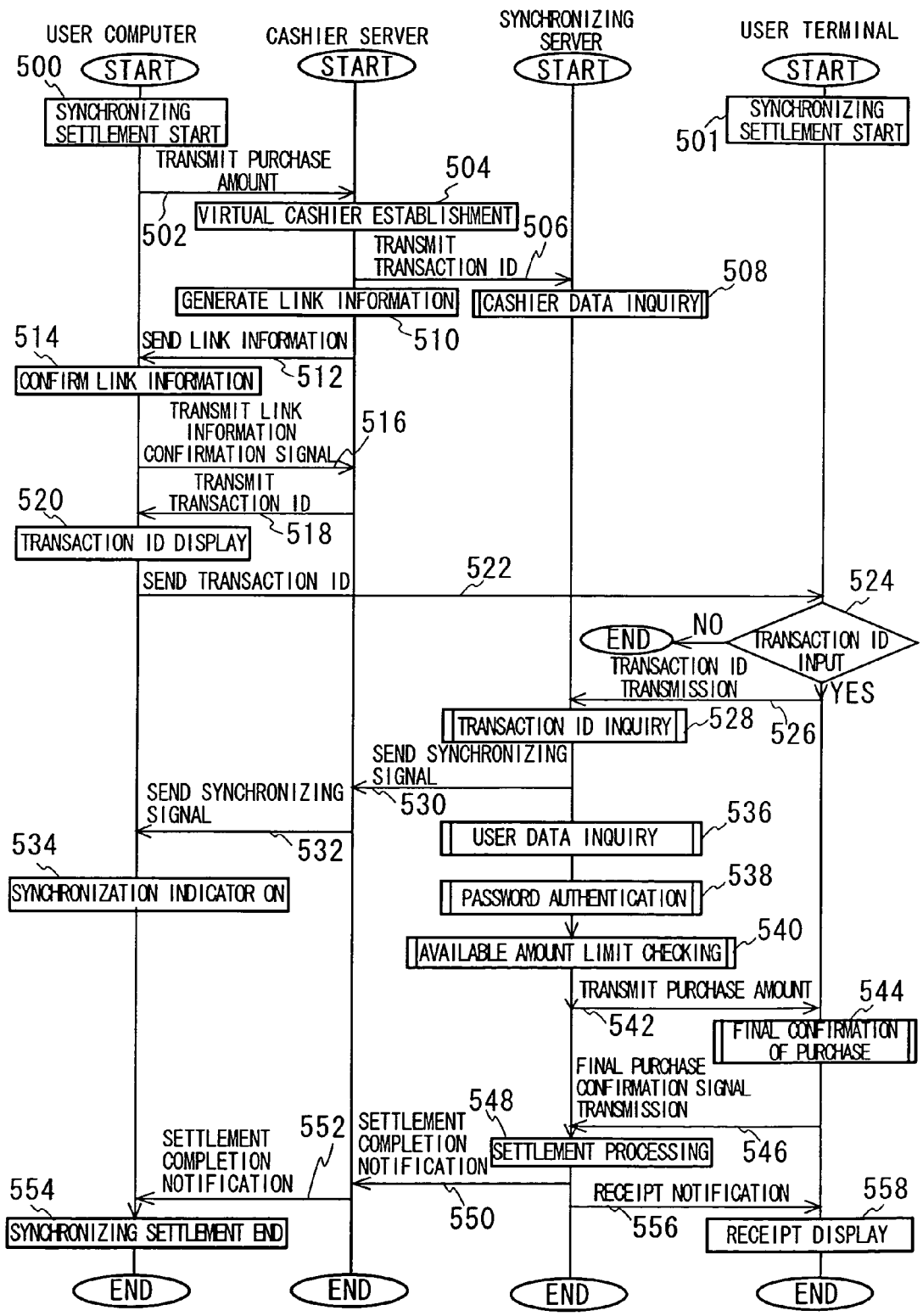
FIG. 38 is a flow chart showing a settlement processing in an electronic settlement system applying the fifth embodiment of the present invention.

Referring to FIGS. 38 to FIG. 43, applying the electronic settlement system of the present embodiment, settlement processing of the electronic settlement performed by the user using the user terminal is described in the following. FIG. 38 is a flow chart showing a settlement processing in an electronic settlement system applying the fifth embodiment of the present invention. FIGS. 39 to 42 are flow charts showing processing of details in FIG. 38. FIG. 43 shows examples of information indicated on the user computer 22.

The user connects to the Internet 26 using the user computer 22, accesses the shopping server 24 on the Internet 26, and performs the on-line shopping. While on-line shopping, checking a web page on the Internet 26 for shopping in the shopping server 24, the user chooses an item. When the user has chosen the item, a web page shown in FIG. 43(*a*), which shows the purchased item(s) and the purchase amount, is indicated on the display unit of the user computer 22. The user selects a key to direct the synchronizing settlement and the synchronizing settlement processing is started (500). The user computer 22 accesses the cashier server 14, and transmits to the cashier server 14 purchase amount information including the total purchase amount (502).

The cashier server 14 activates the virtual cashier terminal 12 (504). The virtual cashier terminal 12 is processing or is an apparatus working as a cashier terminal. The virtual cashier terminal 12 may be a terminal device provided in the cashier server 14, or may be a program activated in the cashier server 14. The virtual cashier terminal 12 connects to the synchronizing server 30, sets a transaction ID as an example of a transaction ID number identifying the transaction, and transmits the transaction ID to the synchronizing server 30 (506).

Figure 39:
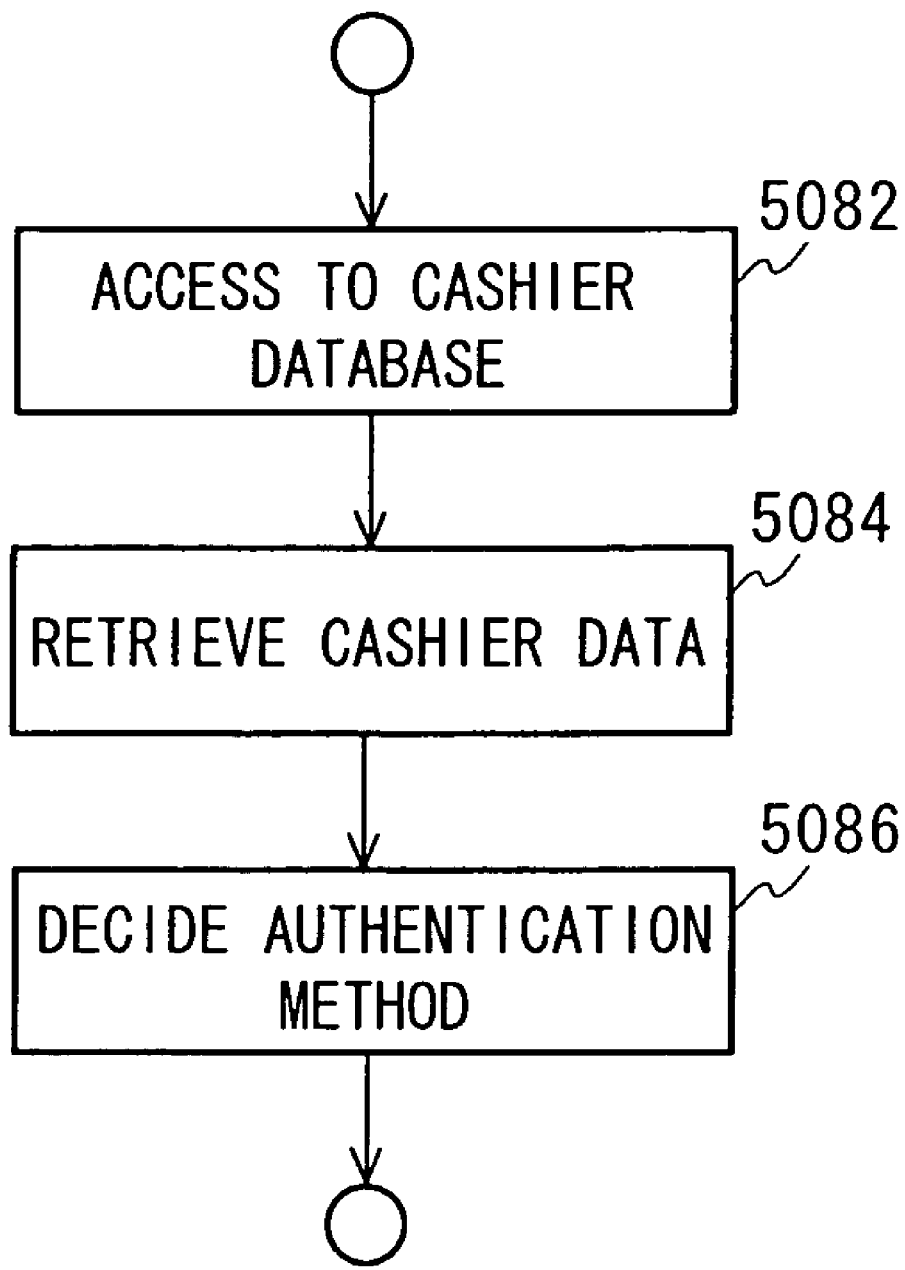
FIG. 39 is a flow chart showing cashier information inquiry 508 processing.

The synchronizing server 30 starts the connection to the virtual cashier terminal 12 corresponding to the access from the virtual cashier terminal 12, and inquires cashier information based on the cashier registration number transmitted from the virtual cashier terminal 12 (508). FIG. 39 is a flow chart showing the cashier information inquiry 508 processing. The cashier information inquiry 508 processing is the same as the cashier information inquiry 206 processing of the second embodiment shown in FIG. 17 and will not be described here.

The cashier server 14 creates link information (510), and transmits the link information to the user computer 22 (512). The information shown in FIG. 43(*b*), which is created by cooperative processing with the cashier server 14, is indicated on the user computer 22. CGI (Common Gate Interface) may be used for cooperating the processing the user computer 22 and the cashier server 14. The information shown in FIG. 43(*b*) includes "purchase detail" and "synchronizing".

When the user chooses "purchase detail", a list of purchased items and a purchase amount is indicated, so that the user may confirm the details of the purchase and purchase amount. "Synchronizing" is attached with the "link information" to the virtual cashier terminal 12 in the cashier server 14. Thus, the user computer 22, choosing "Synchronizing", may connect to a predetermined virtual cashier terminal 12 in the cashier server 14 (514).

When the user chooses "Synchronizing", the user computer 22 connects to the virtual cashier terminal 12, and transmits the link information confirmation signal to the virtual cashier terminal 12 (516). The virtual cashier terminal 12, receiving the link information confirmation signal from the user computer 22, transmits the set transaction ID to the user computer 22 (518). Receiving the transaction ID from the virtual cashier terminal 12, in the user computer 22 as shown in FIG. 43(c), a window for the cashier browser is activated, a virtual cashier terminal is displayed in the window of the cashier browser, and a direction to input the transaction ID is displayed (520).

The user computer 22, indicating the transaction ID in the window of the cashier browser, may notify the user the transaction ID (522). The user inputs to the user terminal 20 the transaction ID indicated in the window of the cashier browser of the user computer 22 (524). The user terminal 20 transmits the transaction ID input by the user to the synchronizing server 30 (526).

Figure 40:
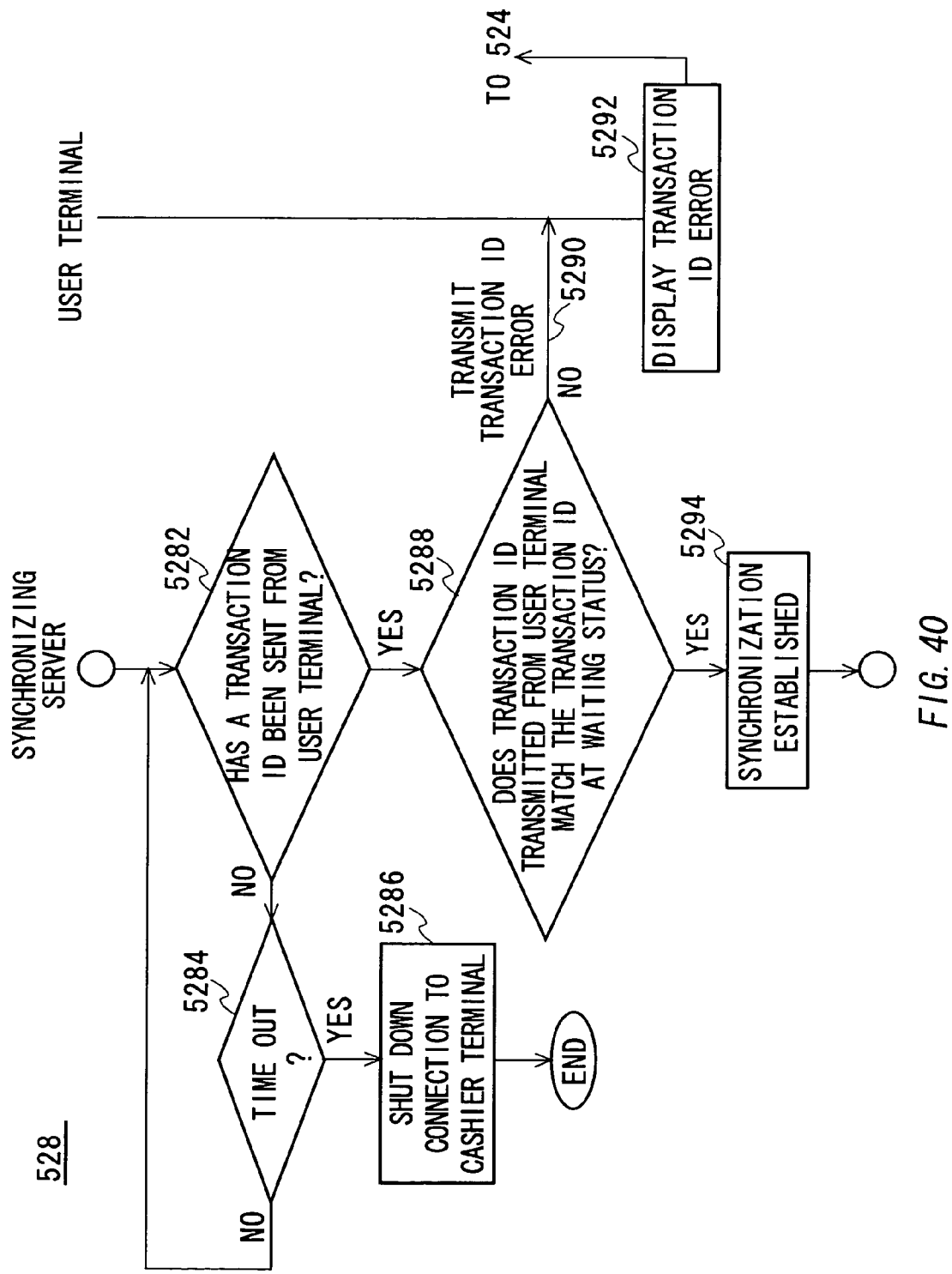
FIG. 40 is a flow chart showing a cashier number inquiry 528 processing.

The synchronizing server 30 verifies the transaction ID received from the virtual cashier terminal 12 in the processing 506 and the transaction ID received from the user terminal 20 in the processing 526. If the transaction IDs match, the synchronizing server 30 synchronizes the communication to the virtual cashier terminal 12 with the communication to the user terminal 20. FIG. 40 is a flow chart showing a cashier number inquiry 528 processing. The cashier number inquiry 528 processing is the same as the transaction ID inquiry 116 in the first embodiment shown in FIG. 7 and it will not be described here.

When the transaction ID inquiry is completed, the synchronizing server 30 transmits the synchronizing signal to the virtual cashier terminal 12 (530). The virtual cashier terminal 12, receiving the synchronizing signal from the synchronizing server 30, transmits to the user computer 22 the synchronizing signal (532). The user computer 22, receiving the synchronizing signal from the virtual cashier terminal 12, lights a synchronization indicator displayed in the virtual cashier terminal indicated in the cashier browser (534). Thus, the user may confirm the synchronizing status with the virtual cashier terminal 12.

Figure 41:
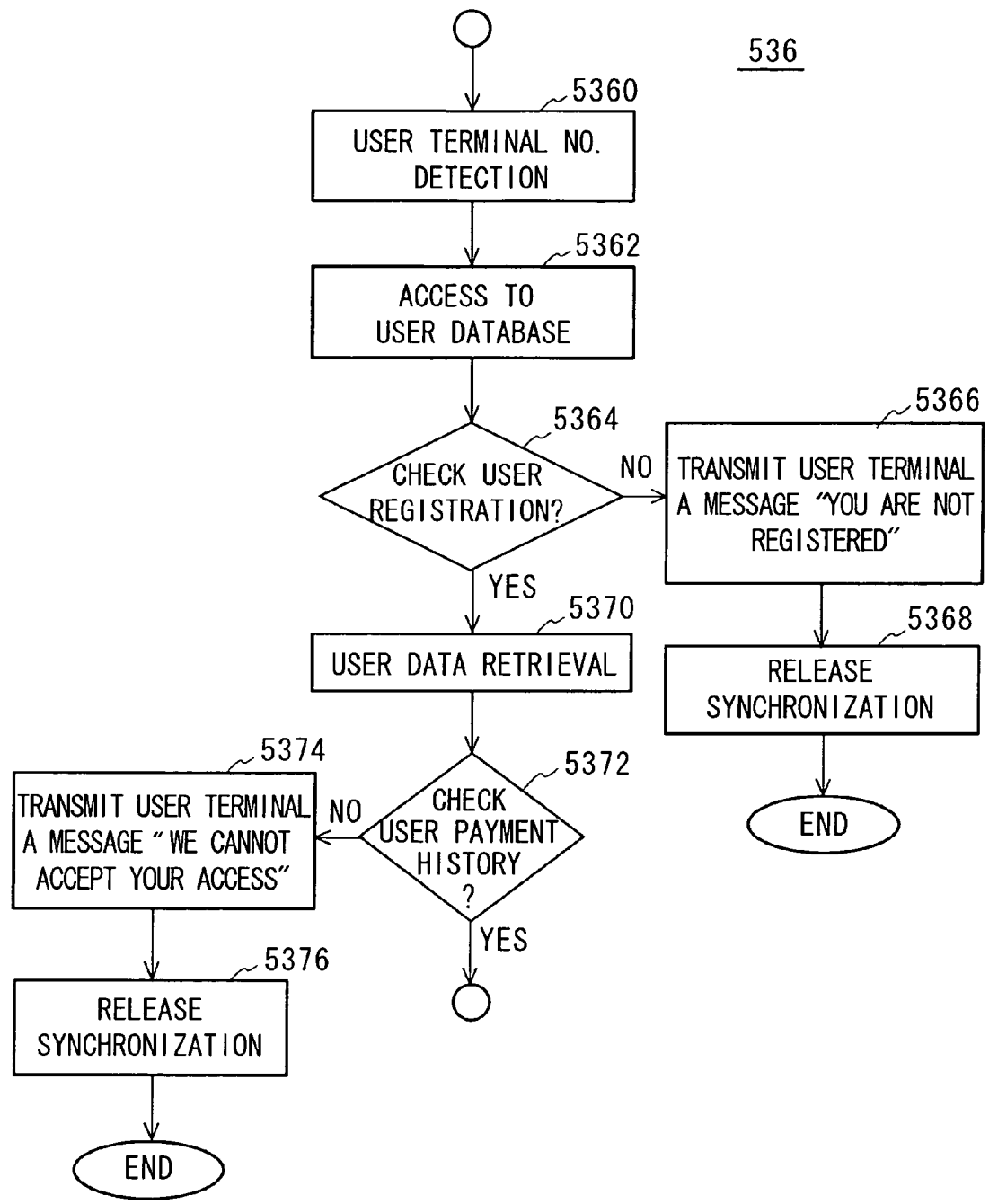
FIG. 41 is a flow chart showing a user information inquiry 536 processing.
Figure 42:
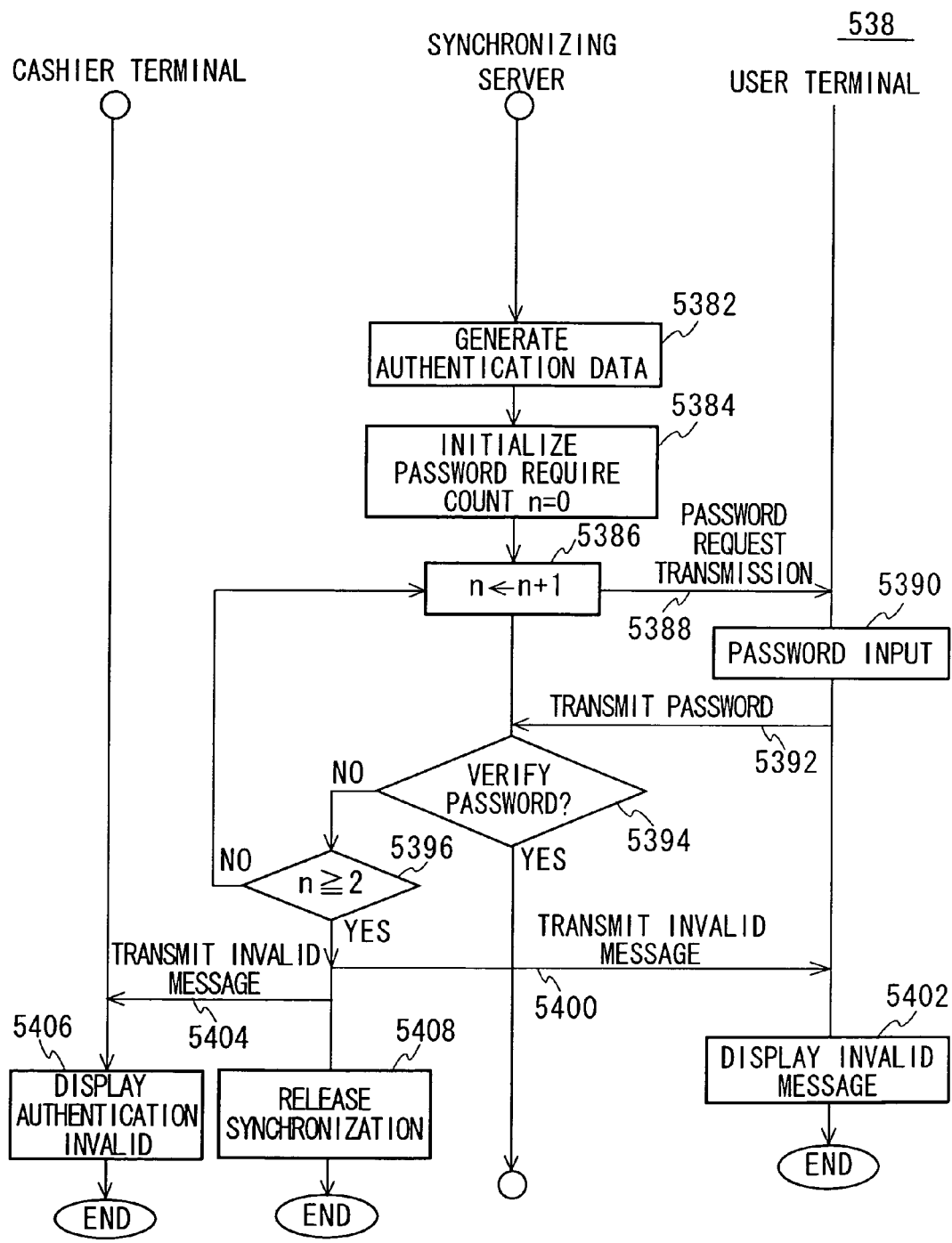
FIG. 42 is a flow chart showing a password authentication 538 processing.

The synchronizing server 30, after the transaction ID inquiry 528 processing, performs the user information inquiry 536 and the password authentication 538. The user information inquiry 536 processing shown in FIG. 41 is the same as the user information inquiry 128 processing of the first embodiment shown in FIG. 8, therefore it will not be described here. The password authentication 538 processing shown in FIG. 42 is the same as the password authentication 210 processing of the first embodiment shown in FIG. 9, except including no visual authentication, therefore it will not be described here.

After the password authentication 538 processing, the synchronizing server 30 performs available limit inquiry 540 processing and the settlement 548 processing; and the user terminal 20 performs final purchase confirmation 544 processing. These processing's are the same as the first embodiment, therefore they will not be described here.

The synchronizing server 30, after the settlement processing 548, transmits the settlement completion notification to the virtual cashier terminal 12 (550), transmits a receipt to the user terminal 20. The virtual cashier terminal 12, receiving the settlement completion notification from the synchronizing server 30, transmits to the user computer 22 the settlement completion notification (552). The user computer 22 indicates notification of the settlement completion on the displayed information. The user, looking at the notification, may know the completion of the settlement with the virtual cashier terminal 12.

In the above described embodiment, the virtual cashier terminal 12 sets the transaction ID as an example of the transaction ID number identifying the transaction, and transmits it to the synchronizing server 30. The allocation method of the transaction ID is not limited to this method. When the virtual cashier terminal 12 connects to the synchronizing server 30, the synchronizing server 30 may allocate the transaction ID to the virtual cashier terminal 12, and may transmit the transaction ID to the virtual cashier terminal 12.

In the electronic settlement system of the present embodiment, the user, using a computer, accesses an on-line shopping server on the Internet, selects items to for purchase, and settles the purchased merchandise transaction using a user terminal such as a cellular phone.

Using on-line shopping on the Internet, sending a credit card number as data via the Internet may create a security problem. Conventionally, using a hyper enciphering method, the credit card number is sent in the enciphered code. Applying the electronic settlement system of the present embodiment, the selection of the purchasing item is performed on the Internet, but the settlement of merchandise value is performed safely using the cellular phone and so on. The electronic settlement system of the present embodiment does not need to directly send the personal information such as user identifying information or credit card information between the user terminal paying the settlement and the cashier terminal billing the settlement. Therefore, the user need not worry about personal information being leaked to the retailer, and privacy is protected.

Sixth Embodiment

Figure 44:
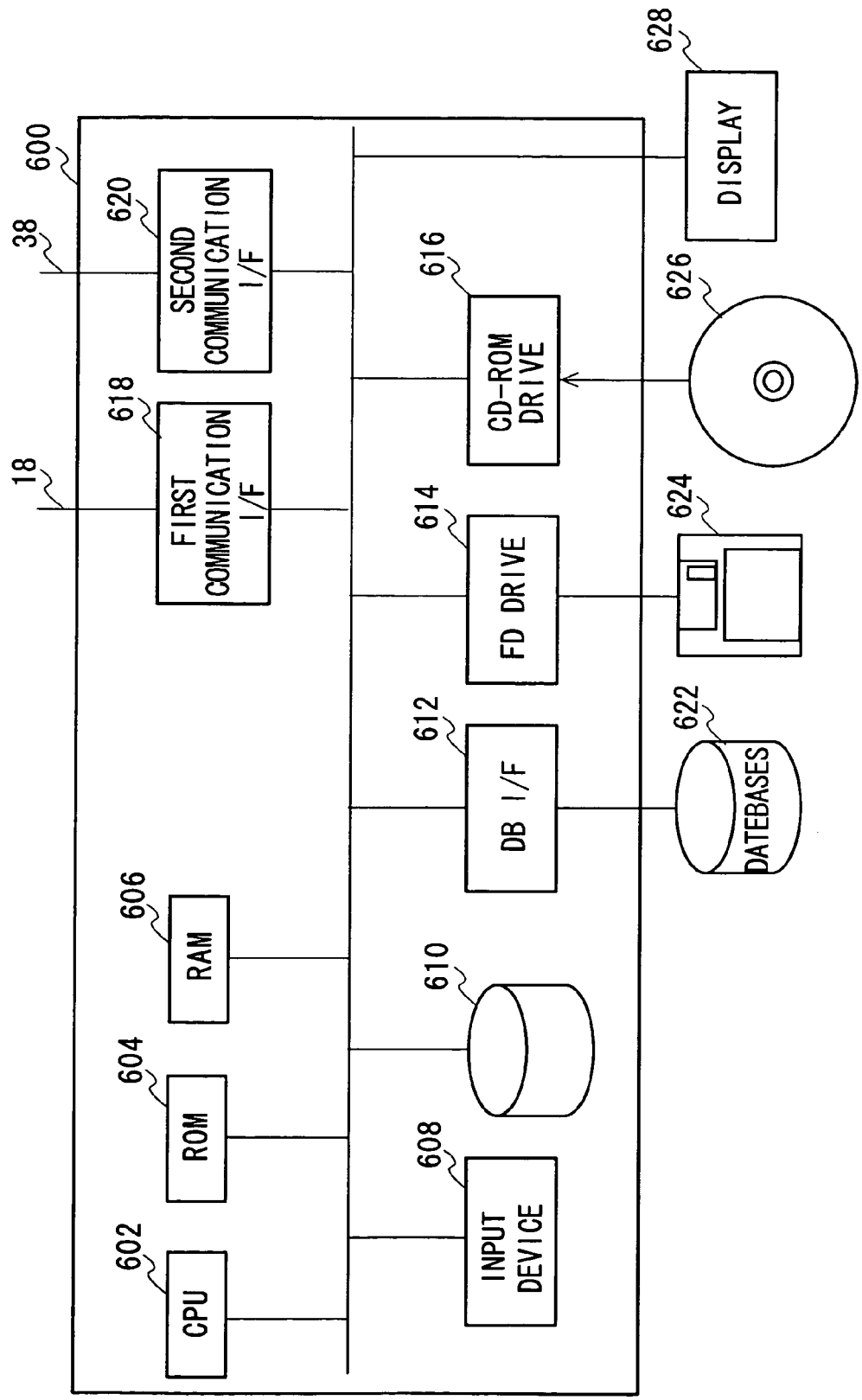
FIG. 44 shows a block diagram showing hardware architecture of a general-purpose computer 600.

The synchronizing server 30, as an example of the settlement apparatus in the electronic settlement system according to the first, second, third, fourth, and fifth embodiments, may be realized using a general-purpose computer. FIG. 44 is a block diagram showing a hardware configuration of a general-purpose computer 600. As shown in FIG. 44, a CPU 602 of the computer 600 is operated based on the programs stored in a ROM 604 and a RAM 606. Using an input device 608, an administrator of the synchronizing server 30 may input data or commands. Setting information and programs to operate the CPU 602 are stored in a hard disk drive 610 as an example of a storing device.

A floppy disk drive 614 reads data or programs from a floppy disk 624 and provides them to the CPU 602. A CD-ROM drive 616 reads data or programs from a CD-ROM 626 and provides them to the CPU 602. A first communication interface 618 connects to a transmission line 18 and communicates data. A second communication interface 620 connects to a transmission line 38 and communicates data. A database interface 612 connects to databases 622 and communicates data with the database. Furthermore, the synchronizing server 30 has an interface to connect with a display 628 so that the administrator may watch an operational status of the synchronizing server 30, or check the setting information using the display 628.

Figure 45:
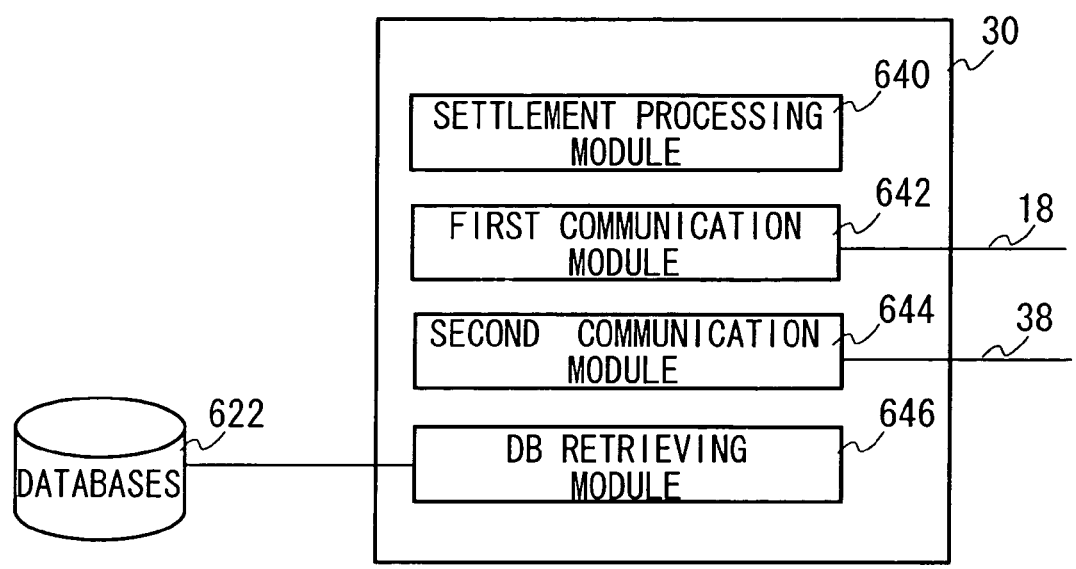
FIG. 45 is a block diagram showing a functional architecture of software executed on a CPU 602.
Figure 6:
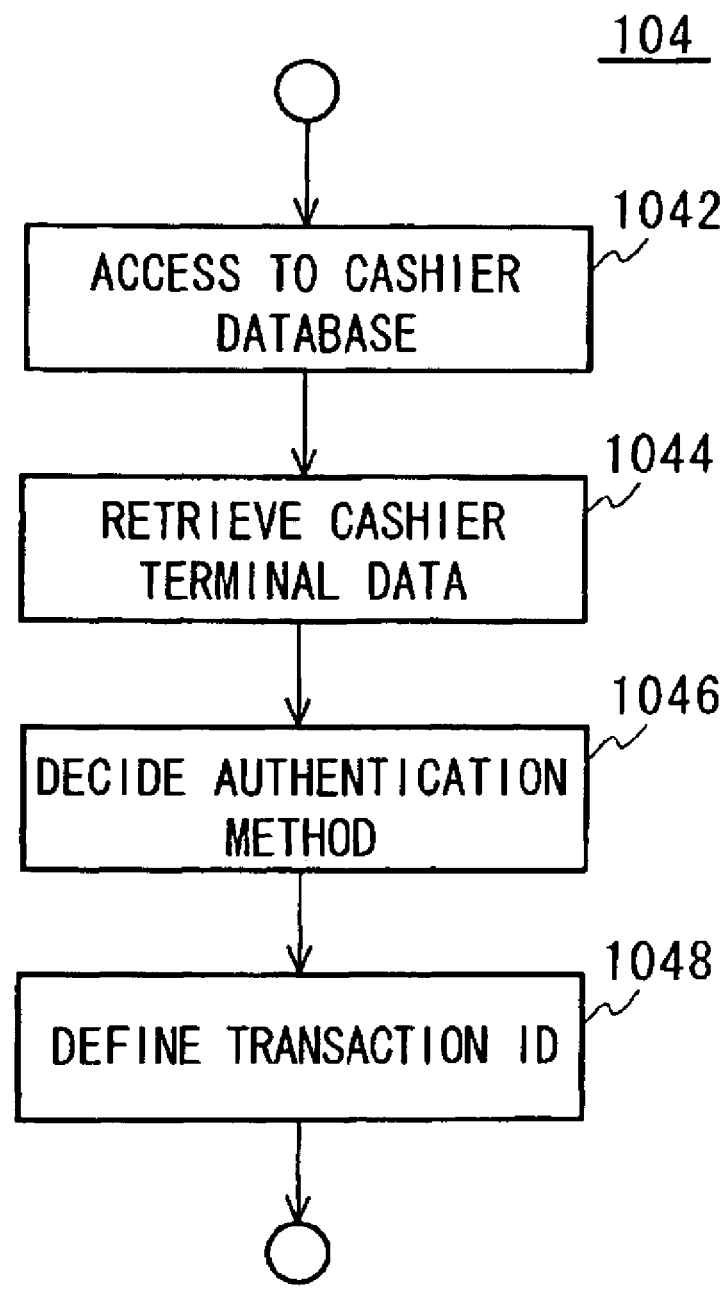

FIG. 45 is a block diagram showing a functional configuration of the software operating the CPU 602 shown in FIG. 44. This software is provided to users stored in a recording media such as a floppy disk 624 or a CD-ROM 626 and so on. The software stored in the recording media may be compressed or non-compressed. The software is installed from the recording media to the hard disk drive 610, read out to the RAM 606, and executed by the CPU 602.

The software stored in the recording media to be provided, that is the software installed in the hard disk drive 610, has a settlement processing module 640, a first communication module 642, a second communication module 644, and a database retrieving module 646, for its functional configuration.

The processing, performed by the CPU 602 operating the computer 600, of the settlement processing module 640, the first communication module 642, the second communication module 644, and the database retrieve module 646, are the same as each of the settlement processing unit 80, the first communication unit 82, the second communication unit 84, and the database retrieving unit 86 in the synchronizing server 30 according to the first, second, third, fourth, and fifth embodiment; therefore these processing's will not be described here.

The floppy disk 624 or CD-ROM 626 shown in FIG. 44, as an example of the recording media, may store a part of, or all of, the function for the operation of the synchronizing server 30 as an example of the settlement apparatus applying the entire embodiment described in the present application. Furthermore, the synchronizing server 30 may replace a part of the operation of the cashier terminal 10 and the synchronizing server 30 may operate a part of the operation of the cashier terminal 10 of the above described embodiment. In such a case, the part of the operation of the cashier terminal 10 described in the above embodiment may be stored in the floppy disk 624 or the CD-ROM 626.

These programs may be read to RAM directly from the recording media and executed, or be installed to the hard disk drive once, then read to RAM and executed. Furthermore, these above described programs may be stored in a single recording medium or a plurality of recording media. In other cases, these programs may be stored in an encoded form.

Besides a floppy disk and a CD-ROM, an optical recording media such as a DVD, a magnetic recording media such as an MD, a magnetic optical recording media such as a PD, a tape device, a semiconductor memory such as an IC card or miniature card, and so on may be used for a recording media. In other cases, using a store device such as a hard disk or a RAM provided in a server system for a recording media, connected to a private communication network or the Internet, the programs may be provided to the synchronizing server 30 via a communication network. Such recording media are used only for manufacturing the synchronizing server 30, so that it is obvious that manufacturing and distribution of such recording media as vocation constructs infringement of a patent based on the present application.

In the first, second, third, fourth, fifth, and sixth embodiments described above, the transmission line 18 connecting the cashier terminal 10, the vending machine 16, or the cashier server 14 with the synchronizing server 30 may be a wireless communication or the Internet, other than a commercial telephone line or a private line. When the transmission line 18 is the Internet, in order to ensure security of the data communication with the synchronizing server 30, it is desirable to choose a high security communication method.

In another case, a bit filtering means is provided on a communication pathway between the carrier server 40 and the synchronizing server 30 and/or a pathway between the cashier terminal 10 or the cashier server 14 and the synchronizing server 30. The bit filtering means may detect data format or bit pattern of data sent between the user terminal 20, the cashier terminal 10, or the cashier server 14 and the synchronizing server 30. Applying the present invention, because confidential information such as personal information of a user is not sent between the user terminal 20 and the cashier terminal 10 or the cashier server 14, so that the data sent to and from the synchronizing server 30 does not need to be encrypted. Thus, the bit filtering means may observe the data format and the bit pattern of the sent data and find an unexpected access pattern easily. Therefore, false access to the electronic settlement system or destroying access may be easily detected.

As described above, applying the electronic settlement system of the first embodiment, the retail clerk authenticates the user with a facial portrait data. In the case of an expensive settlement or the clerk is not able to be certain of the user authentication, the clerk further requests the user to input of a password, accuracy of authentication may be improved corresponding to the importance of a situation. The user, using a portable apparatus having a wireless communication function such as a cellular phone or a portable terminal, can settle a transaction simply, conveniently, and safely.

Furthermore, in the electronic settlement system of the first embodiment, the synchronizing server 30 corresponds the cashier terminal 10 and the user terminal 20 both of which perform the settlement using the transaction ID as an example of a transaction ID number; and completes the settlement between the corresponded cashier terminal 10 and the corresponded user terminal 20, without directly sending personal information such as a user credit card number, a bank account number, and so on. A method as to the synchronization of the communication using the transaction ID enables safe, simple, and convenient electronic settlement.

Applying the electronic settlement system of the second embodiment, both of the cashier terminal 10 and the user terminal 20 may appoint the authentication method, and the agreeable authentication method is selected between the user and the retailer or the clerk, then the user may be authenticated. Therefore, the authentication method and the authentication accuracy demanded by the user, and the authentication method and the authentication accuracy demanded by the clerk or the retailer, may be matched. Furthermore, the authentication method may be varied depending on the purchase amount.

Applying the electronic settlement system of the third embodiment, the user terminal 20 receives the transaction ID number allocated by the synchronizing server 30, displays it in the form of a pattern code such as a bar code, a cyber code, and so on, and lets the cashier terminal 10 read it in. The cashier terminal 10 retrieves the transaction ID number from the pattern code and transmits the transaction ID number to the synchronizing server 30. Thus, the user terminal 20 and the cashier terminal 10 are corresponded to each other using the transaction ID number, and the settlement is performed between the user terminal 20 and the cashier terminal 10 corresponded with each other. Therefore, the user inputs no transaction ID number so that the electronic settlement can be performed simply and conveniently.

Applying the electronic settlement system of the fourth embodiment, the purchase and settlement using the vending machine may be performed simply and conveniently via networks.

Applying the electronic settlement system of the fifth embodiment, the user, using a computer, accesses the on-line shopping server in the Internet, selects a purchasing item, and using the user terminal such as a cellular phone, may settle the value of the purchased item. The selection of the purchasing item is performed on the Internet, the settlement of the value of purchase may be performed safely, using a cellular phone and so on. The user does not need to worry about personal information being leaked to the mail order retailer, so that privacy is protected.

The electronic settlement system of the present invention has the following advantages for retailers, mail order retailers, or on-line shopping retailers using the Internet. Based on the uniqueness of the calling telephone number of a cellular phone, a secure user authentication may be ensured. On the other hand, because the system has a selection of authentication methods, the accuracy of the authentication may be easily varied corresponding to a settlement amount or a situation of the settlement. In a case of a small amount settlement such as a purchase at the vending machine, omitting the user authentication, the system may authenticate the user based on the calling telephone number of the cellular phone and perform the settlement. In a case of a larger amount settlement such as a purchase at a jewelry store, the clerk may authenticate the user using facial portrait data, if the clerk is not sure enough, combining further authentication and so on, the accuracy of the authentication can be improved.

The electronic settlement system of the present invention has the following advantage for users. Carrying a cellular phone, which is a communication terminal with a high level of portability, a transaction may be electronically settled anytime and anywhere; therefore the user does not need to carry cash, a credit card, a bank card, or an IC money card, and so on. Furthermore, the user, using a data packet communication facility of the cellular phone, may check if the payment is withdrawn from his or her account, his or her available amount, his or her purchase history, and so on.

The electronic settlement system of the present invention has the following advantage for a credit card company. Applying the authentication method using a cellular phone may discourage a false use of stolen cards. Because a credit settlement may be performed electronically using a cellular phone, issuing a credit card or management of a credit card is no longer needed and costs may be reduced. Furthermore, using a combination authentication method, in a case that a person responsible in the credit card company and so on moved data falsely, settlement accounts of users may be protected from false use.

Although the present invention has been described by way of exemplary embodiments, it should be understood that many changes and substitutions may be made by those skilled in the art without departing from the spirit and the scope of the present invention which is defined only by the appended claims.

INDUSTRIAL APPLICABILITY

It is obvious from the above description, according to the present invention, a settlement of a commercial transaction may be performed safely and conveniently via a communication network.

What is claimed is:

1. An electronic settlement system for effecting an authentication through a communication network, comprising:
   a first terminal for purchasing an item by a user thereof, which is at least one of a cellular phone and a PDA, the first terminal including an input unit for inputting authentication information of the user and connecting to the communication network;
   a second terminal for charging the user of the first terminal a purchase amount, the second terminal being connected to the communication network;
   a database for storing authentication information of the user and a plurality of authentication methods; and
   a mediating server which performs the settlement of the authentication by mediating a communication between the first terminal and the second terminal one-to-one when receiving an ID information from one of the first terminal and the second terminal so as to determine that the first terminal and the second terminal are participating in a same purchase, the mediating server setting at least one of the authentication methods selected by either one of the users of the first terminal and the second terminal, the selected authentication method being processed between the first terminal and the second terminal that have been determined to be participating in the same purchase, wherein one of the mediating server and the second terminal authenticates the user by using the authentication information stored in the database,
   wherein when receiving a request signal from one of the first terminal and the second terminal, the mediating server sets up and transmits the ID information to the one of the first terminal and the second terminal which sent the request signal to the mediating server, and when receiving the same ID information from the other one of the second terminal and the first terminal, the mediating server mediates the communication with the first terminal and the second terminal, the settlement of the purchase is executed by an instruction from said first terminal during mediating the communication with the first terminal and the second terminal,
   wherein the request signal includes a unique ID of at least one of the first terminal and the second terminal, and
   wherein said database includes,
      a first terminal database for storing the authentication information of the user and the authentication methods demanded by the user of said first terminal, and
      a second terminal database for storing an authentication method demanded by the user of the second terminal, wherein the mediating server sets an agreeable authentication method in accordance with the authentication method stored in the first terminal database and the authentication method stored in the second terminal database.

2. An electronic settlement system according to claim 1, wherein said second terminal connects to said mediating server via at least one of a commercial telephone line and a private line, and said first terminal connects to said mediating server via at least one of a radio telephone communication and a video telephone communication.

3. An electronic settlement system according to claim 1, wherein the mediating server stores respective agreeable authentication methods in relation to a combination of the authentication method demanded by the user and the authentication method demanded by the user of the second terminal, and the mediating server sets the agreeable authentication method by verifying the authentication methods stored in the first terminal database and the second terminal database.

4. An electronic settlement system according to claim 3, wherein the mediating server includes the second terminal database and the first terminal database.

5. An electronic settlement system according to claim 3, wherein each of the second terminal database and the first terminal database stores at least one of: a visual authentication method, a password authentication method a voice authentication method, an iris image authentication method, a retina image authentication method, and a fingerprint authentication method.

6. An electronic settlement system according to claim 3, wherein the first terminal database stores at least one of the authentication methods in relation to a type of the authentication, the first terminal database sends the mediating server a type-signal which indicates the type of the authentication from the first terminal, and the mediating server retrieves at least one of the authentication methods in accordance with the type-signal received from the first terminal.

7. An electronic settlement system according to claim 3, wherein the first terminal database stores different authentication methods in accordance with a purchase amount limit predetermined by the user, the second terminal sends the mediating server the purchase amount, and the mediating server retrieves one of the authentication methods from the first terminal database, based on the purchase amount received from the second terminal.

8. An electronic settlement system according to claim 3, wherein the second terminal database stores different authentication methods in accordance with a purchase amount limit predetermined by the second terminal, the second terminal sends the mediating server the purchase amount, and the mediating server retrieves one of the authentication methods from the second terminal database, based on the purchase amount received from the second terminal.

9. An electronic settlement system according to claim 3, wherein the mediating server sets the authentication demanded by the first terminal as the agreeable authentication method if the second terminal appoints no authentication method, and the mediating server sets the authentication method demanded by the second terminal as the agreeable authentication method if the first terminal does not set the authentication method.

10. An electronic settlement system according to claim 3, wherein the first terminal is a cellular phone and the input unit of the cellular phone inputs at least one of a facial portrait, a voice, an iris image, a retina image, and a fingerprint image of the user of the first terminal, and the second terminal is a cashier terminal including an input unit and the input unit of the cashier terminal inputs the at least one of the facial portrait, the voice, the iris image, the retina image, the fingerprint image of the user.

11. An electronic settlement system according to claim 10, wherein the cashier terminal is provided at a retailer.

12. An electronic settlement system according to claim 10, wherein the cashier terminal is provided on at least one of a shopping server and an Internet.

13. An electronic settlement system according to claim 3, wherein if an authentication accuracy of the authentication method demanded by the second terminal differs from an authentication accuracy of the authentication method demanded by the user, the authentication method having higher authentication accuracy is selected for the agreeable authentication method.

14. An electronic settlement system according to claim 3, wherein if the authentication method demanded by the second terminal does not match the authentication method demanded by the user, the synchronizing server refuses to authenticate the user and transmits to the first terminal information indicating that the authentication is refused.

15. An electronic settlement system according to claim 3, wherein the authentication method is invoked by the user.

16. An apparatus for effecting an authentication through a communication network with a first terminal including an input unit for inputting authentication information of a user, which is at least one of a cellular phone and a PDA, and a second terminal, for charging the user a purchase amount, the apparatus comprising:
a first communication unit connected to the second terminal via a first communication network;
a second communication unit connected to the first terminal via a second communication network;
a database for storing the authentication information of the user and a plurality of authentication methods; and
a processing unit for performing the settlement of the authentication by mediating a communication between the first terminal and the second terminal one-to-one when one of the first communication unit and the second communication unit receives an ID information from one of the second terminal and the first terminal so as to determine that the second terminal and the first terminal are participating in a same purchase, wherein the processing unit processes at least one of the authentication of the user or mediates the authentication of the user selected by either one of the users of the first terminal and the second terminal, the selected authentication method being processed by the first terminal and the second terminal, by using the authentication information stored in the database,
wherein, when one of the first communication unit and the second communication unit receives a request signal from one of the second terminal and the first terminal, the processing unit sets up the ID information and one of the first and second communication units transmits the ID information to the one of the second terminal and the first terminal which sent the request signal, and when one of the first and second communication units receives the same ID information from the other one of the first terminal and the second terminal, the processing unit mediates the communication between the first terminal and the second terminal, the settlement of the purchase is executed by an instruction from said first terminal during mediating the communication with the first terminal and the second terminal,
wherein the request signal includes a unique ID of at least one of the first terminal and the second terminal, and
wherein said database includes,
a first terminal database for storing the authentication information of the user and the authentication methods demanded by the user of said first terminal, and
a second terminal database for storing an authentication method demanded by the user of the second terminal, wherein the processing unit sets up an agreeable authentication method in accordance with the authentication methods stored in the first terminal database and the second terminal database.

17. An apparatus according to claim 16, wherein said second communication unit detects a calling telephone number of the first terminal, and
said processing unit retrieves information about a user of the first terminal from said first terminal database based on the calling telephone number, and said processing unit checks at least one of a registration status of the user, a payment history of the user, and an available amount of the user.

18. An apparatus according to claim 17, wherein said processing unit retrieves at least a part of an attribute information of the user of the first terminal from said first terminal database, and said first communication unit transmits to the second terminal at least a part of said attribute information of the user of the first terminal.

19. An apparatus according to claim 17, wherein when said second communication unit receives a message which demands a purchase history of the user of the first terminal, said processing unit retrieves said purchase history of the user from said first terminal database, and said second communication unit transmits said purchase history to the first terminal.

20. An apparatus according to claim 16, wherein each of the second terminal database and the first terminal database stores at least one of: a visual authentication method, a password authentication method a voice authentication method, an iris image authentication method, a retina image authentication method, and a fingerprint authentication method.

21. An apparatus according to claim 16, wherein the first terminal database stores different authentication methods in accordance with a purchase amount limit predetermined by the user, the first communication unit receives the purchase amount from the second terminal, and the processing unit retrieves one of the authentication methods from the first terminal database, based on the purchase amount received by the second communication unit.

22. An apparatus according to claim 16, wherein the first terminal database stores at least one of the authentication methods in relation to a type of the authentication, the second communication unit receives a type-signal which indicates the type of the authentication from the first terminal, and the processing unit retrieves at least one of the authentication methods in accordance with the type-signal from the first terminal.

23. An apparatus according to claim 16, wherein the second terminal database stores different authentication methods in accordance with a purchase amount limit predetermined by the second terminal, the first communication unit receives the purchase amount from the second terminal, and the processing unit retrieves one of the authentication methods from the second terminal database, based on the purchase amount received by the first communication unit.

24. An apparatus according to claim 16, wherein the processing unit sets the authentication method demanded by the first terminal as the agreeable authentication method if the second terminal does not set the authentication method, and the processing unit sets the authentication method demanded by the second terminal as the agreeable authentication method if the first terminal does not set the authentication method.

25. An apparatus according to claim 16, wherein the first terminal is a cellular phone and the input unit of the cellular phone inputs at least one of a facial portrait, a voice, an iris image, a retina image, and a fingerprint image of the user, and the second terminal is a cashier terminal including an input unit and the input unit of the cashier terminal inputs the at least one of the facial portrait, the voice, the iris image, the retina image, and the fingerprint image of the user.

26. An apparatus according to claim 25, wherein the cashier terminal is provided at a retailer.

27. An apparatus according to claim 25, wherein the cashier terminal is provided on at least one of a shopping server and an Internet.

28. An apparatus according to claim 22, wherein the authentication method is invoked by the user.

29. A recording medium which stores a program for a computer, communicating with a second terminal performing billing of an authentication and with a first terminal, which is at least one of a cellular phone and a PDA, performing paying of the authentication, and performs a settlement of the authentication, the program comprising:
   a first communication module which prompts to communicate to the second terminal via a first communication network;
   a second communication module connected to the first terminal via a second communication network;
   a storage module for storing authentication information of a user and a plurality of authentication methods; and
   a processing module which performs the settlement of the authentication by mediating a communication between the first terminal and the second terminal one-to-one when one of the first communication unit and the second communication unit receives an ID information from one of the second terminal and the first terminal so as to determine that the second terminal and the first terminal are participating in a same purchase, wherein the processing module processes an authentication of the user or mediates the authentication of the user processed by the first terminal and the second terminal, by using the authentication information stored in the storage module in a manner selected by either one of the users of the first terminal and the second terminal,
   wherein, when one of the first communication module and the second communication module receives a request signal from one of the second terminal and the first terminal, the processing module sets up the ID information and one of the first and second communication modules transmits the ID information to the one of the second terminal and the first terminal which sent the request signal, and when one of the first and second communication modules receives the same ID information from the other one of the first terminal and the second terminal, the processing module mediates the communication between the first terminal and the second terminal, the settlement of the purchase is executed by an instruction from said first terminal during mediating the communication with the first terminal and the second terminal,
   wherein the request signal includes a unique ID of at least one of the first communication module and the second communication module, and
   wherein said storage module includes,
      a first terminal database for storing the authentication information of the user and the authentication methods demanded by the user of said first terminal, and
      a second terminal database for storing an authentication method demanded by the user of the second terminal, wherein the processing module sets an agreeable authentication method in accordance with the authentication method stored in the first terminal database and the authentication method stored in the second terminal database.

30. A recording medium according to claim 29, wherein the second communication module receives an authentication method invoked by the user and the processing module processes the authentication of the user or intermediates the authentication of the user, in accordance with the authenticating method invoked by the user.

31. A method of effecting an authentication through a communication network, comprising:
   inputting authentication information of a user purchasing an item through a first terminal, which is at least one of a cellular phone and a PDA, to the communication network;
   charging the user of the first terminal a purchase amount through a second terminal over the communication network;
   storing authentication information of the user and a plurality of authentication methods in a database; and
   performing settlement of the authentication by mediating a communication between the first terminal and the second terminal one-to-one when receiving an ID information from one of the first terminal and the second terminal so as to determine that the first terminal and the second terminal are participating in a same purchase, the mediating using at least one of the authentication methods that has been selected by either one of the users of the first terminal and the second terminal, the selected authentication method being processed between the first terminal and the second terminal that have been determined to be participating in the same purchase, wherein one of the mediating and the charging authenticates the user by using the authentication information stored in the database, wherein, when receiving a request signal from one of the first terminal and the second terminal, the mediating involves set up and transmission of the ID information to the one of the first terminal and the second terminal which sent the request signal, and when receiving the same ID information from the other one of the second terminal and the first terminal, the mediating involves communication with the first terminal and the second terminal, the settlement of the purchase is executed by an instruction from said first terminal during mediating the communication with the first terminal and the second terminal, wherein the request signal includes a unique ID of at least one of the first terminal and the second terminal, and wherein said database includes,
- a first terminal database for storing the authentication information of the user and the authentication methods demanded by the user of said first terminal, and
- a second terminal database for storing an authentication method demanded by the user of the second terminal, wherein the performing step sets an agreeable authentication method in accordance with the authentication method stored in the first terminal database and the authentication method stored in the second terminal database.

32. An electronic settlement system for effecting an authentication through a communication network, comprising:

a first terminal for purchasing an item by a user thereof, which is at least one of a cellular phone and a PDA, the first terminal including an input unit for inputting authentication information of the user and connecting to the communication network;

a second terminal for charging the user of the first terminal a purchase amount, the second terminal being connected to the communication network;

a database for storing authentication information of the user and a plurality of authentication methods; and a mediating server which performs the settlement of the authentication by mediating a communication between the first terminal and the second terminal one-to-one when receiving an ID information from one of the first terminal and the second terminal so as to determine that the first terminal and the second terminal are participating in a same purchase, the mediating server setting at least one of the authentication methods selected by either one of the users of the first terminal and the second terminal, the selected authentication method being processed between the first terminal and the second terminal that have been determined to be participating in the same purchase, wherein one of the mediating server and the second terminal authenticates the user by using the authentication information stored in the database, wherein said database includes a first terminal database for storing the authentication information of the user and the authentication methods demanded by the user of said first terminal; and a second terminal database for storing an authentication method demanded by the user of the second terminal, wherein the mediating server sets an agreeable authentication method in accordance with the authentication method stored in the first terminal database and the authentication method stored in the second terminal database, and wherein the settlement of the purchase is executed by an instruction from said first terminal during mediating the communication with the first terminal and the second terminal.

* * * * *

UNITED STATES PATENT AND TRADEMARK OFFICE
CERTIFICATE OF CORRECTION

| | |
|---|---|
| PATENT NO. | : 7,523,067 B1 |
| APPLICATION NO. | : 09/630557 |
| DATED | : April 21, 2009 |
| INVENTOR(S) | : Nakajima |

It is certified that error appears in the above-identified patent and that said Letters Patent is hereby corrected as shown below:

In the Drawings:

In the Drawings, Fig. 6 should be replaced with the corrected Fig. 6 as shown on the attached pages.

In Fig. 6, Drawing Sheet 5 of 43, for Tag "1048", in Line 1, delete "DIFINE" and insert -- DEFINE --, therefor.

In Fig. 25, Drawing Sheet 24 of 43, for Tag "7002", in Line 1, delete "AGEEABLE" and insert -- AGREEABLE --, therefor.

In Fig. 31, Drawing Sheet 29 of 43, delete Referral Tag "104" and insert -- 114 --, therefor.

In Fig. 39, Drawing Sheet 37 of 43, for Tag "5084", in Line 1, delete "DATA" and insert -- DATABASE --, therefor.

In Fig. 44, Drawing Sheet 42 of 43, for Tag "622", delete "DATEBASES" and insert -- DATABASES --, therefor.

In the Specifications:

In Column 1, Line 3, insert Heading -- CROSS-REFERENCE TO RELATED APPLICATION --.

In Column 1, Line 24, delete "PCT/JP99/04178 filed on Aug. 2, 1999".

In Column 4, Line 55, delete "terminal;" and insert -- terminal, --, therefor.

In Column 5, Line 26, delete "a the settlement" and insert -- and the settlement --, therefor.

In Column 26, Line 31, delete "(124)" and insert -- (124), --, therefor.

Signed and Sealed this
Twenty-seventh Day of August, 2013

Teresa Stanek Rea
*Acting Director of the United States Patent and Trademark Office*

CERTIFICATE OF CORRECTION (continued)
U.S. Pat. No. 7,523,067 B1

In the Claims:

In Column 42, Line 16, in Claim 1, delete "wherein when" and insert -- wherein, when --, therefor.

In Column 42, Line 61, in Claim 5, delete "method" and insert -- method, --, therefor.

In Column 43, Line 58, in Claim 15, delete "claim 3," and insert -- claim 6, --, therefor.

In Column 44, Line 64, in Claim 19, delete "wherein when" and insert -- wherein, when --, therefor.

In Column 45, Line 7, in Claim 20, delete "method" and insert -- method, --, therefor.